(12) United States Patent
Imai

(10) Patent No.: US 6,257,027 B1
(45) Date of Patent: Jul. 10, 2001

(54) FULL-AUTOMATIC WASHING MACHINE WITH TWO DRIVE MOTORS

(75) Inventor: Masahiro Imai, Tajimi (JP)

(73) Assignee: Kabushiki Kaisha Toshiba, Kanagawa (JP)

(*) Notice: Subject to any disclaimer, the term of this patent is extended or adjusted under 35 U.S.C. 154(b) by 0 days.

(21) Appl. No.: 09/282,155

(22) Filed: Mar. 31, 1999

(30) Foreign Application Priority Data

Mar. 31, 1998 (JP) ................................. 10-087349

(51) Int. Cl.$^7$ ................................. D06F 37/40
(52) U.S. Cl. ............. 68/12.12; 68/12.14; 68/12.16; 68/23.5; 68/23.7; 68/902
(58) Field of Search .................. 68/12.12, 12.14, 68/12.16, 23.5, 23.6, 23.7, 133, 902

(56) References Cited

U.S. PATENT DOCUMENTS

| | | | |
|---|---|---|---|
| 4,232,536 | 11/1980 | Koseki et al. | 68/12 |
| 4,998,052 | * 3/1991 | Erdman et al. | 68/23.7 X |
| 5,208,931 | * 5/1993 | Williams et al. | 68/23.7 X |
| 5,301,523 | * 4/1994 | Payne et al. | 68/23.7 X |
| 5,475,290 | 12/1995 | Tani et al. | 318/434 |
| 5,778,703 | 7/1998 | Imai et al. | 68/12.02 |

FOREIGN PATENT DOCUMENTS

| | | | |
|---|---|---|---|
| 0 083 326 | 7/1983 | (EP). | |
| 0 394 178 | 10/1990 | (EP). | |
| 2 314 093 | 12/1997 | (GB). | |
| 200695 | * 11/1984 | (JP) | 68/23.7 |
| 5197 | * 1/1985 | (JP) | 68/23.7 |
| 34495 | * 2/1985 | (JP) | 68/23.7 |
| 92796 | * 5/1985 | (JP) | 68/23.7 |
| 92798 | * 5/1985 | (JP) | 68/23.7 |
| 18196 | * 4/1987 | (JP) | 68/23.6 |
| 80088 | * 3/1990 | (JP) | 68/23.6 |
| 9-10474 | 1/1997 | (JP). | |

* cited by examiner

Primary Examiner—Philip R. Coe
(74) Attorney, Agent, or Firm—Pillsbury Winthrop LLP

(57) ABSTRACT

A full-automatic washing machine includes a rotatable tub for accommodating laundry together with water, an agitator provided in the rotatable tub for agitating the water or the laundry, a variable-speed washing motor for directly driving the agitator, and a variable-speed dehydrating motor for directly driving the rotatable tub.

51 Claims, 37 Drawing Sheets

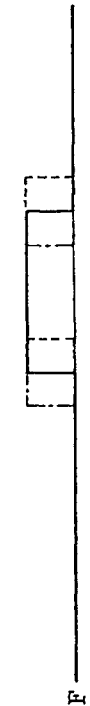
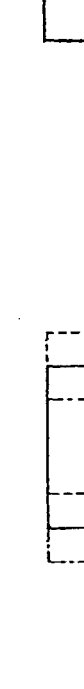
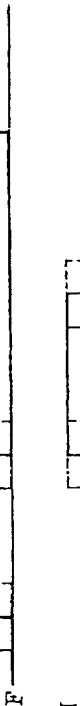
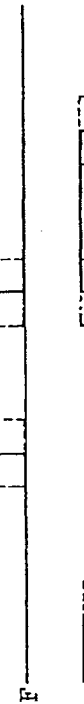

FIG. 6A HALL IC OUTPUT Hua
FIG. 6B HALL IC OUTPUT Hva
FIG. 6C HALL IC OUTPUT Hwa
FIG. 6D SWITCHING ELEMENT 56a ON/OFF
FIG. 6E SWITCHING ELEMENT 56c ON/OFF
FIG. 6F SWITCHING ELEMENT 56e ON/OFF
FIG. 6G SWITCHING ELEMENT 56b ON/OFF
FIG. 6H SWITCHING ELEMENT 56d ON/OFF
FIG. 6I SWITCHING ELEMENT 56f ON/OFF

—— NORMAL ENERGIZATION
------ PHASE LEAD ENERGIZATION (LEAD BY 30 DEGREES)
—·—·— PHASE LAG ENERGIZATION (LAG BY 30 DEGREES)

| SPEED | PHASE | OUTPUT | BRAKING FORCE |
|---|---|---|---|
| AT OR ABOVE 600 RPM | LAG BY 30° | 50% | LARGE |
| 300 TO 599 RPM | LAG BY 30° | 30% | MIDDLE |
| AT OR BELOW 299 RPM | LAG BY 15° | 30% | SMALL |

FIG. 20

| SPEED REDUCTION DEGREE | PHASE | OUTPUT | BRAKING FORCE |
|---|---|---|---|
| AT OR BELOW 75 RPM/S | LAG BY 30° | 50% | LARGE |
| TO 124 RPM/S | LAG BY 30° | 30% | MIDDLE |
| AT OR ABOVE 125 RPM/S | LAG BY 15° | 30% | SMALL |

FIG. 22

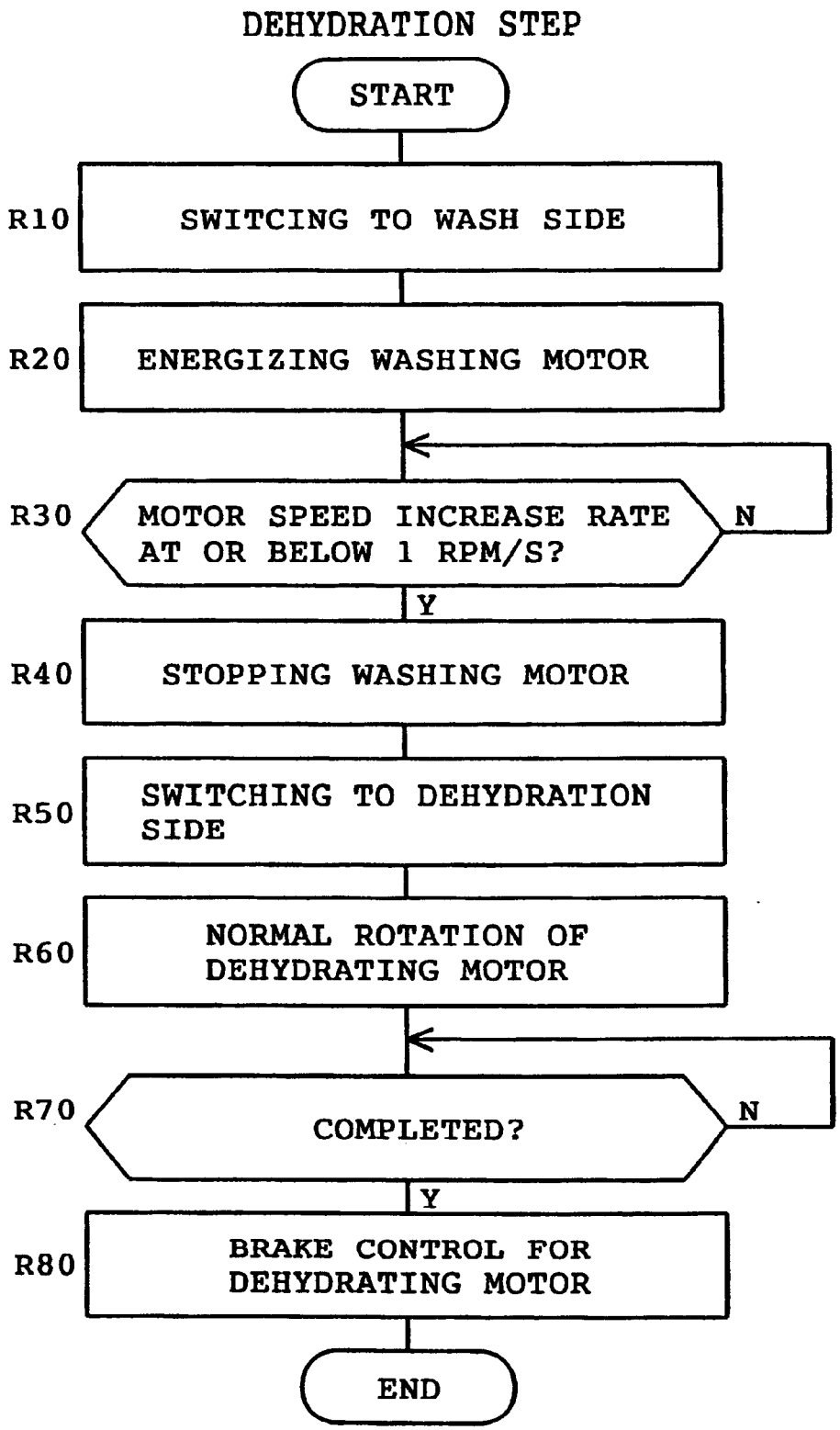
F I G. 30

FULL-AUTOMATIC WASHING MACHINE WITH TWO DRIVE MOTORS

BACKGROUND OF THE INVENTION

1. Field of the Invention

This invention relates generally to a full-automatic washing machine comprising a rotatable tub accommodating laundry with water and an agitator disposed in the rotatable tub and agitating the laundry and/or the water, and more particularly to such a full-automatic washing machine provided with two electric motors for driving the rotatable tub and the agitator respectively.

2. Description of the Prior Art

A full-automatic washing machine has conventionally been provided which comprises a rotatable tub provided in an outer tub for rotation and serving both as a wash tub and a dehydration tub and an agitator provided on the bottom of the rotatable tub for rotation. A single electric motor is provided for driving both the rotatable tub and the agitator. When a washing operation is carried out, the rotatable tub is braked to be stopped. In this state, a rotating force of the motor is transmitted via a reduction mechanism to the agitator so that the agitator is rotated alternately clockwise and counterclockwise at relatively low speeds. Further, when a dehydrating operation is carried out, the rotatable tub is released from the braked state, and the rotating force of the motor is transmitted to both the rotatable tub and the agitator without reduction, so that both of them are rotated.

In order that the rotating force of the motor may be transmitted to the rotatable tub and/or the agitator, a clutch mechanism, a reduction mechanism, etc. are required in rotation transmission paths between the motor and the rotatable tub and agitator respectively. These mechanisms complicate the construction of the washing machine and reduce manufacturing and assembling efficiencies of the washing machine. As a result, a manufacturing cost of the washing machine is increased.

Further, errors in a manufacturing accuracy of the clutch mechanism and deterioration with time of the clutch mechanism result in failure in an operation for switching between the rotation transmitting paths. Thus, the conventional full-automatic washing machine has a deficiency in the switching operation of the clutch mechanism. Further, when the washing machine is switched from the washing operation to the dehydrating operation, the switching operation of the clutch mechanism results in noise and the operation of the reduction mechanism also results in noise. Additionally, the switching operation of the clutch mechanism takes a time, resulting in prolongation of a washing time.

SUMMARY OF THE INVENTION

Therefore, an object of the present invention is to provide a full-automatic washing machine in which without provision of the clutch and reduction mechanisms, the rotatable tub and the agitator can be rotated and stopped independently of each other and their rotational speeds can be controlled independently of each other, whereupon the construction thereof can be simplified.

Another object of the invention is to provide a full-automatic washing machine which can eliminate the switching mechanism conventionally provided in the rotation transmission paths between the drive source and the rotatable tub and agitator and which can improve the reliability of operation without malfunction such as that in switching operation of the clutch mechanism, reduce noise and a washing time.

The present invention provides a full-automatic washing machine comprising a rotatable tub for accommodating laundry together with water, an agitator provided in the rotatable tub for agitating the water or the laundry, a variable-speed washing motor for directly driving the agitator, and a variable-speed dehydrating motor for directly driving the rotatable tub, the dehydrating motor rotating at a higher speed than the washing motor and developing a lower torque than the washing machine.

In the full-automatic washing machine, the agitator is rotated in a wash step including a wash operation with detergent and a rinse operation so that the laundry and water are caused to flow in the rotatable tub. The rotatable tub is rotated in the dehydration step so that washing liquid contained in the laundry is discharged out by centrifugal force. Thus, the full-automatic washing machine includes the agitator and the rotatable tub as rotating members. The agitator has speeds appropriate for washing, whereas the rotatable tub has speeds appropriate for dehydration. In the above-described full-automatic washing machine, the agitator is driven directly by the washing motor and the rotatable tub is driven directly by the dehydrating motor. Accordingly, two independent rotation transmission paths are provided between the drive sources and the rotating members respectively. Further, since the speeds of the washing and dehydrating motors are variable, the motors can be rotated at appropriate speeds respectively. As a result, conventionally required clutch mechanism and reduction mechanism or transmission mechanism are not required. Further, the rotatable tub and the agitator can be rotated and stopped independently, and the speeds of the rotatable tub and the agitator can be controlled independently. These advantages simplify the construction of the full-automatic washing machine, improve the reliability of the operation without malfunction such as that in the switching operation of the clutch mechanism and reduce noise and a washing time.

Furthermore, a large load is applied to the washing motor in the wash step since the agitator is driven to agitate the laundry with a large amount of water. On the other hand, the rotatable tub is rotated at high speeds or spun in the dehydration step. However, the large amount of water as that used in the wash step is previously discharged. Accordingly, a smaller load is applied to the dehydrating motor than to the washing motor. In view of the foregoing, when the dehydrating motor rotates at a higher speed than the washing motor and develops a lower torque than the washing motor, an appropriate washing operation and an appropriate dehydrating operation can be achieved.

In a first preferred form, the washing motor comprises a brushless motor or a switched reluctance motor and the dehydrating motor comprises a brushless motor or a switched reluctance motor. In this construction, the speed of each motor can easily be controlled, and the torque of each motor can be easily be adjusted. Consequently, the required low-speed and high-torque characteristic and high-speed and low-torque characteristic can easily be obtained. Further, an electric brake control can easily be performed. As the result of employment of the electric brake, the construction of the washing machine can further be simplified as compared with the case where a mechanical brake is employed.

In a second preferred form, the washing motor comprises an induction motor and the dehydrating motor comprises a brushless motor or a switched reluctance motor. Brushless motors and switched reluctance motors are suitable for speed control and torque adjustment control. Further, the electric brake control can be performed easily in these motors. In full-automatic washing machines, braking is required for preventing the rotatable tub from rotating with laundry and water in the wash step. This rotation of the rotatable tub with the laundry and water in the wash step reduces the cleaning effect. Thus, the rotatable tub and accordingly the dehydrating motor need to be braked. Since the agitator may be rotated with the rotatable tub in the dehydration step, the washing motor need not be braked. In view of this, the washing motor may comprise an induction motor. Further, both the washing and dehydrating motors may be constructed into a radial gap type. As a result, high-torque motors can be obtained as the washing and dehydrating motors and are suitable for full-automatic washing machines ranging between a large capacity and a small capacity. Further, both the washing and dehydrating motors may be constructed into an axial gap type. In this case, the vertical dimension and the weight of the washing machine can be reduced. These motors are suitable for full-automatic washing machines of relatively small capacity which does not require a large washing power and full-automatic washing machines of the type in which a moderate washing power is obtained. Additionally, either one of the washing and dehydrating motors may be constructed into a radial gap type and the other may be constructed into an axial gap type. As a result, the size of the full-automatic washing machine can be reduced while a required washing power can be obtained, whereupon the freedom in the design of the full-automatic washing machine can be increased.

In a third preferred form, the washing motor is constructed into an outer rotor type and has a larger diameter than the dehydrating motor, and the dehydrating motor is constructed into an inner rotor type and disposed inside the washing motor. A high torque characteristic necessary for the washing operation can be obtained since the diameter of the washing motor is large. A high-speed rotation characteristic necessary for the dehydrating operation can be obtained since the diameter of the dehydrating motor is smaller than that of the washing motor. Further, the washing machine further comprises a stator core and the washing and dehydrating motors include respective stator windings provided on the stator core. As a result, the construction of the washing machine can be simplified since only a single stator core is provided for the two motors. Further, the stator core has between the stator windings of the washing and dehydrating motors a void for preventing magnetic interference. In this construction, two independent magnetic circuits are provided between rotors of the washing and dehydrating motors although only a single stator core is provided. As a result, efficiencies of the motors can be improved. Further, the void includes a plurality of generally arc-shaped void sections and a plurality of generally circular void sections, the arc-shaped and circular void sections being annularly arranged, and the circular void sections serve to fix the stator core to a stationary member. In this construction, each circular void section is preferably located at a portion of the stator core where a magnetic flux density is lower than the other portion thereof. Consequently, the magnetic circuits can be prevented from being adversely affected at the stator core fixing portion.

In a fourth preferred form, the full-automatic washing machine further comprises a stator metal base used in common for the washing and dehydrating motors, and the washing and dehydrating motors comprise respective stator windings provided on one side of the stator base. When the washing and dehydrating motors are constructed into the axial gap type, a single flat plate type stator core is preferably provided, or stator windings are preferably provided on a stator base. In this case, since stator windings of the washing and dehydrating motors are provided on one side of the stator base, an assembling efficiency can be improved as compared with a case where the stator windings are provided on both sides of the stator base.

In a fifth preferred form, the washing motor is constructed into an axial gap type and the dehydrating motor is constructed into a radial gap type. A large load is applied to the washing motor, whereas a smaller load is applied to the dehydrating motor than to the washing motor. However, the rotatable tub is required to be rotated at high speeds, as described above. Since the washing and dehydrating motors are constructed into the radial gap type and the axial gap type respectively, a large load can be coped with in the washing operation, and a high-speed rotation can be realized in the dehydrating operation. In this construction, the axial gap type motor includes a rotor provided near one of axial ends of the radial gap type motor. In a case where position detecting means are provided on the axial and radial gap type motors for detecting rotational positions of the rotors respectively, the mounting work is troublesome when the levels at which the position detecting means are mounted differ from each other. Further, when both detecting means are held in a single sensor casing, the shape of the casing becomes complicated. In the above-described construction, however, an axial end of the rotor of the axial gap type motor is approximately at the same level as one axial end of the rotor of the radial gap type motor. Accordingly, the position detecting means can be disposed approximately at the same level and mounted easily. Further, the shape of the sensor casing can be simplified even when both position detecting means are held in the sensor casing.

In a sixth preferred form, the full-automatic washing machine further comprises a first inverter main circuit for controlling the washing motor so that a rotational speed of the washing motor is varied, a second inverter main circuit for controlling the dehydrating motor so that a rotational speed of the dehydrating motor is varied, and a direct-current power supply provided in common for both inverter main circuits. In this arrangement, the first and second inverter main circuits are provided individually so that the washing and dehydrating motors can be controlled simultaneously or individually at different times. Further, since the direct-current power supply is provided in common for both inverter main circuits, the arrangement can be simplified as compared with a case where two direct-current power supplies are provided for the two inverter main circuits respectively. In this case, both the washing and dehydrating motors preferably comprise brushless motors respectively. Additionally, the full-automatic washing machine may further comprise a single direct-current power supply, an inverter main circuit to which an electric power is supplied from the direct-current power supply, and switching means for supplying an output of the inverter main circuit selectively to the washing or dehydrating motor.

In a seventh preferred form, the full-automatic washing machine further comprises control means for controlling both motors, and the control means has a rotation control mode in which the washing motor is rotated in the wash step and a brake control mode in which an electric brake is applied to the dehydrating motor in the wash step. When the agitator is rotated by the washing motor in the wash step, there is a possibility that the rotatable tub may be rotated with the agitator. In the above-described arrangement, however, the electric brake is applied to the dehydrating motor in the wash step, so that the rotatable tub can be prevented from being rotated with the agitator. In this case, the control means preferably includes winding short-circuiting means for short-circuiting a winding of the dehydrating motor so that the electric brake is effected. Further, the electric brake is preferably effected as a direct-current magnetic excitation brake. Additionally, the control means preferably has a rotation control mode in which the washing motor is rotated in the washing step and a reverse rotation mode in which in the washing step, the dehydrating motor is rotated in a direction reverse to a direction in which the washing motor is rotated. In order that the rotatable tub may be prevented from being rotated with the agitator, the dehydrating motor is energized in such a mode that it is rotated in a direction opposite to that of the washing motor. As a result, the dehydrating motor is subjected to a reverse rotating force. In this case, however, when it is taken into consideration that the dehydrating motor has low torque and high-speed rotation characteristic and that load such as laundry and water exists in the rotatable tub, the load prevents the rotatable tub from rotating in the opposite direction, and accordingly, the rotatable tub remains substantially stationary or the rotation of the rotatable tub with the agitator can be prevented. The rotatable tub would be rotated slightly in the opposite direction when the load is small. However, this does not result in reduction in the washing effect but yet improves the washing effect.

In an eighth preferred form, the full-automatic washing machine further comprises a water-supply valve and a drain valve for performing water supply to and drainage from the rotatable tub. In this construction, the washing and dehydrating motors are controlled so that the dehydrating motor is rotated at a low speed while the water supply is being performed by the water-supply valve with the drain valve being closed, and upon expiration of a predetermined time, the washing motor is rotated repeatedly alternately in opposite directions while the water supply is being performed. According to the above-described construction, a sufficient amount of water can be penetrated into the laundry and detergent can be well dissolved in or mixed with water at the time of water supply. More specifically, when the dehydrating motor is rotated at a low speed, the laundry in the rotatable tub is displaced in a direction of rotation, so that water falls uniformly over the laundry. Moreover, since the washing motor is rotated repeatedly alternately in opposite directions, the water and laundry are caused to flow or move in opposite directions such that the detergent is well dissolved in or mixed with the water. The supplied water is reserved in the tub. In conventional washing machines provided with clutch mechanisms, the switching of rotation transmission to the rotatable tub is linked to the opening of the drain valve by a single drive source. The drain valve is opened when the rotatable tub is rotated, whereupon water cannot be reserved in the tub. In other words, the rotatable tub cannot be rotated with water being reserved in it in the prior art. In the above-described construction of the present invention, however, no such clutch mechanism is provided, and the opening of the drain valve and the drive of the rotatable tub can be controlled independently of each other. Further, the washing motor may be rotated repeatedly alternately in opposite directions so that draining by the drain valve is performed. As a result, water can be discharged without the laundry being one-sided in the tub. Accordingly, unbalance of the laundry can be prevented in a subsequently performed dehydration step.

In a ninth preferred form, in a dehydrating step, the dehydrating motor is driven, whereas the washing motor is in a free rotation state. The laundry often lies over both the rotatable tub and the agitator in the tub before start of the dehydrating step. Since the washing motor is in the free rotation state, it is rotated following the dehydrating motor. However, this results in no problem for the dehydrating operation. The above-described control manner is suitable for small load or a small amount of laundry.

On the other hand, in a dehydrating step, the washing motor may be driven, whereas the dehydrating motor is in a free rotation state, and thereafter, the dehydrating motor may be driven. The laundry often lies over both the rotatable tub and the agitator in the tub before start of the dehydrating step. Accordingly, when the dehydrating motor is first turned into the free rotation state and the washing motor is then driven, the agitator is rotated and rotation of the rotatable tub follows. Since the washing motor has a low-speed and high-torque characteristic, the rotatable tub can be started by a large starting torque, so that a dehydrating speed rapidly passes a resonance point of the washing machine. Consequently, occurrence of the unbalanced condition can be prevented. The dehydrating motor is thereafter driven to rotate the rotatable tub at high speeds and accordingly, a predetermined dehydration effect can be achieved.

In a tenth preferred form, both of the washing and dehydrating motors are driven in the dehydration step. Since a large starting torque is obtained, this control mode is suitable for a case where an amount of laundry is large or load is large, and a case where the dehydrating speed needs to be built up rapidly. In this case, rotational speeds of the washing and dehydrating motors may differ from each other in a dehydrating step. As a result, the laundry can be displaced and occurrence of unbalanced condition can be prevented. Further, the dehydration effect can be improved since a wringing or squeezing action is expected. Further, when either the washing or dehydrating motor reaches a predetermined rotational speed in a dehydrating step, an energizing phase of the washing motor is controlled to lead relative to a previous one. In a case of the dehydrating operation with both washing and dehydrating motors driven, rotational speeds of the rotatable tub and the agitator are gradually increased. However, the washing motor does not reach a target speed even if the motor output is increased. In the above-described arrangement, when either the washing or dehydrating motor reaches a predetermined rotational speed, an energizing phase of the washing motor is caused to lead one before the predetermined rotational speed, so that the washing motor can be rotated at a higher speed. Consequently, both of the washing and dehydrating motors can be controlled to reach the respective target speeds.

On the other hand, when either the dehydrating or washing motor reaches a predetermined speed after both motors have been energized to be rotated in a dehydrating step, the washing motor is deenergized into a free rotation state. Consequently, the dehydrating operation can easily be started at its initial stage as the result of drive of both motors. Since only the dehydrating motor is thereafter driven, electric power saving and high-speed dehydration can be achieved. Further, when the speeds of the washing and dehydrating motors differ from each other by a predetermined speed or above in the dehydrating step, the lower speed of either motor is controlled so as to approximate the speed of the other motor. The above-described wringing effect can be expected when the speed difference is small. However, the laundry may be damaged when the speed difference is large. In the above-described control, however, when the speeds of the washing and dehydrating motors differ from each other by a predetermined speed or above in the dehydrating step, the lower speed of either motor is controlled so as to approximate the speed of the other motor.

Consequently, the laundry can be prevented from being damaged. In this case, since the lower speed of one motor is approximated to that of the other motor, the dehydrating effect cannot be reduced. Further, the output of the washing motor may remain unchanged when the speed of the washing motor approximates the speed of the dehydrating motor by a predetermined value in the dehydrating step. Consequently, the speeds of both motors can be maintained approximately at the same value.

In an eleventh preferred form, the full-automatic washing machine further comprises an inverter main circuit for controlling a speed of the dehydrating motor and brake applying means for applying an electric brake via the inverter main circuit to the dehydrating motor when brake is required in the dehydrating step. The rotatable tub is rotated at high speeds during the dehydration step. Accordingly, the laundry often adheres to an inner surface of the rotatable tub in the dehydration step. In this case, the laundry adheres to the agitator in smaller cases. Since only the rotatable tub needs to be braked, only the dehydrating motor is turned to the brake control mode. Consequently, the brake control is easier and an electric power consumption is decreased as compared with the case where both of the dehydrating and washing motors are turned into the brake control mode. This control manner can be applied to a case where the washing and dehydrating motors are driven by the respective dedicated inverter main circuits and to a case where output of a single inverter main circuit is supplied selectively to the washing or dehydrating motor. In this case, the dehydrating motor may comprise a brushless motor, and the brake applying means has as brake modes a phase lag energization mode, a reverse sequence energization mode or a winding short-circuiting mode and effects any one of the modes or a combination of two or more modes. Further, the brake applying means preferably applies the electric brake to both of the washing and dehydrating motors when brake is required in the dehydrating step. Since both motors are turned to the brake control mode, a large braking force can reliably and rapidly be applied to both the rotatable tub and the agitator. This brake control mode is suitable for an emergency brake.

In a twelfth preferred form, the brake applying means applies the electric brake first to the washing motor and subsequently to the dehydrating motor when brake is required in the dehydrating step. In this arrangement, a large braking force is obtained at an initial stage of the braking, and accordingly, this braking mode is suitable for a case where the braking needs to be rapidly effected. This control manner may be applied to the arrangement that the washing and dehydrating motors are driven by the respective inverter main circuits and the arrangement that output of a single inverter main circuit is supplied selectively to the washing or dehydrating motor. Further, the aforesaid brake control mode is preferably a reverse sequence energization mode. Additionally, when at least one of the washing and dehydrating motors comprises a brushless motor, the brake control means has, as the brake control mode applied to the brushless motor, a phase lag energization mode or a winding short-circuiting mode, or a combination of the modes.

In a thirteenth preferred form, at least one of the washing and dehydrating motors comprises a brushless motor and the brake control means has, as the brake control mode applied to the brushless motor, a phase lag energization mode. A phase or a motor output is determined or changed according to a rotational speed of the dehydrating motor. At least one of the washing and dehydrating motors may comprise a brushless motor in the arrangement that only the dehydrating motor is turned to the brake control mode when the brake is required at the dehydration step or in the arrangement that both of the washing and dehydrating motors are turned to the brake control mode. The phase lag energization mode may be employed as the brake control mode. According to the arrangement, the brake control mode for the brushless motor is the phase lag energization mode and the phase or motor output is determined or changed according to the speed of the dehydrating motor. Consequently, the braking force can readily be controlled.

In a fourteenth preferred form, at least one of the washing and dehydrating motors comprises a brushless motor, and the brake control means has, as the brake control mode applied to the brushless motor, a phase lag energization mode. In this arrangement, the washing machine further comprises direct-current power supply forming means, power supply voltage detecting means for detecting a power supply voltage of the direct-current power supply forming means while the brushless motor is being braked in the phase lag energization mode, a discharge resistor, and discharging means for causing the discharge resistor to consume power when a result of detection by the power supply voltage detecting means is at or above a predetermined voltage. According to this arrangement, a regenerative power is supplied from the washing or dehydrating motor comprising the brushless motor to the direct-current power supply when the brake control is effected in the phase lag energization mode. Consequently, a regenerative brake force is generated. When the regenerative power is excessively large, there is a possibility that electrical parts of the inverter main circuit at the direct-current power supply side may be broken. In the above-described arrangement, however, the power supply voltage detecting means provided for detecting the power supply voltage of the direct-current power supply forming means detects the regenerative power. When the detected regenerative power is at or above the predetermined voltage, the discharging means is provided for causing the discharge resistor to consume power. As a result, the regenerative power applied to the power-supply forming means can be rendered smaller and accordingly, electrical parts at the direct current power supply forming means side can be prevented from breakage. This allows use of electrical parts having low withstand voltage and reduces the manufacturing cost of the washing machine.

The full-automatic washing machine preferably further comprises detecting means for detecting a reduction degree of a rotational speed of the rotatable tub when the dehydrating motor is braked during the dehydrating step, thereby determining or changing output or an energization phase of the dehydrating motor according to a result of detection. Consequently, the braking force can be adjusted according to rotation of the rotatable tub and a braking time can be adjusted. Further, when a difference between the speeds of the dehydrating and washing motors is larger than a predetermined value, the brake control means preferably controls either motor rotating at a higher speed so that the speed of said either motor approximates the speed of the other motor rotating at a lower speed. When the speed difference between the washing and dehydrating motors driven under the brake control mode is small, the wringing effect can be achieved as described above. On the other hand, when the speed difference is large, there is a possibility that the laundry may be damaged. In the above-described arrangement, however, the speeds of the motors are approximated to each other when the speed difference is at or above the predetermined value. Consequently, the laundry can be prevented from damage. In this case, since a higher speed of one motor is approximated to the speed of the other motor, the braking time can be prevented from being prolonged.

In a fifteenth preferred form, the winding short-circuiting means performs a winding short-circuiting operation while the machine is powered off. For example, an inertia force rotates the rotatable tub when a power supply plug of the washing machine is inadvertently pulled off during high-speed rotation of the rotatable tub in the dehydration step, or when the power supply is cut off due to occurrence of power stoppage etc. A problem arises when a user opens a lid during rotation of the rotatable tub due to inertia. In the above-described arrangement, however, the winding short-circuiting means performs the winding short-circuiting operation when power is cutoff. Consequently, the rotatable tub can immediately be stopped.

In a sixteenth preferred form, the full-automatic washing machine further comprises control means for controlling a washing operation, the control means having a washing control mode in which a dehydration brake control is executed in the dehydrating step and thereafter, a stored-water rinse step is executed, the control means starting a water supply operation during the dehydrating brake control. In the store-water rinse mode, water is supplied into the rotatable tub and reserved therein and the agitator is then driven. In the above-described arrangement, water supply is started during the dehydration brake control at the dehydration step immediately before the stored-water rinse step. The brake control and the water supply are performed in parallel. Consequently, a water supply time at the stored-water rinse step can be reduced or rendered null and accordingly, a required time of the stored-water rinse step and a washing time can be reduced. In the conventional washing machines with the clutch mechanism, the drain valve is open during rotation of the rotatable tub as described above, so that water cannot be supplied to the tub during rotation of the rotatable tub.

BRIEF DESCRIPTION OF THE DRAWINGS

Other objects, features and advantages of the present invention will become clear upon reviewing the following description of the preferred embodiments, made with reference to the accompanying drawings, in which:

FIGS. 6A to 6I show output of a Hall IC and ON-OFF timing of switching elements;

FIG. 20 shows relationship among the rotational speed, energizing phase, and motor output;

FIG. 22 shows the relationship among the speed reduction degree, energizing phase, and motor output;

FIG. 30 is a flowchart showing a dehydration step in the washing machine of a tenth embodiment in accordance with the present invention;

DETAILED DESCRIPTION OF THE PREFERRED EMBODIMENTS

Figure 1:
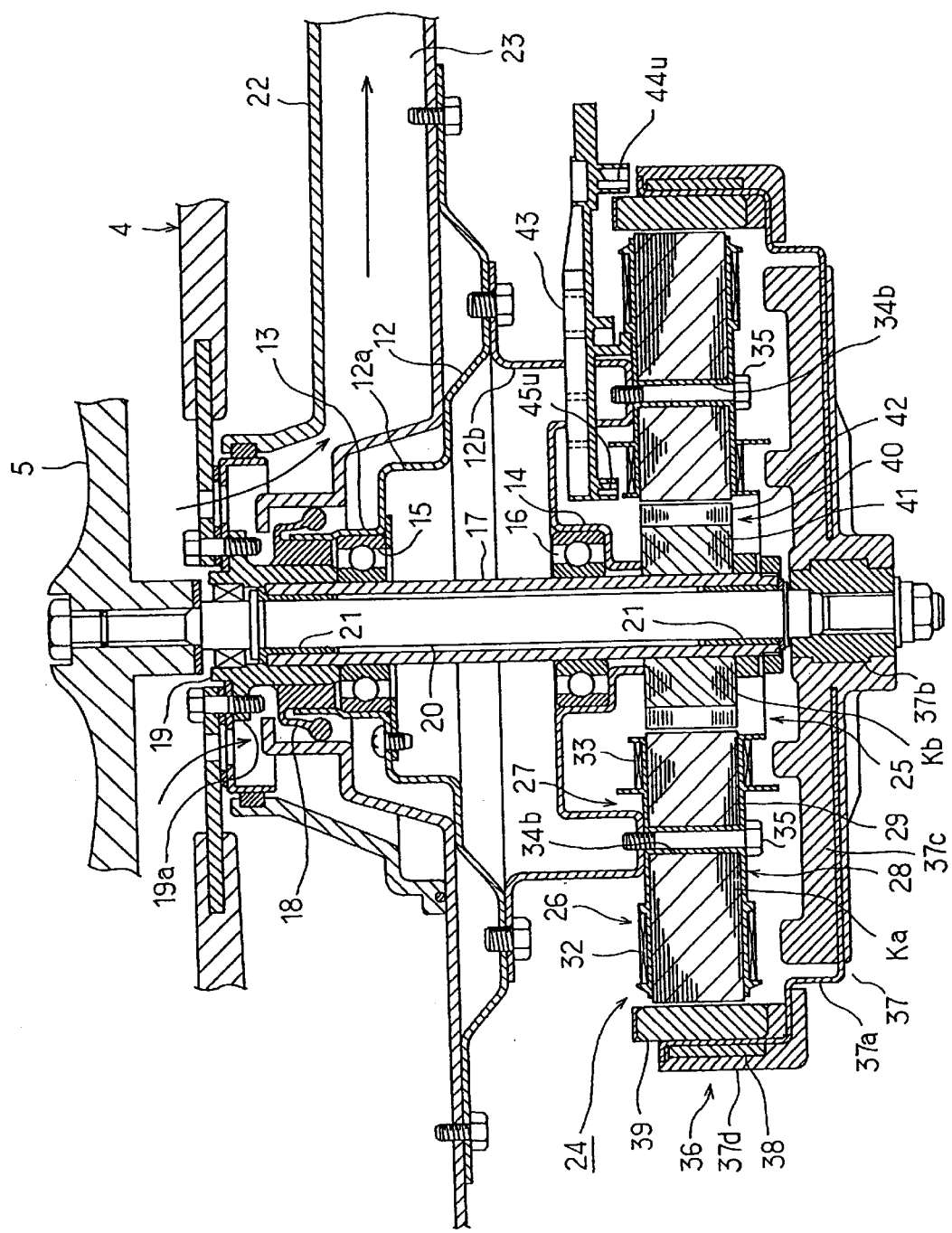
FIG. 1 is a longitudinally sectional side view of a driving mechanism including motors in a full-automatic washing machine of a first embodiment in accordance with the present invention.

A first embodiment of the present invention will be described with reference to FIGS. 1 to 14. Referring first to FIG. 2, a full-automatic washing machine in accordance with the invention is shown. The washing machine comprises an outer cabinet 1 in which an outer tub 2 is elastically supported on a plurality of elastic suspension mechanisms 3 one of which is shown in FIG. 2. A rotatable tub 4 is rotatably mounted in the outer tub 2 and serves as a wash tub and a dehydration tub. An agitator 5 is rotatably mounted in the rotatable tub 4.

The rotatable tub 4 includes a gradually upwardly spreading cylindrical tub body 4a, an inner cylinder 4b provided inside the tub body 4a to define a water passing space, and a balancing ring 4c mounted on an upper end of the tub body 4a. Upon rotation of the rotatable tub 4, a resultant centrifugal force raises water therein, which is then discharged into the outer tub 2 through dehydration holes (not shown) formed in the upper portion of the tub body 4a.

The outer tub 2 has a tub shaft hole 6 and a drain hole 7 formed in the bottom thereof. A drain hose 9 provided with a drain valve 8 comprising an electromagnetic valve is connected to the drain hole 7. The drain valve 8 is opened when energized and closed when deenergized. The outer tub 2 further has an auxiliary drain hole 7a formed in the bottom thereof and connected via a connecting hose (not shown) to the drain hose 9, bypassing the drain valve 8. The auxiliary drain hole 7a drains the water discharged into the outer tub 2 by the rotation of the rotatable tub 4.

A top cover 1a is mounted on the top of the outer cabinet 1. A lid 1b is mounted on the top cover 1a. An electronic components unit 10 is provided in a front interior of the top cover 1a. A water-supply valve 11 comprising an electromagnetic valve is provided in a rear interior of the top cover 1a for supplying water into the rotatable tub 4.

Figure 2:
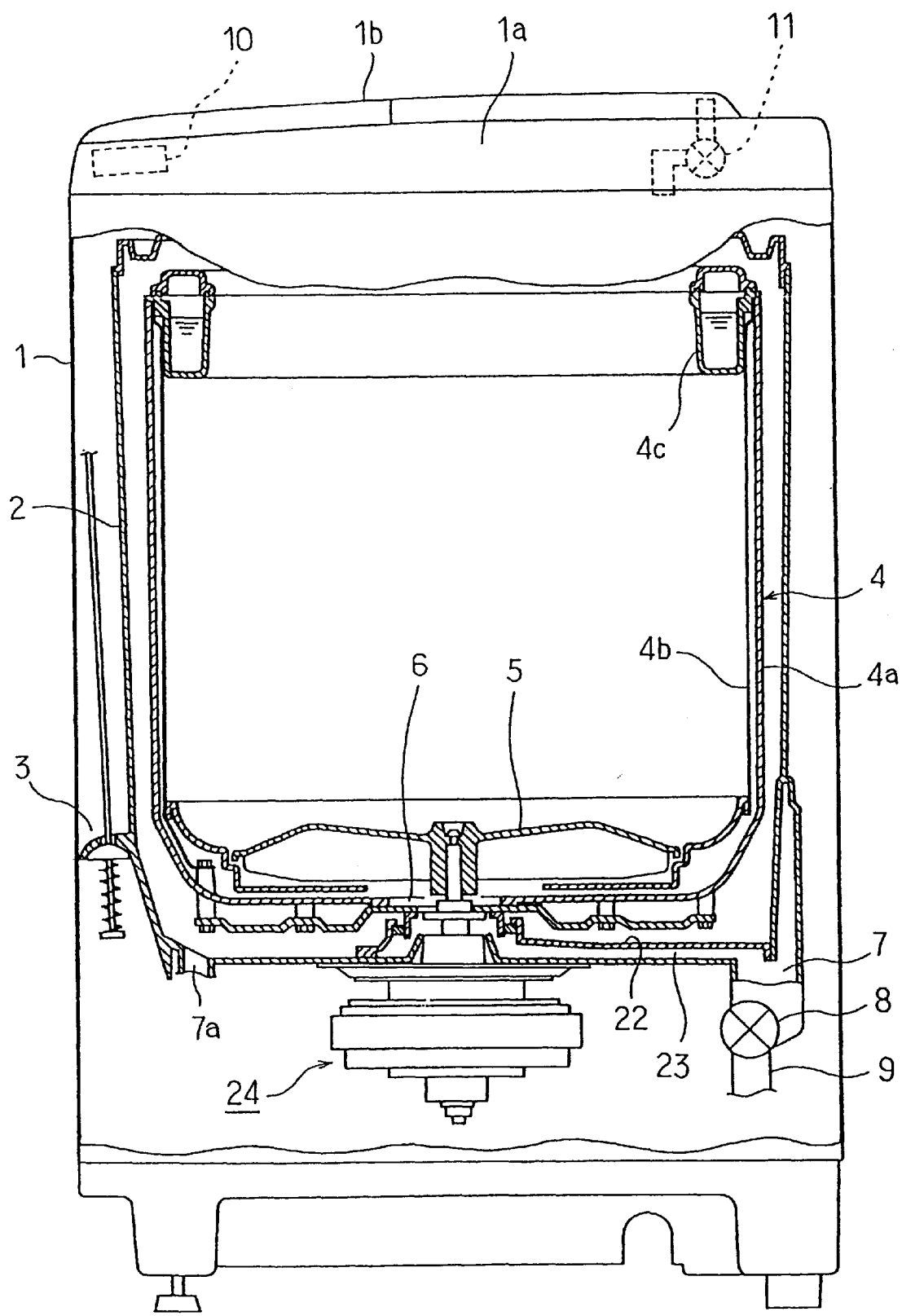
FIG. 2 is a longitudinally sectional side view of the washing machine.

Referring now to FIG. 1, a mounting frame 12 is mounted on a backside of the outer tub 2. The mounting frame 12 includes an upper frame 12a and a lower frame 12b. The upper frame 12a has an upwardly open cylindrical portion 13 formed on the center thereof. The lower frame 12b has a downwardly open cylindrical portion 14 formed in the center thereof. Two bearings 15 and 16 comprising ball bearings are provided in the cylindrical portions 13 and 14 respectively. A hollow tub shaft 17 extends through and is supported on the bearings 15 and 16. A seal 18 is fitted in the cylindrical portion 13 to be located over the bearing 15.

A support cylinder 19 having a flange 19a is mounted on an upper portion of the tub shaft 17 so as to be rotated with the tub shaft. An agitator shaft 20 extends through the hollow interior of the tub shaft 17 to be rotatably mounted on, for example, two metal bearings 21 provided in the tub shaft. An upper end of the agitator shaft 20 protrudes from the support cylinder 19 and a lower end thereof protrudes from the lower end of the tub shaft 17. The rotatable tub 4 is mounted on the flange 19a of the support cylinder 19 so as to be rotated therewith. The agitator 5 is mounted on the upper end of the agitator shaft 20 so as to be rotated therewith.

A drain cover 22 is attached to the bottom of the outer tub 2 as shown in FIGS. 1 and 2. The drain cover 22 defines a drain passage 23 extending from the bottom of the rotatable tub 4 to the drain valve 8 of the drain hole 7. Accordingly, when supplied into the rotatable tub 4 with the drain valve 8 being closed, water is reserved in the tub and the drain passage 23. When the drain valve 8 is opened, the water in the rotatable tub 4 is drained through the drain passage 23 as shown by arrows in FIG. 1.

Figure 3:
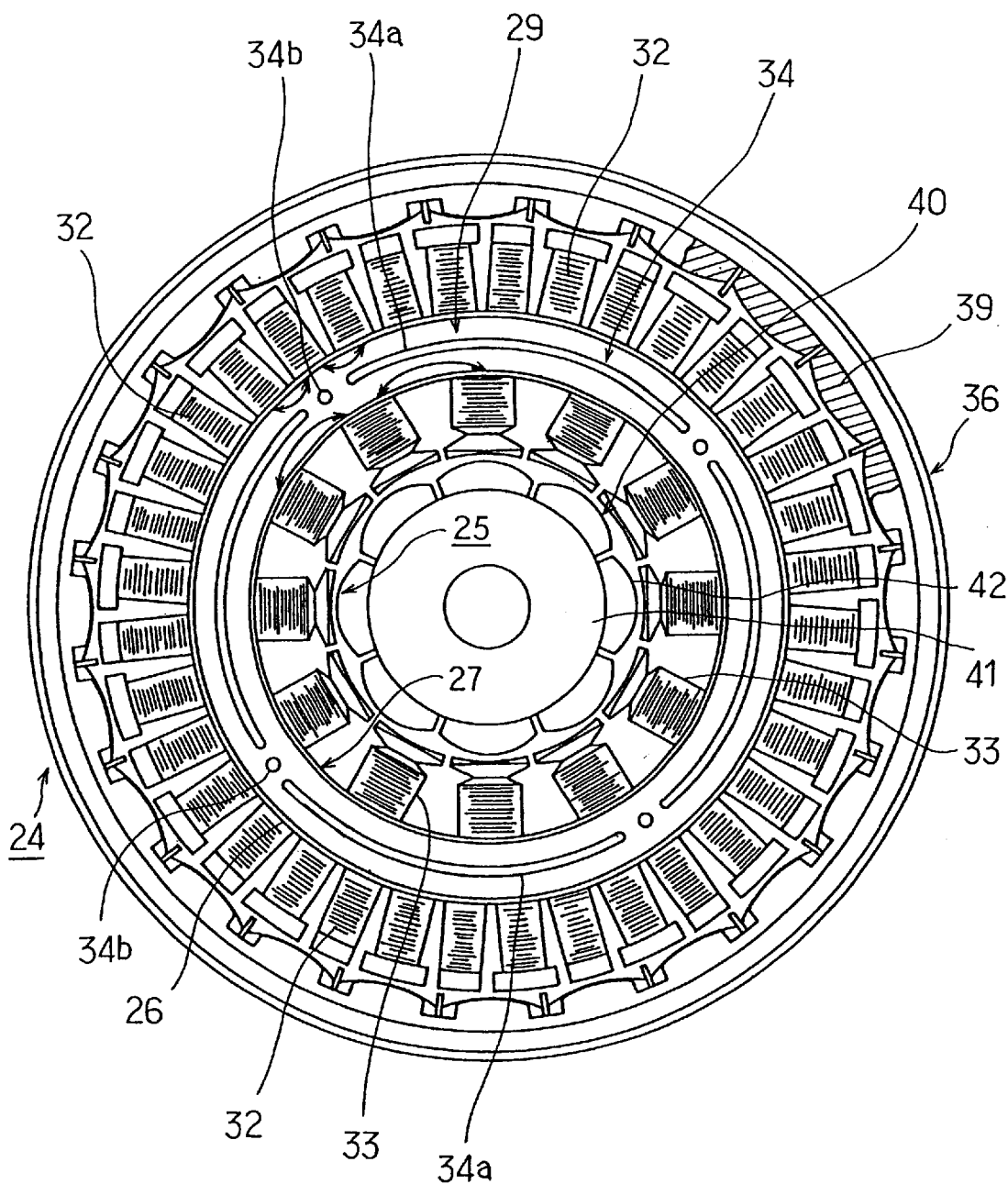
FIG. 3 is a plan view of the motors.
Figure 4:
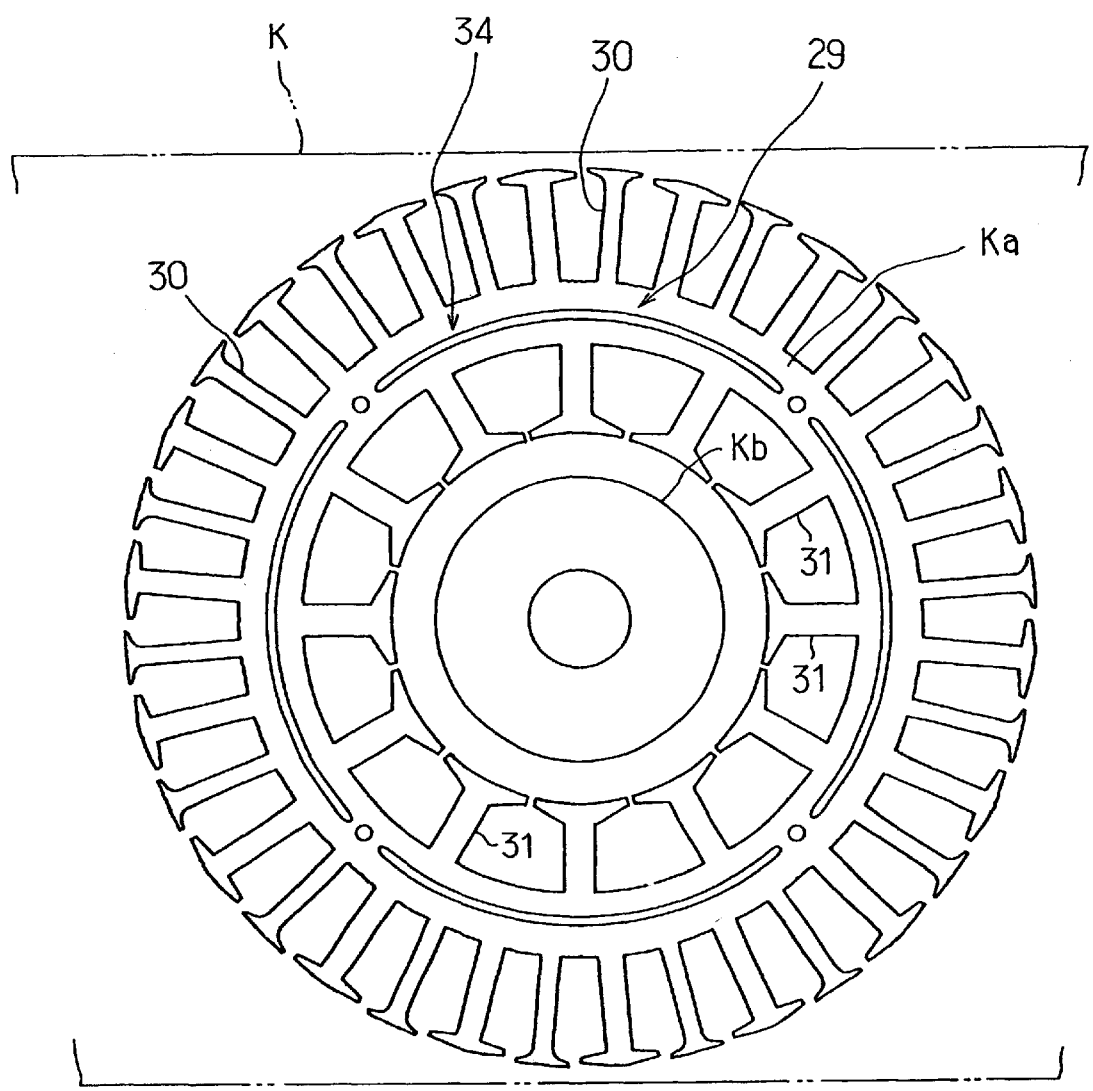
FIG. 4 shows a material for a stator core and a rotor core.

A stator unit 28 is mounted on the mounting frame 12 on the backside of the outer tub 2. The stator unit 28 constitutes stators 26 and 27 of washing and dehydrating motors 24 and 25 respectively. Each of the motors 24 and 25 comprises a brushless motor or more specifically, a DC brushless motor and is constructed into a radial gap type. The stator unit 28 comprises a stator core 29 formed by stacking a number of metal core sheets Ka. The stator core 29 has a number of teeth 30 formed on an outer circumference thereof and a plurality of teeth 31 formed on an inner circumference thereof as shown in FIGS. 3 and 4. Washing motor stator windings 32 are wound on the outer circumferential teeth 30, whereas dehydrating motor stator windings 33 are wound on the inner circumferential teeth 31. The stator core 29 has between the stator windings 32 and 33 of the washing and dehydrating motors 24 and 25 a void or hole 34 for preventing magnetic interference therebetween. In the embodiment, the void 34 includes four arc-shaped void sections 34a and four circular void sections 34b disposed circumferentially alternately as shown in FIG. 3. Particularly each circular void section 34b is located at a portion of the stator core 29 where a magnetic flux density is lower than the other portion thereof and more specifically, in a middle portion of the adjacent teeth 31. Flux flow is shown by arrows in FIG. 3.

The circular void sections 34b are used to fix the stator core 29 to a stationary member. More specifically, as shown in FIG. 1, a screw 35 made of a non-conductive material such as stainless steel is inserted through each circular void section 34b and screwed into the lower frame 12b so that the stator core 29 is mounted to the lower frame. An insulating coat is formed on an outer surface of the stator core 29 including inner faces of the circular void sections 34b. An outer circumferential portion of the stator core 29 outside the void 34 constitutes a washing motor stator core 26, whereas an inner circumferential portion of the stator core 29 inside the void 34 constitutes a dehydrating motor stator core 27.

The washing motor 24 is constructed into an outer rotor type in which a rotor 36 thereof is rotated outside an armature (not shown). The washing motor 24 is mounted directly to the lower end of the agitator shaft 20. The rotor 36 includes a rotor housing 37, a rotor yoke 38 and rotor magnets 39. The rotor housing 37 is formed by integrating a rotor frame 37a and a boss shaft 37b by insert molding of a resin material 37c. The rotor yoke 38 and the rotor magnets 39 are also formed along the outer circumference of the rotor frame 37a by the insert molding of a resin material 37d. The dehydrating motor 25 is constructed into an inner rotor type in which a rotor 40 is disposed inside the stator. The rotor 40 of the dehydrating motor 25 includes a rotor core formed by stacking a number of metal core sheets Kb and rotor magnets 42 mounted on the outer circumference of the rotor core 41. The rotor 40 is mounted directly to the outer circumference of the tub shaft 17 so as to be rotated therewith.

The washing motor 24 of the outer rotor type has a larger diameter than the dehydrating motor 25. The washing and dehydrating motors 24 and 25 are disposed in an outside and inside relation. Since the rotor of the washing motor 24 has a larger diameter and a larger number of poles than the rotor of the dehydrating motor 25, the washing motor 24 has a low-speed and high-torque characteristic relative to the dehydrating motor 25. Conversely, the dehydrating motor 25 has a high-speed and low-torque characteristic relative to the washing motor 24. See FIG. 14.

In the manufacture of the motors, the core sheet Ka of the stator core 29 and the core sheet Kb of the rotor core 41 smaller than the stator core 29 are laid out on one and the same core material K such as a silicon steel sheet so that the core sheet Kb of the rotor core 41 is inside the core sheet Ka of the stator core 29. In other words, the stator core 29 is larger than the rotor core 41, and they are laid out on a single core material so that the small rotor core is located inside the large stator core. Thus, a part of the core material inside the large stator core 29, which part becomes waste, is utilized as the small rotor core 41. This results in a reduction in the material cost. Although the stator core is larger than the rotor core in the embodiment, the rotor core may be larger than the stator core.

Figure 5:
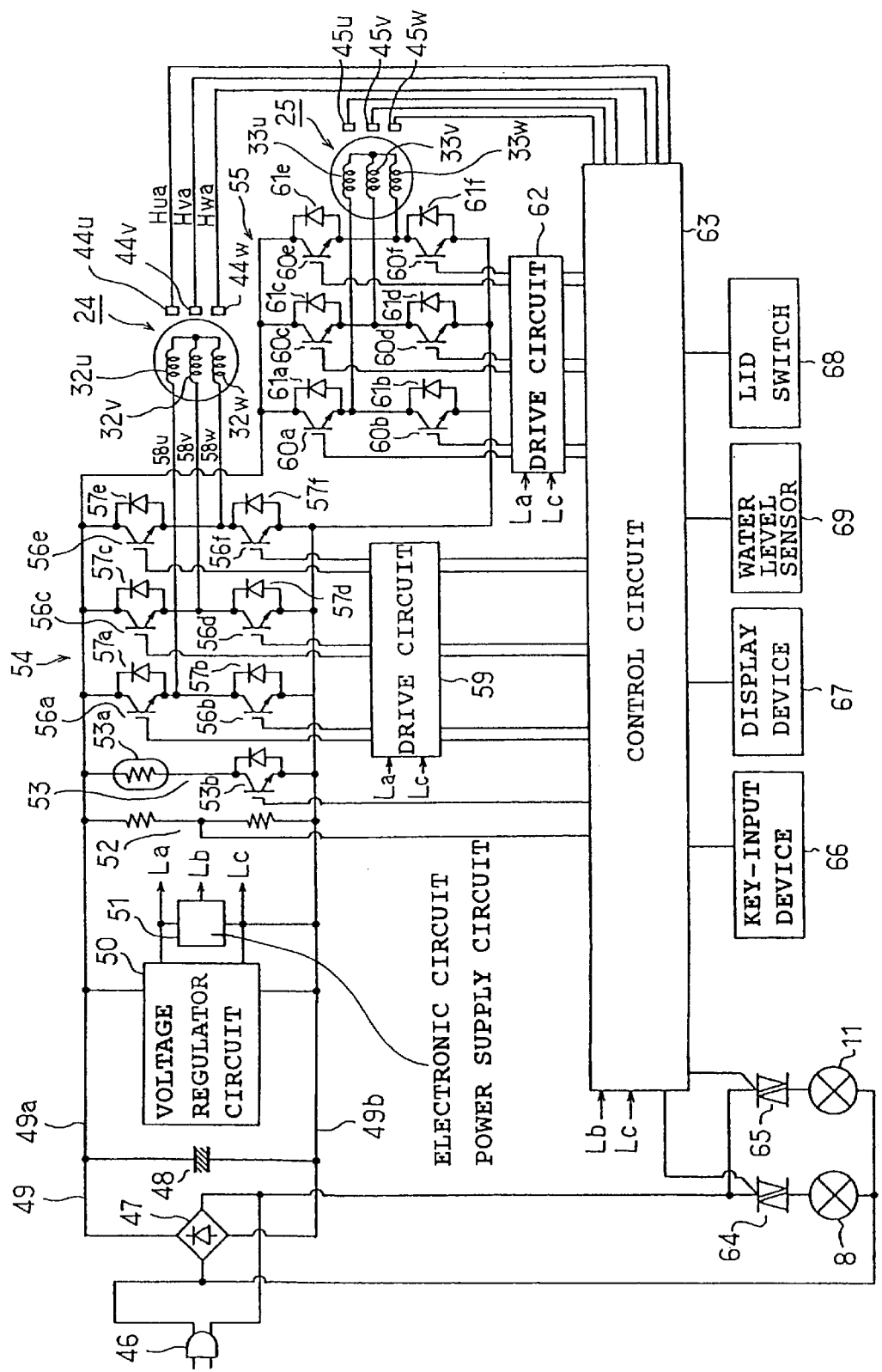
FIG. 5 is a circuit diagram showing an electrical arrangement of the washing machine.

A single plastic sensor casing 43 is mounted on the stator core 29. The sensor casing 43 holds therein Hall ICs 44u, 44v, 44w, 45u, 45v and 45w. The Hall ICs 44u, 44v and 44w serve as position detecting means for detecting a rotational position of the rotor 36 of the washing motor 24. only the Hall IC 44u is shown in FIG. 1 and the three Hall ICs 44u, 44v and 44w are shown in FIG. 5. The Hall ICs 45u, 45v and 45w serve as position detecting means for detecting a rotational position of the rotor 40 of the dehydrating motor 25. Only the Hall IC 45u is shown in FIG. 1 and the three Hall ICs 45u, 45v and 45w are shown in FIG. 5. The Hall ICs 44u–44w and 45u–45w are held in the single sensor casing 43 to be unitized.

The Hall ICs 44u–44w deliver position signals Hua, Hva and Hwa which are shifted by a predetermined electrical angle relative to phase induced voltages of the washing motor 24 respectively as shown in FIG. 6. The Hall ICs 45u–44w also deliver position signals Hub, Hvb and Hwb which are shifted by a predetermined electrical angle relative to phase induced voltages of the dehydrating motor 25 respectively.

The electrical arrangement of the full-automatic washing machine will now be described with reference to FIG. 5. Both terminals of a plug 46 connected to a commercial alternating current power supply of 100 V are connected to input terminals of a full-wave rectifier circuit 47 comprising a diode bridge. A smoothing capacitor 48 is connected between output terminals of the full-wave rectifier circuit 47. The full-wave rectifier circuit 47 and the smoothing capacitor 48 constitute a direct current power supply circuit 49 serving as direct current power supply forming means. The dc power supply circuit 49 delivers a dc power supply voltage of 140 V. Direct current bus bars 49a and 49b extend from output terminals of the dc power supply circuit 49. A voltage regulator circuit 50 is connected between the dc bus bars 49a and 49b. The voltage regulator circuit 50 delivers a dc drive voltage of 15 V. An electronic circuit power supply circuit 51 is connected to the voltage regulator circuit 50. The electronic circuit power supply circuit 51 delivers a dc power supply voltage of 5 V for electronic circuits.

A power supply voltage detecting circuit 52 serving as power supply voltage detecting means is also connected between the dc bus bars 49a and 49b. The power supply voltage detecting circuit 52 comprises a voltage divider circuit. Further, a discharge circuit 53 serving as discharging means is connected between the dc bus bars 49a and 49b. The discharge circuit 53 comprises a series circuit of a discharge resistor 53a and a switching element 53b. Additionally, washing and dehydrating motor inverter main circuits 54 and 55 are connected between the dc bus bars 49a and 49b.

The washing motor inverter main circuit 54 comprises three-phase bridge-connected switching elements 56a to 56f such as IGBTs and free-wheel diodes 57a to 57f connected in parallel with the respective switching elements. The washing motor inverter main circuit 54 has output terminals 58u, 58v and 58w connected to three-phase windings 32u, 32v and 32w of the washing motor 24 respectively. The switching elements 56a to 56f have respective control terminals (gates) connected to a drive circuit 59 comprising, for example, a photocoupler.

The dehydrating motor inverter main circuit 55 has the same arrangement as the washing motor inverter main circuit 54. That is, the dehydrating motor inverter main circuit 55 comprises switching elements 60a to 60f and free-wheel diodes 61a to 61f. The dehydrating motor inverter main circuit 55 has output terminals 61u, 61v and 61w connected to three-phase windings 33u, 33v and 33w of the dehydrating motor 25 respectively. Further, the switching elements 60a to 60f have respective control terminals (gates) connected to a drive circuit 62 comprising, for example, a photocoupler.

A control circuit 63 comprises PWM circuits, a microcomputer storing a washing operation control program, and a triac driving circuit. With respect to the washing motor 24, the control circuit 63 constitutes washing motor drive control means performing variable speed control together with the inverter main circuit 54 and the drive circuit 59. With respect to the dehydrating motor 25, the control circuit 63 constitutes dehydrating motor drive control means performing variable speed control together with the inverter main circuit 55 and the drive circuit 62. Further, the control circuit 63 detects rotational speeds of the washing and dehydrating motors 24 and 25 based on the signals delivered from the Hall ICs 44u–44w and 45u–45w respectively.

The drive circuit 59 for the washing motor 24 is controlled by signals delivered from the washing motor PWM circuit of the control circuit 63 to control the switching elements 56a to 56f so that the switching elements are turned on and off. Further, the drive circuit 62 for the dehydrating motor 25 is controlled by signals delivered from the dehydrating motor PWM circuit of the control circuit 63 to control the switching elements 60a to 60f so that the switching elements are turned on and off.

In drive of the washing motor 24, the control circuit 63 is supplied with the position signals Hua, Hva and Hwa shifted by the predetermined electrical angle relative to phase induced voltages of the washing motor 24 respectively as shown in FIGS. 6A–6I. Based on the signals, the control circuit 63 detects a generation timing of the induced voltage, namely, a rotor position. The control circuit 63 turns on and off each of the switching elements 56a to 56f in synchronization with a predetermined relation of a phase between each induced voltage and the corresponding phase winding current (commutation). Further, the control circuit 63 adjusts a PWM duty ratio or an effective value of the voltage applied to the motor so that a predetermined motor output is obtained. The aforesaid duty ratio control is performed in an ON period of at least upper-stage switching elements although this is not shown.

Referring to FIGS. 6D to 6I showing ON-OFF states of the respective switching elements 56a to 56f, solid line denotes a timing by which the induced voltage becomes in phase with the winding current (normal energization timing). Dotted line denotes a timing by which the winding current leads the induced voltage by 30 degrees (30-degree phase lead energization timing). Two dot chain line denotes a timing by which the winding current lags the induced voltage by 30 degrees (30-degree phase lag energization timing).

A series circuit of a triac 64 and the drain valve 8 is connected between both terminals of the plug 48. A series circuit of a triac 65 and the water supply valve 11 is also connected between both terminals of the plug 48. The triacs 64 and 65 are controlled so as to be turned on and off by the control circuit 63. A key-input device 66 and a display device 67 are connected to the control circuit 63. The key-input device 66 includes a start switch for starting and also interrupting the operation of the washing machine and a washing course selecting switch although these switches are not shown. The display device 67 displays washing courses and other various control contents. Further, a lid switch 68 and a water level sensor 69 are connected to the control circuit 63. The lid switch 68 detects closed and open states of the lid 1b shown in FIG. 2. The water level sensor 69 detects a water level in the rotatable tub 4.

Figure 7:
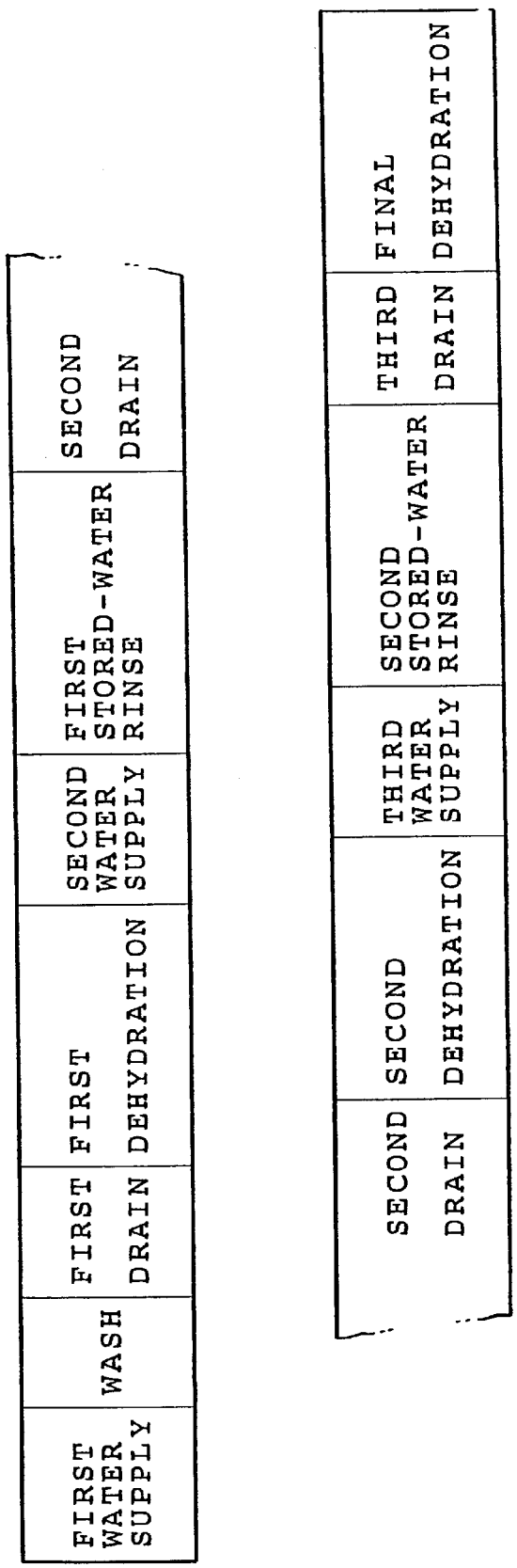
FIG. 7 shows contents of a STANDARD course.

The control circuit 63 stores various washing course programs. FIG. 7 shows a STANDARD course. In the STANDARD course, the washing machine executes a first water supply, a wash step, a first drain step, a first dehydration step, a second water supply step, a first stored-water rinse step, a second drain step, a second dehydration step, a third water supply step, a second stored-water rinse step, a third drain step, and a final dehydration step sequentially in this order. The user puts laundry to be washed and detergent into the rotatable tub 4 before the washing operation is started.

Figure 8:
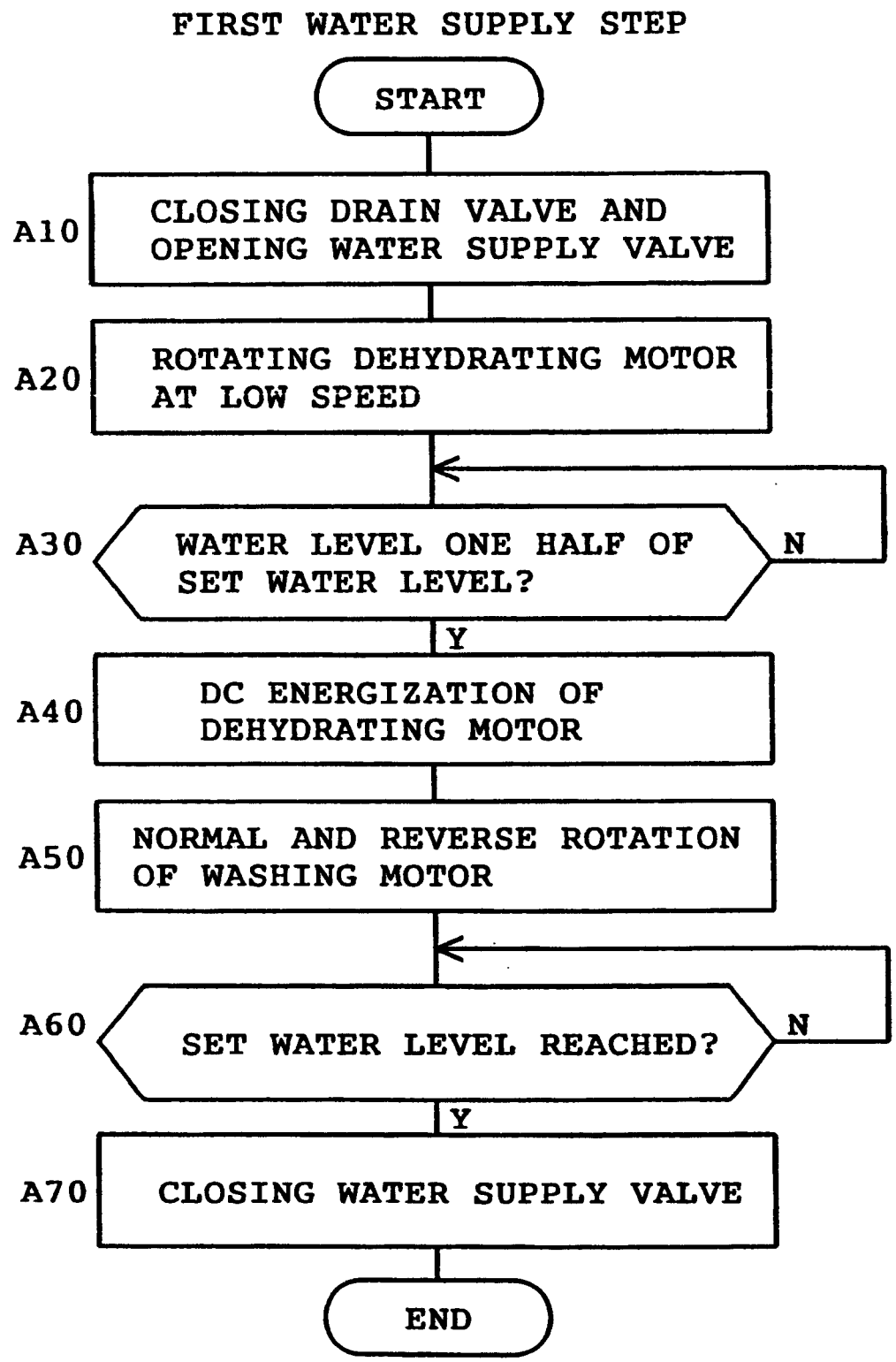
FIG. 8 is a flowchart showing a first water-supply step.

A control manner shown in FIG. 8 is executed at the first or initial water supply step. At step A10, the drain valve 8 is deenergized and the water supply valve 11 is energized to be opened, so that water is supplied into the rotatable tub 4. The dehydrating motor 25 is rotated in the normal direction at a relatively low speed at step A20. The control circuit 63 compares, with a water level set for the STANDARD course, a detection water level (water level during water supply) delivered from the water level sensor 69. The control circuit 63 determines whether the detection water level is equal to one half of the set water level. When determining that the detection water level is equal to one half of the set water level, the control circuit 63 advances to step A40.

The dehydrating motor 25 is dc-energized at step A40. More specifically, the switching elements 60a to 60f of the inverter main circuit 55 for the dehydrating motor 25 are maintained in a pattern of ON-OFF state for a predetermined time, and the dc current is supplied to the windings 33u, 33v and 33w. As a result, the dehydrating motor 25 is turned into a brake control mode such that the rotatable tub 4 is braked to be stopped. The control circuit 63 then advances to step A50 to rotate the washing motor 24 intermittently alternately in the normal and reverse directions at a predetermined speed. The control circuit 63 then determines at step A60 whether the detection water level has reached the set water level. When determining that the detection water level has reached the set water level, the control circuit 63 advances to step A70 to deenergize the water supply valve 11 to close it, thereby ending the water supply.

In the above-described first water supply, the dehydrating motor 25 is first rotated at the low speed so that the rotatable tub 4 accommodating the laundry is rotated at the low speed. Water is supplied through the water supply valve 11 substantially from one location into the rotatable tub 4. The water falls uniformly onto the laundry displacing at the low speed. Thereafter, the washing motor 24 is rotated intermittently alternately in the normal and reverse directions, so that the water and the laundry in the rotatable tub 4 are accordingly moved in the normal and reverse directions. As a result, the detergent is sufficiently dissolved with water. These effects are achieved by performing the rotation transmission switching control to the rotatable tub 4 without being linked to the control of the drain and water supply valves 8 and 11.

Figure 9:
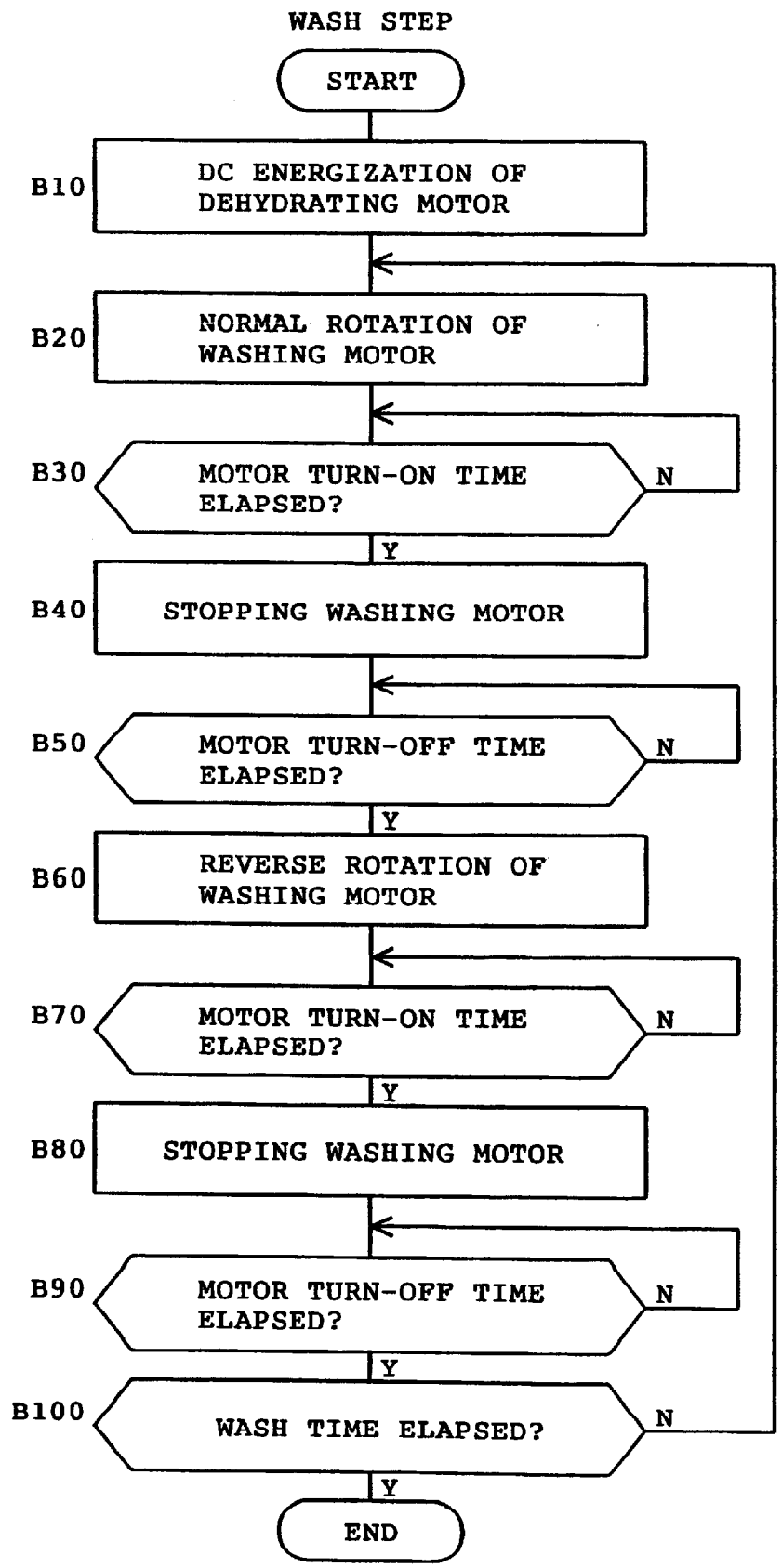
FIG. 9 is a flowchart showing a wash step.

The control circuit 63 controls the wash step in a manner shown in FIG. 9 after having controlled the aforesaid water supply step. At step B10, the dehydrating motor 25 is dc-energized to be stopped. The control circuit 63 then rotates the washing motor 24 alternately in the normal and reverse directions so that a predetermined speed is reached. More specifically, the washing motor 24 is rotated at the predetermined speed in the normal direction for a set motor ON time at steps B20 and B30. The washing motor 24 is then stopped for a set motor OFF time at steps B40 and B50. Further, the washing motor 24 is rotated in the reverse direction in the same manner as described above and then stopped at steps B60 to B90. Thereafter, the control circuit 63 advances to step B100 to determine whether a set wash time has elapsed. When determining that the set wash time has elapsed, the control circuit 63 ends the wash step. The control circuit 63 returns to step B20 when determining that the set wash time has not elapsed. In the control for stopping the washing motor 24 at each of steps B40 and B80, an energization phase may be controlled or the washing motor 24 may be deenergized.

In the aforesaid wash step, the washing motor 24 and accordingly, the agitator 5 is driven intermittently alternately in the normal and reverse directions, so that the water and laundry in the rotatable tub 4 are moved alternately in the normal and reverse directions such that a cleaning action is obtained. In this case, it is considered that the rotatable tub 4 may be rotated with the agitator 5. However, the dehydrating motor 25 is dc-energized so as to be turned into the brake mode. Consequently, the rotatable tub 4 remains stationary.

Figure 10:
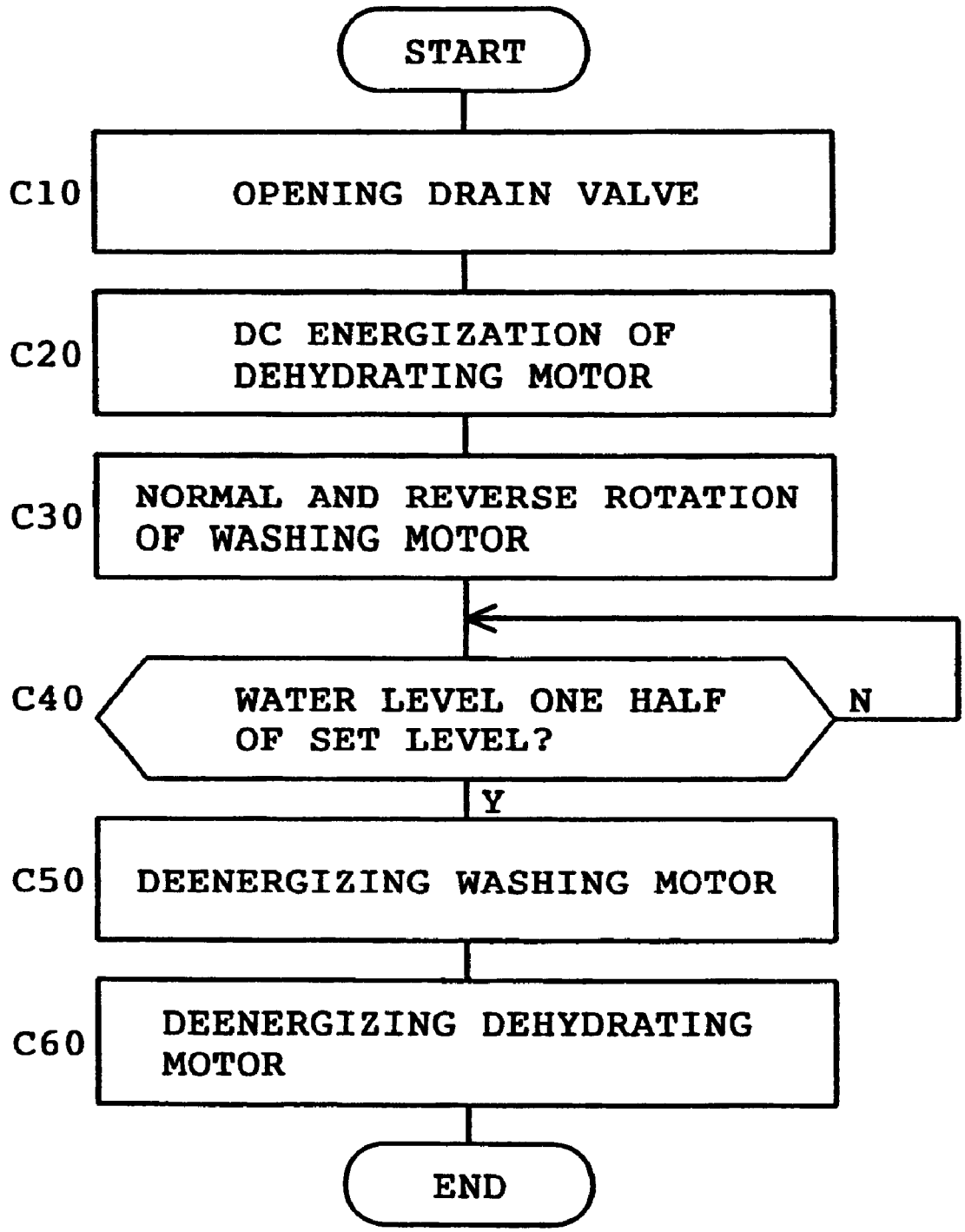
FIG. 10 is a flowchart showing a first drain step.

Thereafter, the first drain step is executed as shown in FIG. 10. The drain valve 8 is energized to be opened at step C10. As a result, the wash liquid is discharged from the rotatable tub 4. The dehydrating motor 25 is dc-energized at step C20 to be thereby stopped. The washing motor 24 is then rotated at a predetermined speed intermittently alternately in the normal and reverse directions at step C30. When determining at step C40 that the detection water level has reached one half of the set water level, the control circuit 63 deenergizes the washing motor 24 to stop it at step C50 and further deenergizes the dehydrating motor 25 at step C60. In the drain step, the washing motor 24 is rotated in the normal and reverse directions while the wash liquid is being discharged. Consequently, since the water level is reduced with the laundry being moved suitably in the rotatable tub 4, the laundry is uniformly placed in the rotatable tub 4. This prevents an unbalanced state of the laundry in a subsequently performed dehydrating operation.

Figure 11:
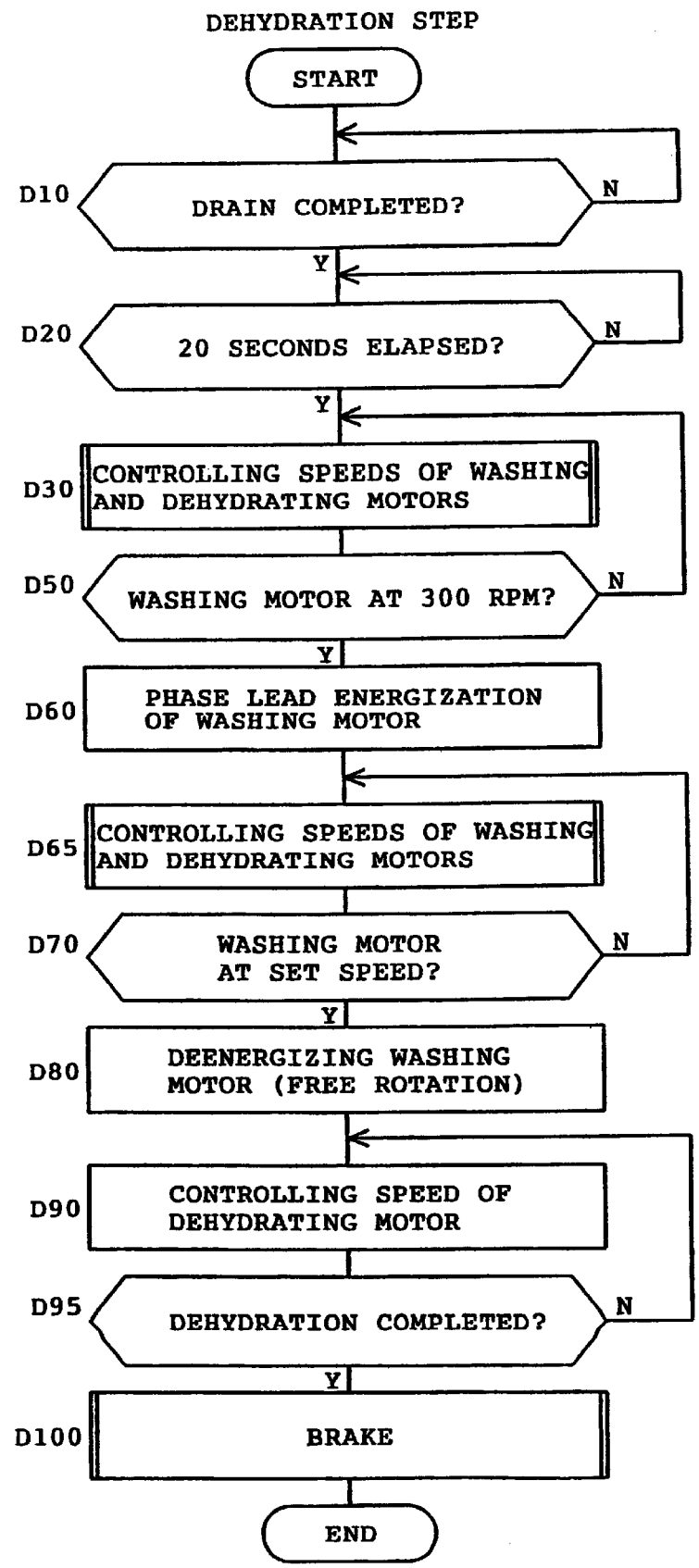
FIG. 11 is a flowchart showing a dehydration step.

The first dehydration step is executed after the above-described drain step as shown in FIG. 11. At step D10, the control circuit 63 determines whether the drain has completed. When the detection water level by the water level sensor 69 has reached a detectable lowest water level, the control circuit 63 determines that the drain has completed. Upon lapse of 20 seconds from the determination at step D10, the control circuit 63 advances from step D20 to D30 where both washing and dehydrating motors 24 and 25 are rotated in the same normal direction, controlling the speeds of both motors or starting the motors. In this case, control sections of the washing and dehydrating motors 24 and 25 are commanded so that target speeds are gradually increased for a short period, at step S10 of FIG. 12. The control circuit 63 then calculates a difference X between a current target speed of the rotatable tub 4 and the current speed (step S20). When the difference X is larger than zero or when the current speed is lower than the target speed (step S30), the control circuit 63 advances to step S40 to increase the output of the washing motor 24 (the PWM duty ratio, an effective value of winding voltage or winding current) by "1.5×K." The numeral, "1.5" is a constant peculiar to the washing motor 24. The control circuit 63 then advances to step S50 to increase the output of the dehydrating motor 25 by "0.4×K." The numeral, "0.4" is a constant peculiar to the dehydrating motor 25.

Figure 15:
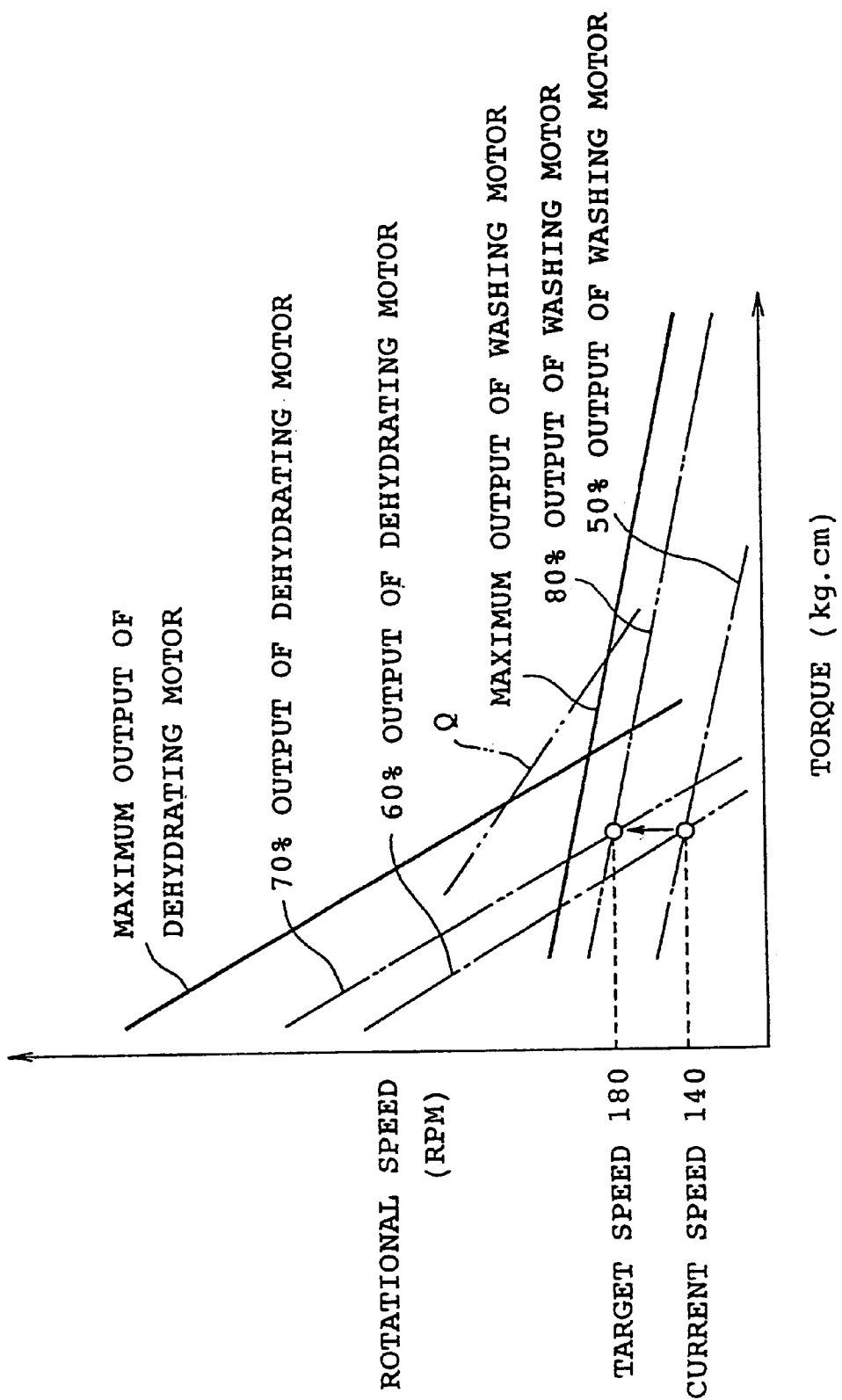
FIG. 15 is a graph showing torque-speed characteristics.

As understood from FIG. 15, the washing and dehydrating motors 24 and 25 are required to be rotated at the same speed in the dehydration step. However, the washing and dehydrating motors 24 and 25 have the torque-speed characteristics different from each other. Accordingly, in a case where the speeds of the motors 24 and 25 are increased by the same amount at the same output increase rate, the speed of either the dehydrating motor 25 becomes larger than that of the washing motor 24. Now, assume that the target speed is 180 rpm and the current speed is 140 rpm. In this case, the output of the dehydrating motor 25 needs to be increased from 60% to 70% whereas the output of the washing motor 24 needs to be increased from 50% to 80%. On the other hand, when determining at step S30 that the current speed is equal to or larger than the target speed, the control circuit 63 advances to step S60 to decrease the output of the washing motor 24 by "1.5×K." The control circuit 63 then advances to step S70 to decrease the output of the dehydrating motor 25 by "0.4×K." The control circuit 63 returns to step D50 in FIG. 11 after the processing at step S50 or S70.

When determining at step D50 that the speed of the washing motor 24 has increased to a predetermined value, for example, 300 rpm, the control circuit 63 advances to step D60 to control the washing motor 24 so that an energizing phase leads relative to a previous one. More specifically, the washing motor 24 has a high torque and low speed characteristic. When the energizing phase leads, for example, 30 degrees, relative to the previous one, the torque-speed characteristic is changed to a low torque and high speed characteristic as shown by line Q in FIG. 15. The control circuit 63 then advances to step D65 to control the speeds of the washing and dehydrating motors 24 and 25 in the same manner as at step D30 although a different output increase rate of the washing motor 24 is used with respect to the speed difference X.

When the washing motor 24 has reached a set speed (step D70), the control circuit 63 advances to step D80 to deenergize the washing motor 24 so that it is turned into a free rotation state. The control circuit 63 then advances to step D90 to control the dehydrating motor 25 so that the target speed thereof is maintained. The control circuit 63 further advances to step D95 to determine whether a dehydration finishing condition has been fulfilled, for example, whether a set dehydrating time has expired. When the dehydration finishing condition has been fulfilled, the control circuit 63 advances to step D100 for brake control.

Figure 13:
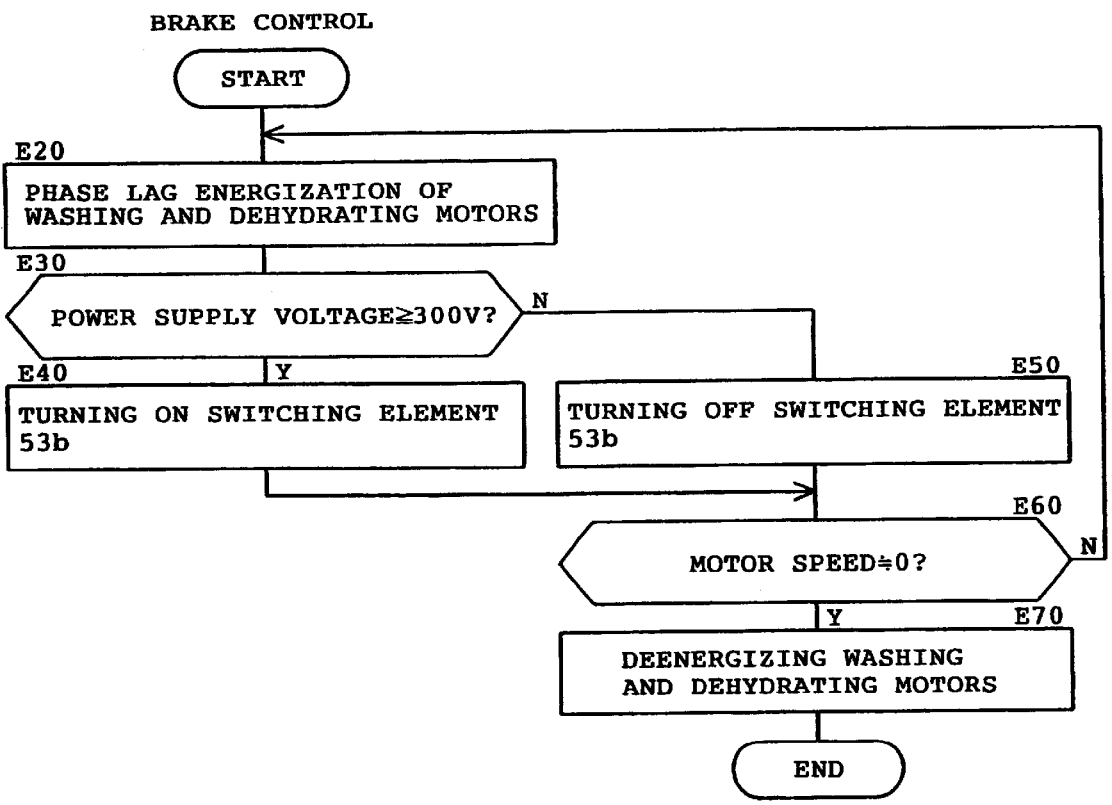
FIG. 13 is a flowchart showing a brake control.

FIG. 13 shows contents of the brake control at step D100. The control circuit 63 sets the washing and dehydrating motors 24 and 25 into a phase lag energization mode (30-degree phase lag energization mode, for example) in which an energizing phase lags behind a previous one, as a brake control mode. Consequently, electric power is regenerated from the washing and dehydrating motors 24 and 25 to the dc power supply circuit 49 such that the capacitor 48 is charged, whereupon a regenerative brake as one type of the electric brake is effected. As a result, the motors 24 and 25 and accordingly, the agitator 5 and the rotatable tub 4 are braked. Simultaneously, the regenerative power increases the power supply voltage of the dc power supply circuit 49. The power supply voltage detecting circuit 52 detects the power supply voltage at step E30. The control circuit 63 determines whether the detected power supply voltage is at or above a predetermined voltage, for example, 300 V. When the detected power supply voltage is at or above 300 V, the control circuit 63 advances to step E40 to turn on the switching element 53b of the discharge circuit 53 so that the regenerative power is consumed by the discharge resistor 53a. When the detected power supply voltage is below 300 V, the control circuit 63 advances to step E50 to turn off the switching element 53b so that the power consumption by the discharge resistor 53a is stopped. Thereafter, the control circuit 63 advances to step E60 to determine whether the speed of either the washing or dehydrating motor 24 or 25 has become approximately zero. When the speed of either motor has become approximately zero, the control circuit 63 advances to step E70 to deenergize the washing and dehydrating motors 24 and 25. The first dehydration step is thus executed.

Figure 12:
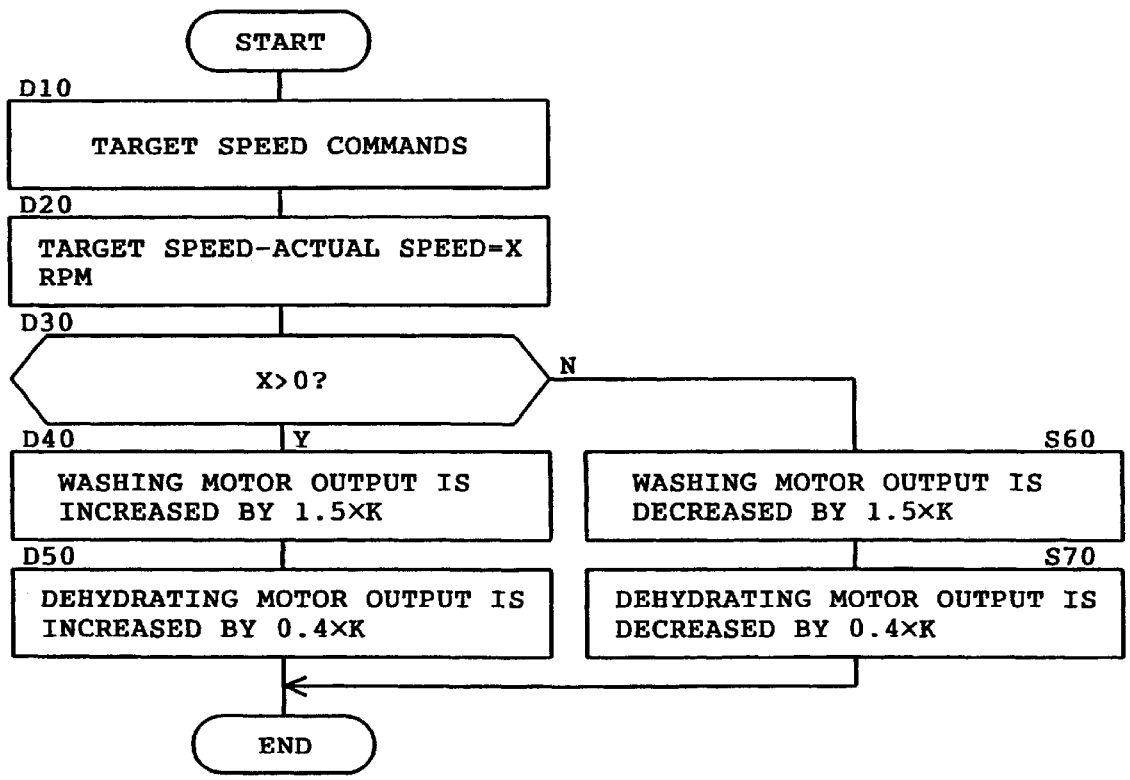
FIG. 12 is a flowchart showing a motor speed control.

In the above-described dehydration step, both the washing and the dehydrating motors 24 and 25 are driven at the initial stage of dehydration. This is effective when an amount of laundry is large (a large load) or when a dehydrating speed is required to be set up rapidly. Motor output is increased and decreased so that the speeds of the rotatable tub 4 and the agitator 5 are increased and decreased, as shown in FIG. 12. The washing and dehydrating motors 24 and 25 differ from each other in the motor output increasing or decreasing rate for the required speed increase or decrease. This difference in the motor output increasing or decreasing rate corresponds to the difference in the torque-speed characteristics of the washing and dehydrating motors 24 and 25. Consequently, the speeds of both motors 24 and 25 can be increased and decreased while being maintained at the same speed. Increasing the speeds is required when the difference X is at or above 0, and decreasing the speeds is required when the difference X is below 0.

The rotational speeds of the rotatable tub 4 and the agitator 5 are gradually increased as the result of the above-described speed increasing and decreasing control. Since the washing motor 24 is of a low-speed type, the target speed is not reached even if the motor output is increased. In the embodiment, however, when the washing or dehydrating motor 24 or 25 has reached the predetermined speed, the energizing phase of the washing motor 24 is caused to lead the previous one so that the motor 24 can be rotated at a higher speed. As a result, the washing motor 24 can be controlled together with the dehydrating motor 25 so that the target speeds are reached. Thereafter, when the dehydrating or washing motor 25 or 24 has reached the predetermined speed, the washing motor 24 is deenergized into the free rotation state. In other words, after both motors 24 and 25 are driven at the initial stage of the dehydration step so that the dehydration desirably starts up, only the dehydrating motor 25 is driven. Consequently, a high-speed dehydration can be realized with power saving.

When the rotatable tub 4 is braked, both of the washing and dehydrating motors 24 and 25 are turned into the brake control mode. As a result, the rotatable tub 4 and the agitator 5 can be braked reliably and rapidly. This brake mode is suitable for an emergency condition. Further, the phase lag energization mode is used as the brake control mode. Since each of the motors 24 and 25 comprises a brushless motor, the regenerative power is produced such that the regenerative brake is caused. When the regenerative power is excessively large, there is a possibility that the electric components of the dc power supply circuit 49 side, for example, the capacitor 48 and the voltage regulator circuit 50, may be broken. In the above-described arrangement, however, the power supply voltage detecting circuit 52 is provided for detecting the power supply voltage of the dc power supply circuit 49 in order that the regenerative power may be determined to become excessively large. When the detected power supply voltage is at or above the predetermined value, the power is consumed by the discharge resistor 53a of the discharge circuit 53. Consequently, since the dc power supply circuit 49 side can be prevented from an abnormal high voltage due to the regenerative power, electric components of low withstand voltages can be used and accordingly, the cost reduction can be achieved.

Figure 14:
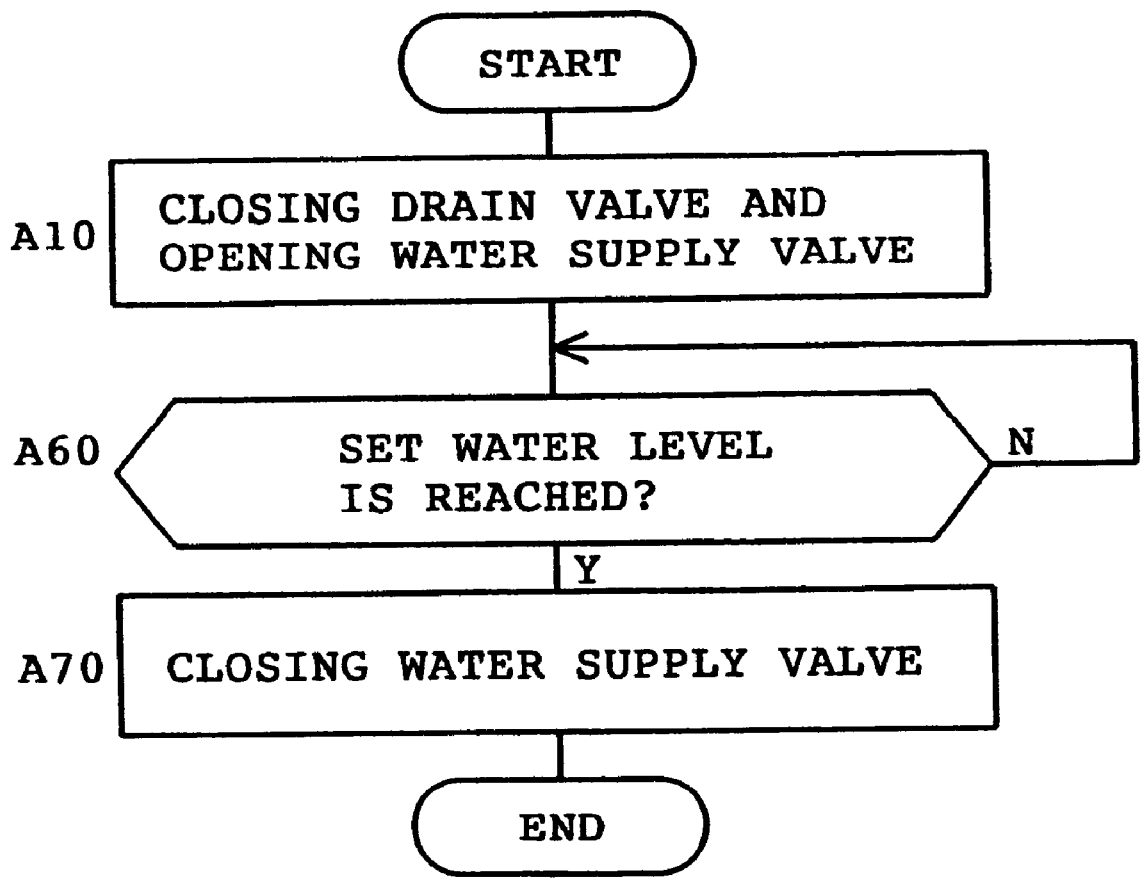
FIG. 14 is a flowchart showing a second water-supply step.

Upon completion of the first dehydration step, a second water supply step shown in FIG. 14 is executed. Since dissolution of the detergent is not required in the second water supply step, the steps A20 to A50 in FIG. 8 are eliminated. The drain valve 8 is deenergized to be closed and the water supply valve 11 is energized to be opened at step A10 in FIG. 14. The control circuit 63 then advances to step A60 to determine whether the detected water level has reached a set water level. When determining that the detected water level has reached the set water level, the control circuit 63 advances to step A70 to deenergize the water supply valve 11, thereby finishing the water supply.

Thereafter, a first stored-water rinse step is executed. A control manner in this step is basically the same as at the wash step in FIG. 9 except for a controlling time. A control manner of the second stored-water rinse step is also the same as at the wash step. Further, second and third drain steps are the same as the first drain step. Second and final dehydration steps are the same as the first dehydration step.

According to the above-described embodiment, the agitator 5 is driven directly by the washing motor 24, whereas the rotatable tub 4 is driven directly by the dehydrating motor 25. Two independent rotation transmission paths are thus provided. Moreover, since both motors are controlled so that the rotational speeds thereof are varied, they can be rotated at the same suitable speed. Consequently, the rotatable tub 4 and the agitator 5 can be controlled to be rotated and stopped individually without use of the conventional clutch mechanism and reduction mechanism, and the rotational speeds of the motors can also be controlled. Accordingly, the construction and arrangement of the washing machine can be simplified and an operation reliability thereof can be improved without malfunction such as that in switching operation of the clutch mechanism. Further, a noise reduction can be achieved and a washing time can be reduced.

The washing motor 24 has a low speed and high torque characteristic, whereas the dehydrating motor 25 has a high speed and low torque characteristic relative to the washing motor. Since these characteristics of the motors are suitable for a broad range of load condition in the washing and dehydration, a proper cleaning action and a proper dehydrating action can be obtained.

Further, the washing and dehydrating motors 24 and 25 comprise the radial gap type motors respectively. As a result, high torque motors 24 and 25 can be obtained and are suitable for full-automatic washing machines ranging between a large capacity and a small capacity. Further, the washing motor 24 is constructed into the outer rotor type and has a larger diameter than the dehydrating motor 25. The dehydrating motor 25 is constructed into the inner rotor type and disposed inside the washing motor 24. Consequently, a high torque characteristic required for the washing operation can be achieved, and a high speed characteristic required for the dehydrating operation can be achieved.

A single stator core 29 is provided on which the stator winding 32 for the washing motor 24 and the stator winding 33 for the dehydrating motor 25 are wound. Consequently, the motor construction can be simplified. Further, the void 34 for preventing magnetic interference is provided in the stator core 29 between the stator windings 32 and 33. As a result, individual magnetic circuits can be formed between the stator core 29 and the rotors 36 and 40 of the motors 24 and 25, so that the motor efficiency can be improved.

In the embodiment, the void 34 includes a plurality of arc-shaped void sections 34a and a plurality of circular void sections 34b disposed circumferentially alternately. The circular void sections 34b are used to fix the stator core 29 to the stationary member. Consequently, the void 34 can serve to form desired magnetic circuits and to fix the stator core 29. Additionally, each circular void section 34b is located at a portion of the stator core 29 where the magnetic flux density is lower than the other portion thereof. As a result, influences on the magnetic circuits such as magnetic leakage can be reduced at the fixed portion of the stator core 29.

The Hall ICs 44u, 44v and 44w are provided for detecting the rotational position of the rotor 36 of the washing motor 24. The Hall ICs 45u, 45v and 45w are provided for detecting the rotational position of the rotor 40 of the dehydrating motor 25. The Hall ICs 44u–44w and 45u–45w are held in the single sensor casing 43 to be unitized. Consequently, the assembling efficiency can be improved and the control of components can be simplified.

Further, the washing motor inverter main circuit 54 and the dehydrating motor inverter main circuit 55 are provided. Consequently, the speeds of the washing and dehydrating motors 24 and 25 can be controlled simultaneously or at different times individually. Further, the dc power supply circuit 49 serves as the power supply common to both inverter main circuits 54 and 55. The electrical arrangement can be simplified as compared with the case where both dc power supply circuits are provided for the respective invert main circuits.

Figure 16:
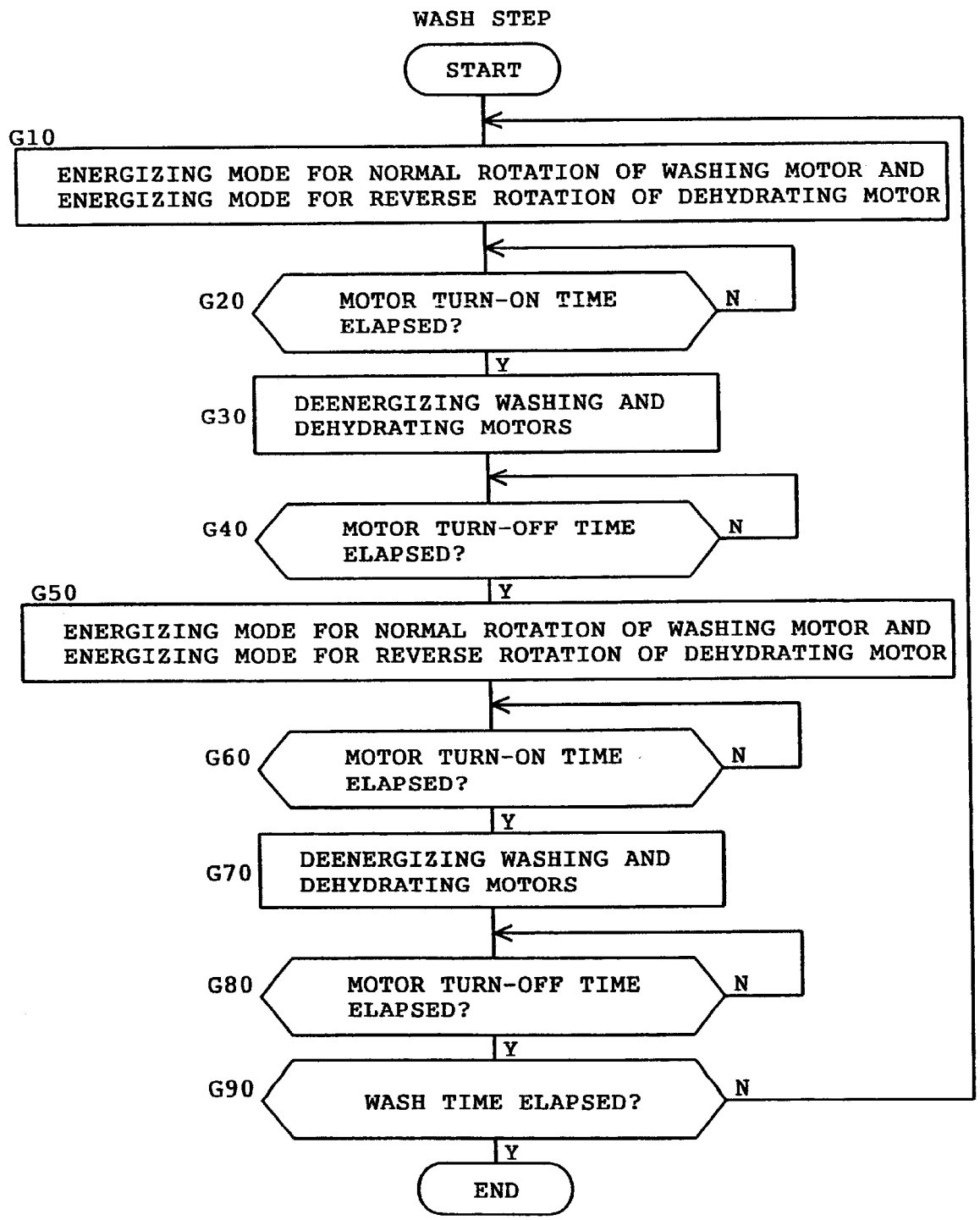
FIG. 16 is a flowchart showing a wash step in the washing machine of a second embodiment in accordance with the present invention.

FIG. 16 illustrates a second embodiment of the invention. In the second embodiment, the motor control at the wash step differs from that in the previous embodiment. More specifically, the dehydrating motor 25 is dc-energized in the first embodiment as shown in FIG. 9 so that the rotatable tub 4 is prevented from being rotated with the agitator 4. In the second embodiment, the dehydrating motor 25 is turned into an energization mode in which the motor 25 is rotated in the direction opposite to the rotational direction of the washing motor 24 so that the rotatable tub 4 is prevented from being rotated with the agitator 5. More specifically, at step G10 in FIG. 16, the washing motor 24 is rotated in the normal direction and the dehydrating motor 25 is turned into an energization mode for rotation in the opposite direction (reverse rotation energization mode). At step G50, the rotational direction of the washing motor 24 is changed to the opposite one (reverse rotation of the washing motor), and the dehydrating motor 25 is turned into an energizing mode for rotation in the opposite direction to that of the washing motor 25 (normal rotation energization mode).

In the second embodiment, the washing and dehydrating motors 24 and 25 are controlled simultaneously individually, and when the washing motor 24 is turned into a rotation control mode in which it is rotated in the normal or reverse direction, the dehydrating motor is controlled to be rotated in the opposite direction to that of the washing motor. Consequently, the rotatable tub 4 can be prevented from rotation with the agitator 5. The reason for this control is as follows. In order that the rotatable tub 4 may be prevented from rotation with the agitator 5, a reverse rotating force acts on the rotatable tub 4 if the dehydrating motor 25 is energized in an energization mode in which the motor is rotated in the opposite direction to the washing motor 24 when the motor is to be rotated in the same direction that the washing motor 24 is rotated, without the brake control (dc-energization) for the dehydrating motor as in the first embodiment. However, when it is taken into consideration that the dehydrating motor 25 has the low torque and high speed characteristic and that the load such as laundry and water exists in the rotatable tub 4, it is almost impossible for the dehydrating motor 25 to be rotated against the load, that is, the dehydrating motor 25 can be maintained substantially in the stopped state. As a result, the dehydrating motor 25 can be prevented from rotation with the agitator 5. When the load in the rotatable tub 4 is small, the rotatable tub can be rotated slightly in the opposite direction. However, this results in no problem from a viewpoint of preventing reduction in the cleaning effect, or rather the cleaning can be improved.

Figure 17:
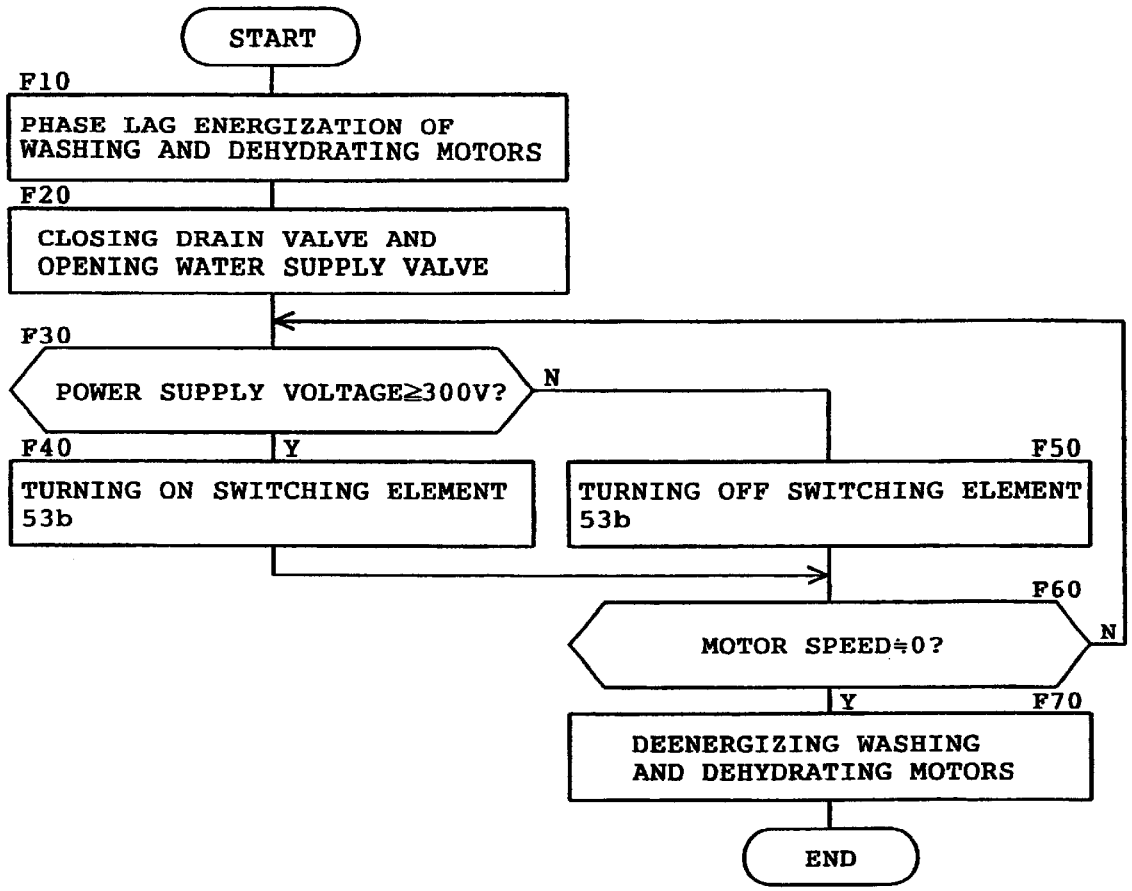
FIG. 17 is a flowchart showing a brake control before a stored-water rinse step in the washing machine of a third embodiment in accordance with the present invention.

FIG. 17 illustrates a third embodiment. The third embodiment differs from the first embodiment in the following. The same brake control is executed in the first, second and final dehydration steps in the first embodiment. In the third embodiment, the brake control is executed at the dehydration steps (first and second dehydration steps) before the stored-water rinse step in a manner as shown in FIG. 17. Energization is executed under the brake control mode at step F10. Thereafter, the drain valve 8 is deenergized to be closed and the water supply valve 11 is energized to be opened at step F20. In short, water supply to the rotatable tub 4 is performed in parallel with the brake control. Consequently, a water supply time at the stored-water rinse step can be reduced or rendered null and accordingly, a required time of the stored-water rinse step and a whole washing time can be reduced as compared with a case where the brake control and the water supply are performed in sequence. This effect can be achieved only from the arrangement that the drain valve 8 is controlled irrespective of the drive of the rotatable tub 4 without switching the clutch mechanism.

Figure 18:
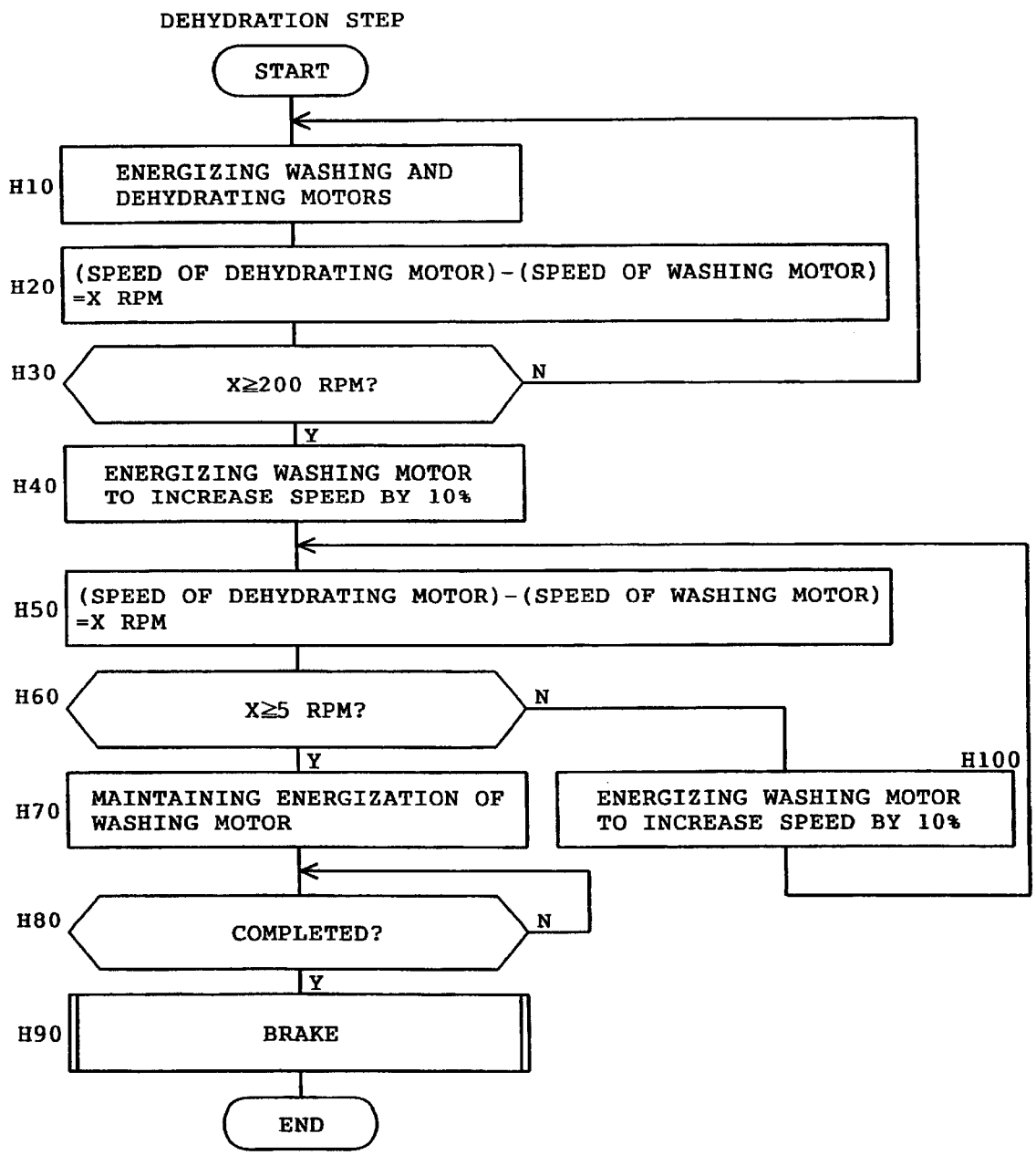
FIG. 18 is a flowchart showing a dehydration step in the washing machine of a fourth embodiment in accordance with the present invention.

FIG. 18 illustrates a fourth embodiment. The fourth embodiment differs from the previous embodiments in a manner of controlling the speeds of the washing and dehydrating motors 24 and 25 at the dehydration step. More specifically, the washing and dehydrating motors 24 and 25 are energized to start up at step H10. At step H20, the current speed of the washing motor 24 detected on the basis of the signals from the Hall ICs 44u, 44v and 44w is subtracted from the current speed of the dehydrating motor 25 detected on the basis of the signals form the Hall ICs 45u, 45v and 45w, so that the difference X is obtained. When the difference X is at or above a predetermined speed, for example, 20 rpm (step H30), that is, when the speed of the dehydrating motor 25 is higher by 20 rpm or more than that of the washing motor 24, the control circuit 63 advances to step H40 to adjust the motor output or the energizing phase so that the speed of the washing motor 24 is increased by 10%.

The control circuit 63 then advances to step H50 to re-calculate the difference X and determines at step H60 whether the difference X is at or below 5 rpm. When the speed of the dehydrating motor 25 is higher by 5 rpm or more than that of the washing motor 24, the control circuit 63 advances to step H70 to maintain the current energization mode for the washing motor 24. On the other hand, when the difference X is below 5 rpm, the control circuit 63 advances to step H100 to adjust the energization mode (motor output or energizing phase) for the washing motor 24 so that the speed thereof is increased by 10% relative to the current speed. At step H80, the control circuit 63 determines whether the dehydration completion condition has been met, for example, whether the set dehydrating time has elapsed. When the condition has been met, the control circuit 63 advances to step H90 for the brake control which is the same as that shown in FIG. 13 in the first embodiment.

In a case where the difference between the speeds of the washing and dehydrating motors 24 and 25 is small when both are driven, a wringing or squeezing action is expected. However, the laundry may be damaged when the speed difference is large. In the fourth embodiment, however, when the speeds of the washing and dehydrating motors 24 and 25 differ from each other by or above a predetermined speed, for example, 20 rpm, the motors 24 and 25 are controlled so that the speeds thereof are approximated to each other. Consequently, the laundry can be prevented from being damaged, and the wringing effect can be expected. In this case, since the lower speed of either motor (the washing motor 24, in the embodiment) is approximated to that of the other motor, the dehydrating effect cannot be reduced. Further, the output of the washing motor 24 remains unchanged when the speeds of both motors approximates a predetermined value. Consequently, both motors 24 and 25 can be maintained approximately at the same speed.

Figure 19:
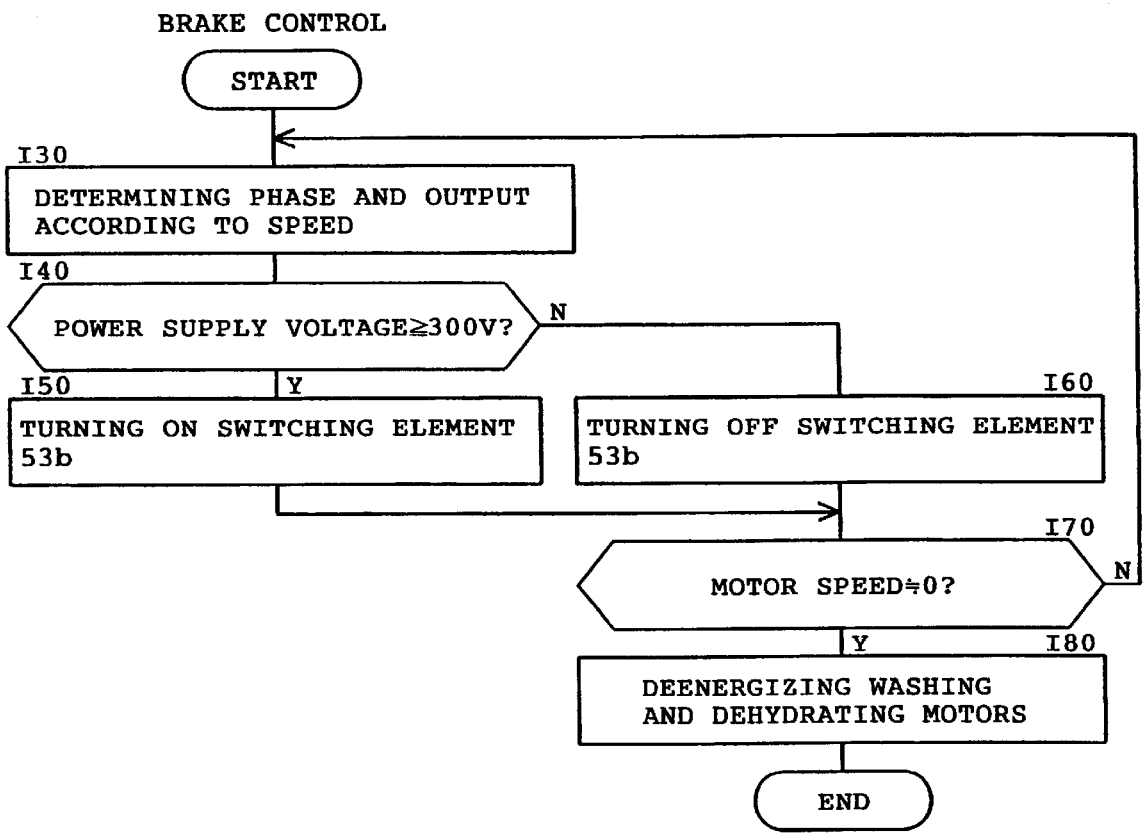
FIG. 19 is a flowchart showing the brake control in the washing machine of a fifth embodiment in accordance with the present invention.

FIG. 19 illustrates a fifth embodiment. A phase lag energization mode is employed as the brake control mode in the fifth embodiment. The phase is determined or changed according to the speed of the dehydrating motor 25. In this case, the motor output is also determined or changed. More specifically, as shown in step I30 of FIG. 19 and FIG. 20, the energizing phase and the output are determined or changed according to the speeds of the washing and dehydrating motors 24 and 25 (the speed of the rotatable tub 4) at the time the brake is initiated. For example, when the speeds are 600 rpm, the energizing phase is determined to be a mode with a lag of 30 degrees. The output is determined to be the PWM duty ratio of 50%. The braking force is determined to be LARGE. When the speeds are decreased to be in a range exceeding 300 rpm and below 600 rpm, the output is reduced to 30%. When the speeds are further decreased to be at or below 300 rpm, the energizing phase is determined to be a mode with a lag of 15 degrees.

The braking force can be controlled according to the speed of the dehydrating motor 25 since the phase and the motor output are determined or changed according to the speed of the dehydrating motor 25 in the embodiment. This control can be realized in a case where the each of the motors 24 and 25 comprises a brushless motor. This control can be applied to an arrangement that only the dehydrating motor is controlled to be braked. As the result of this control, a braking time and accordingly, a stopping duration can be rendered constant.

Figure 21:
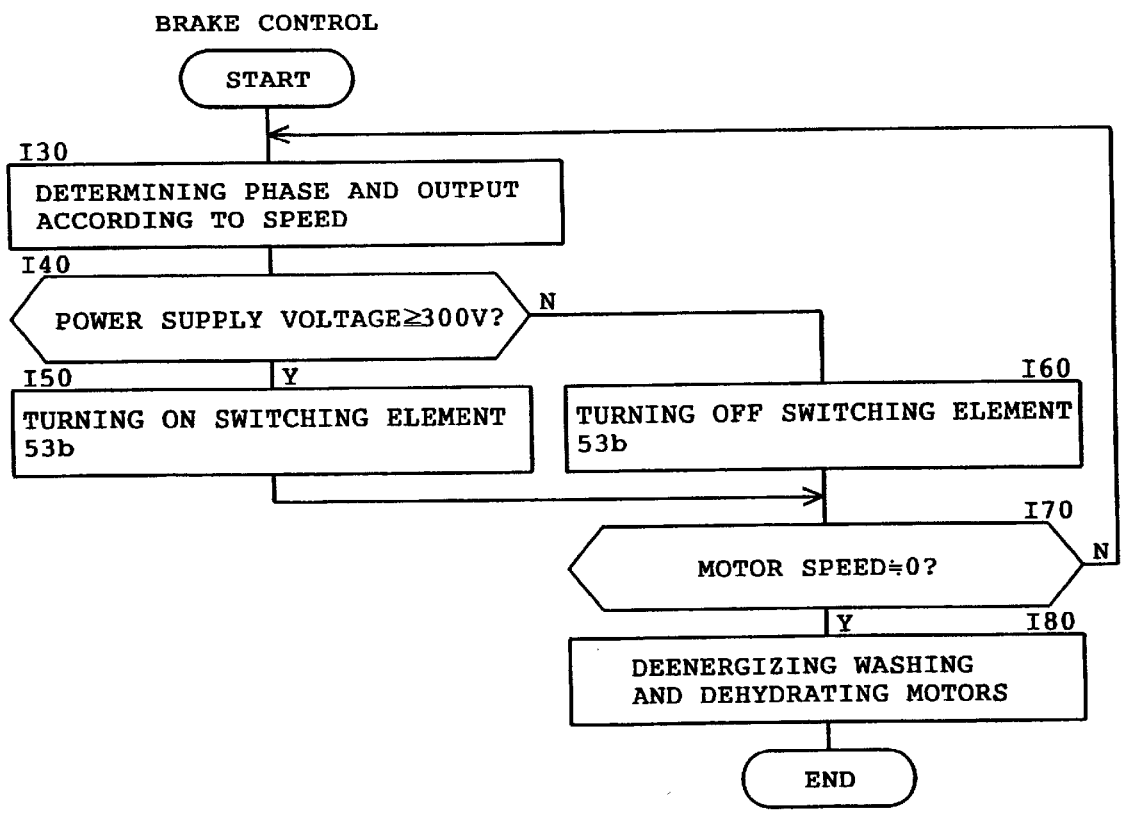
FIG. 21 is a flowchart showing the brake control in the washing machine of a sixth embodiment in accordance with the present invention.
Figure 23:
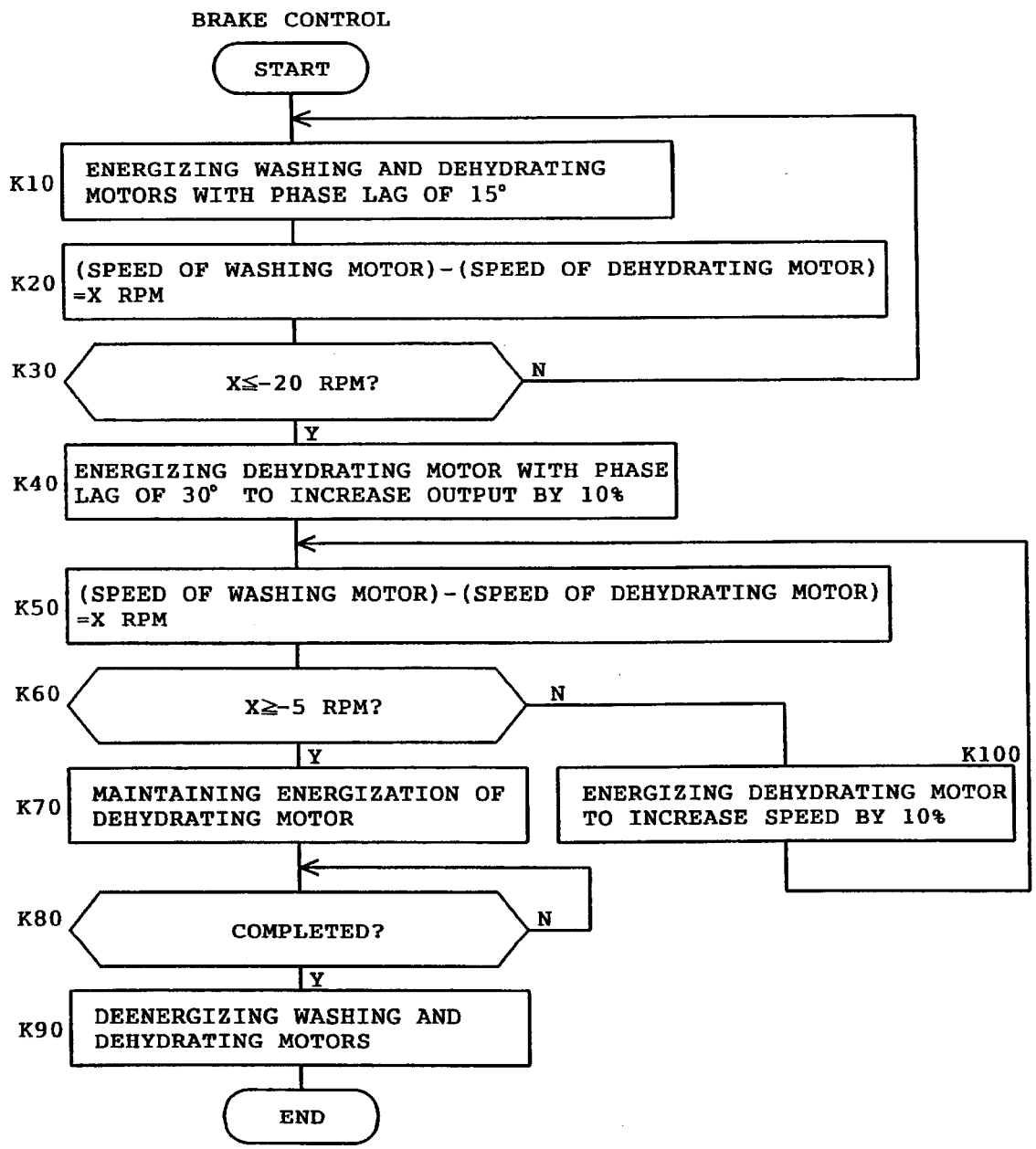
FIG. 23 is a flowchart showing the brake control in the washing machine of a seventh embodiment in accordance with the present invention.
Figure 24:
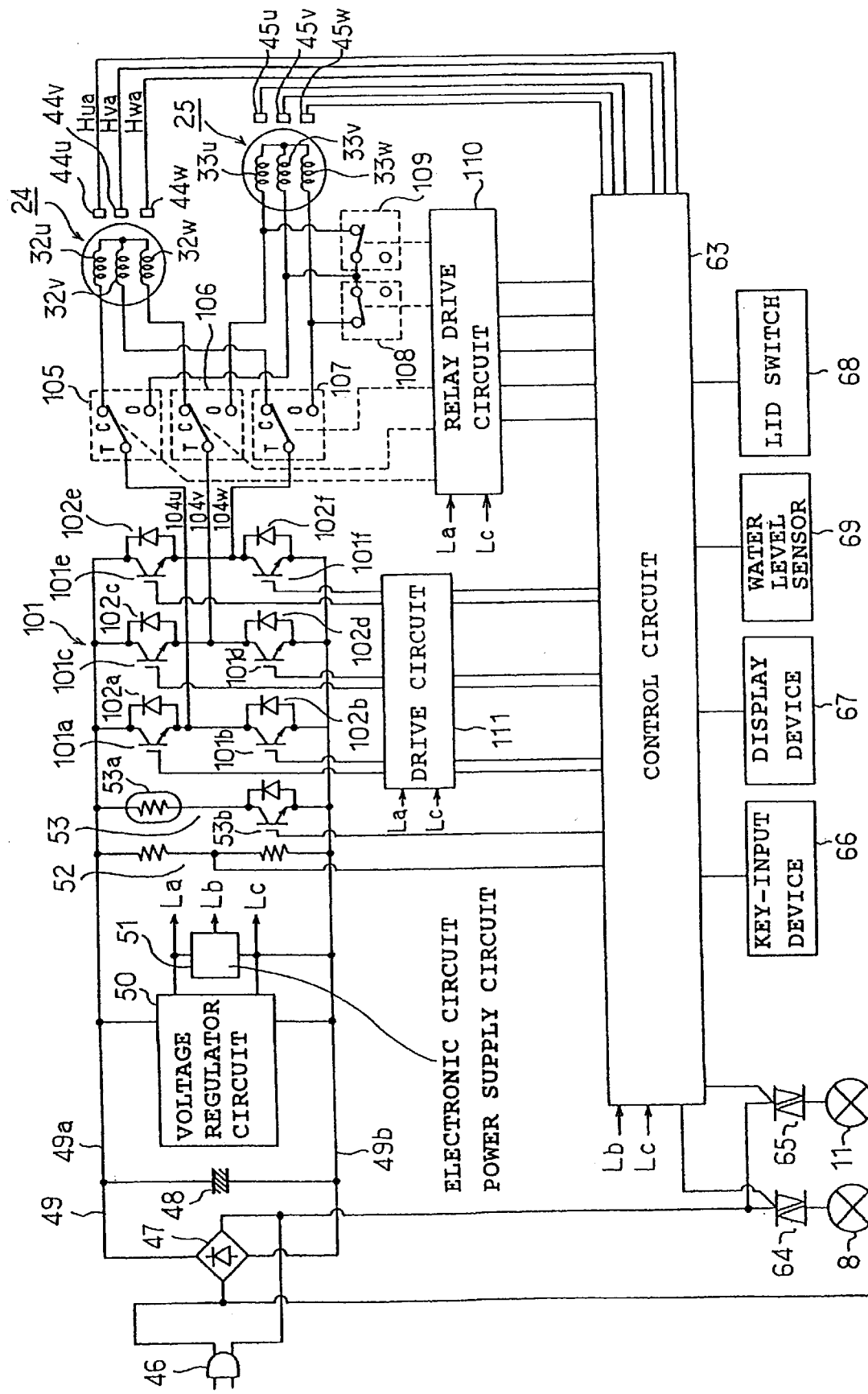
FIG. 24 is a circuit diagram showing an electrical arrangement of the washing machine of an eighth embodiment in accordance with the present invention.
Figure 25:
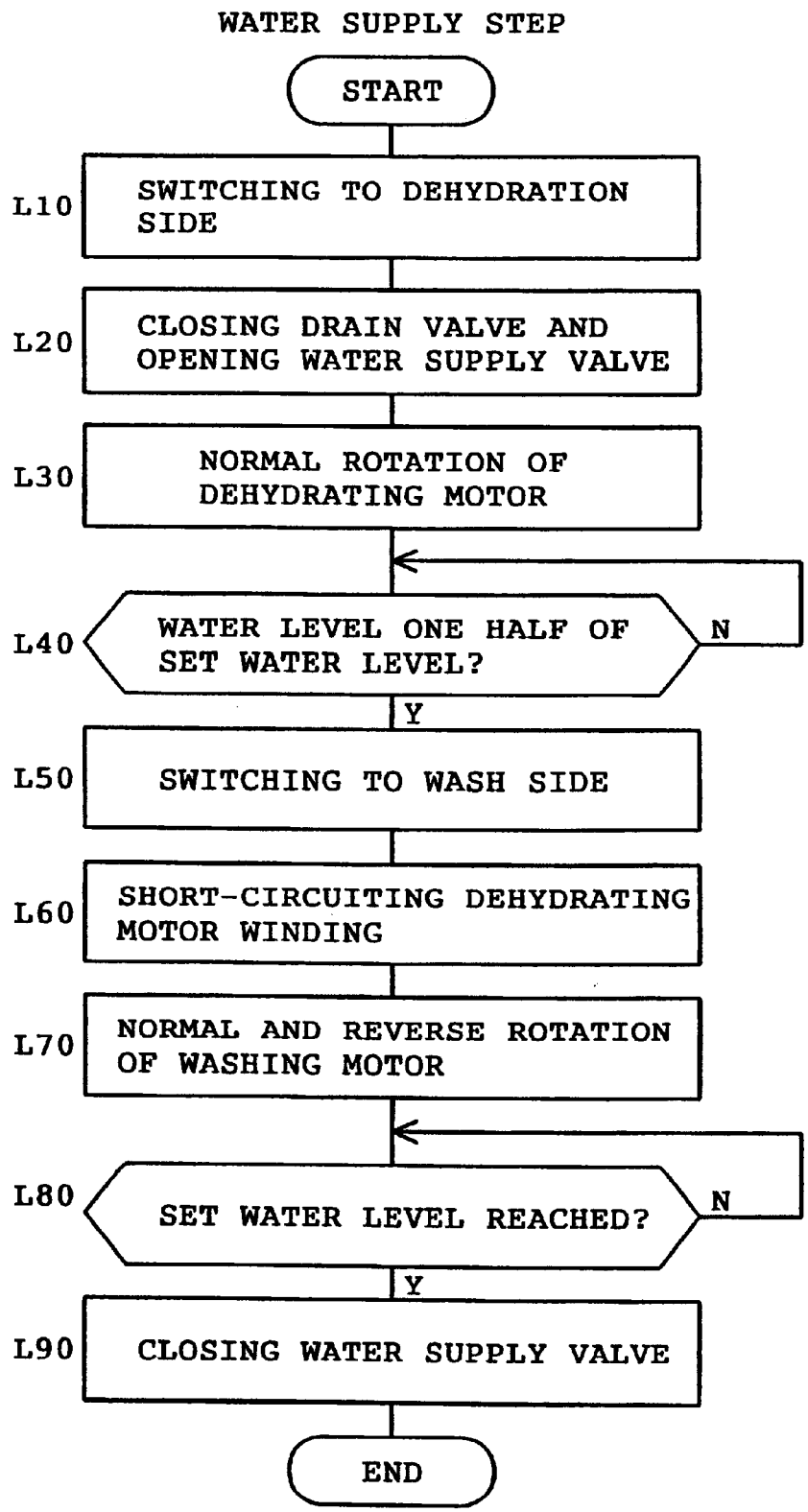
FIG. 25 is a flowchart showing a water-supply step.

FIGS. 20 and 21 show a sixth embodiment. The phase lag energization mode is also employed as the brake control mode in the embodiment. The phase is determined or changed according to a reduction degree of the speed of the dehydrating motor 25. The motor output is also determined or changed. More specifically, the control circuit 63 detects reduction degrees of the speeds of the washing and dehydrating motors 24 and 25 or a reduction degree of the rotational speed of the rotatable tub 4 at step J30. The reduction degree is classified into three stages, that is, a stage ranging at or below 75 rpm, a stage ranging between 75 and 124 rpm, and a stage ranging at or above 125. When determining that the speed reduction degree is in the range at or below 75 rpm, the energizing phase is determined to be a mode with a lag of 30 degrees at step J40. The output is determined to be the PWM duty ratio of 50%. The braking force is determined to be LARGE. Consequently, the speeds of the washing and dehydrating motors 24 and 25 are reduced. The energizing phase and motor output are changed according to the reduction degree as shown in FIG. 21. More specifically, the energizing phase and motor output are changed so that the braking force becomes small as the reduction degree is larger.

According to the sixth embodiment, the braking force can be adjusted according to a rotational condition of the rotatable tub 4 or more particularly to the reduction degree.

FIG. 22 illustrates a seventh embodiment. In the seventh embodiment, the speed of the dehydrating motor 25 is approximated to that of the washing motor 24 when the speed of the motor 25 is higher by a predetermined value than that of the motor 24 at the time of brake control. More specifically, the washing and dehydrating motors 24 and 25 are braked with the energizing phase with a lag of 15 degrees at any motor output at step K10. The control circuit 63 subtracts the speed of the dehydrating motor 25 from that of the washing motor 24 at step K20 to obtain the difference X. When the difference X is a predetermined speed, for example, at or below −20 rpm (determination at step K30) or when the speed of the dehydrating motor 25 is higher by 20 rpm or more than that of the washing motor 24, the control circuit 63 advances to step K40 to set the dehydrating motor 25 to the energizing phase with a lag of 30 degrees and to adjust the motor output so that the braking current is increased by 10%. Consequently, the braking force for the dehydrating motor 25 is increased.

The control circuit 63 then advances to step K50 to re-calculate the aforesaid difference X and to step K60 to determine whether the difference X is a predetermined value, for example, at or above −5 rpm. That is, when the speed of the dehydrating motor 25 is higher by the range of 5 rpm than that of the washing motor 24, the control circuit 63 advances to step K70 to maintain the previous energizing mode for the dehydrating motor 25. When the difference X is larger than 5 rpm, the control circuit 63 advances to step K100 to control the energizing mode for the dehydrating motor 25 so that the braking current is increased by 10% relative to the current value, whereupon the braking force is increased.

According to the seventh embodiment, in a case where both of the washing and dehydrating motors 24 and 25 are driven in the brake control mode at the time of brake control, the wringing effect can be expected when the difference between the speeds of the motors is small. However, the laundry may be damaged when the speed difference is large. In the embodiment, however, when the speed difference is at or above the predetermined value, the motors 24 and 25 are controlled so that the motor speeds are approximated to each other, whereupon the laundry can be prevented from being damaged. Further, since the higher speed of one motor is approximated to the speed of the other motor, the braking time can be prevented from being increased.

As understood from step K70, the braking force is not changed when the motor speeds have been approximated to each other by a predetermined value, the speeds of both motors can be maintained approximately at the same value.

FIGS. 24 to 28 illustrate an eighth embodiment. The eighth embodiment differs from the first embodiment in the following. A single inverter main circuit 101 is provided for both washing and dehydrating motors 24 and 25 each of which comprises a brushless motor. The inverter main circuit 101 includes switching elements 102a to 102f, freewheel diodes 103a to 103f and output terminals 104u, 104v and 104w. Three relay switches 105, 106 and 107 have common terminals T connected to the output terminals 104u, 104v and 104w respectively. The relay switches 105, 106 and 107 have normally closed terminals C connected to the windings 32u, 32v and 32w of the washing motor 24 respectively. The relay switches 105, 106 and 107 further have normally open terminals O connected to the windings 33u, 33v and 33w of the dehydrating motor 25.

Two relay switches 108 and 109 are connected between the normally open terminals O and the windings 33u, 33v and 33w of the dehydrating motor 25. The relay switches 108 and 109 serve as winding short-circuiting means switching between a case where the windings 33u, 33v and 33w are short-circuited and a case where they are not short-circuited. The relay switches 108 and 109 are of the normally closed type and short-circuit the windings 33u, 33v and 33w when the plug 46 has inadvertently been pulled out of the commercial power supply or when a power stoppage has occurred, that is, when the power supply to the washing machine has been turned off. A relay drive circuit 110 is provided for controlling the relay switches 105 to 109 so that each of the relay switches are opened and closed. The relay drive circuit 110 is controlled by the control circuit 63. A drive circuit 111 is provided for turning on and off the switching elements 102a to 102f of the inverter main circuit 101.

The control circuit 63 controls the water supply, wash, drain, and dehydration steps as follows. First, the water supply step will be described with reference to FIG. 25. The relay switches 105 to 107 are switched to a dehydration side, namely, circuits between the terminals T and O are closed, at step L10. The drain valve 8 is deenergized to be closed and the water supply valve 11 is energized to be opened at step L20, so that water is supplied into the rotatable tub 4. The dehydrating motor 25 is then rotated at a relatively low speed in the normal direction at step L30. At step L40, the control circuit 63 compares the detected water level from the water level sensor 69 with the predetermined set water level at step L40 to determine whether the detected water level is one half of the set water level. When the detected water level has reached one half of the set water level, the control circuit 63 advances to step L50. At step L50, the relay switches 105 to 107 are switched to a wash side, namely, circuits between the terminals T and C are closed, so that output of the inverter main circuit 101 is supplied to the washing motor 24. The relay switches 108 and 109 are closed at step L60 so that the windings of the dehydrating motor 25 are short-circuited. The control circuit 63 then advances to step L70 to rotate the washing motor 24 intermittently alternately in the normal and reverse directions so that a predetermined speed is reached. When determining at step L80 that the detected water level has reached the set water level, the control circuit 63 advances to step L90 to deenergize the water supply valve 11 so that it is closed, thereby finishing the water supply.

In the above-described water supply step, the dehydrating motor 25 is first rotated at the low speed so that the supplied water falls uniformly onto the laundry in the rotatable tub 4. Thereafter, the washing motor 24 is rotated intermittently alternately in the normal and reverse directions, so that the detergent is sufficiently dissolved in water. It is considered that the rotatable tub 4 may be rotated with the laundry and water. However, since the dehydrating motor 25 is braked by means of winding short-circuit, the rotatable tub 4 can be prevented from rotation with the laundry and water.

Figure 26:
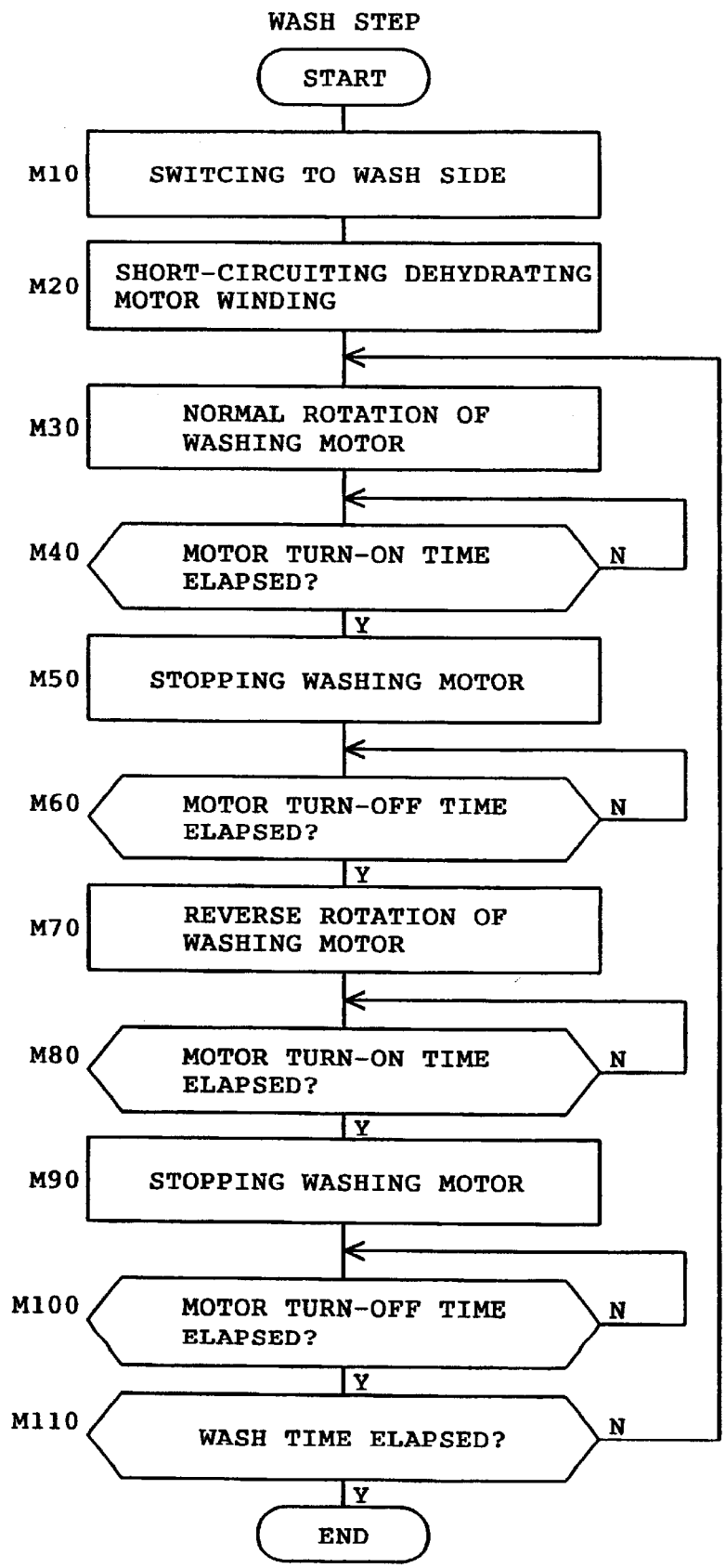
FIG. 26 is a flowchart showing a wash step.

FIG. 26 shows the wash step. The relay switches 105 to 107 are switched to the wash side, namely, the circuits between the terminals T and C are closed, so that the output of the inverter main circuit 101 is supplied to the washing motor 24, at step M10. The relay switches 108 and 109 are closed so that the windings of the dehydrating motor 25 are short-circuited, at step M20. As a result, the dehydrating motor 25 is turned into the brake control mode. The washing motor 24 is rotated repeatedly alternately in the normal and reverse directions at steps M30 to M110 until the wash time elapses.

In the wash step, only the washing motor 24 is driven by the inverter main circuit 101. The dehydrating motor 25 is not connected to the inverter main circuit 101. However, the rotatable tub 4 can be held in the stationary state by the winding short-circuiting brake or prevented from rotation with the laundry and water.

Figure 27:
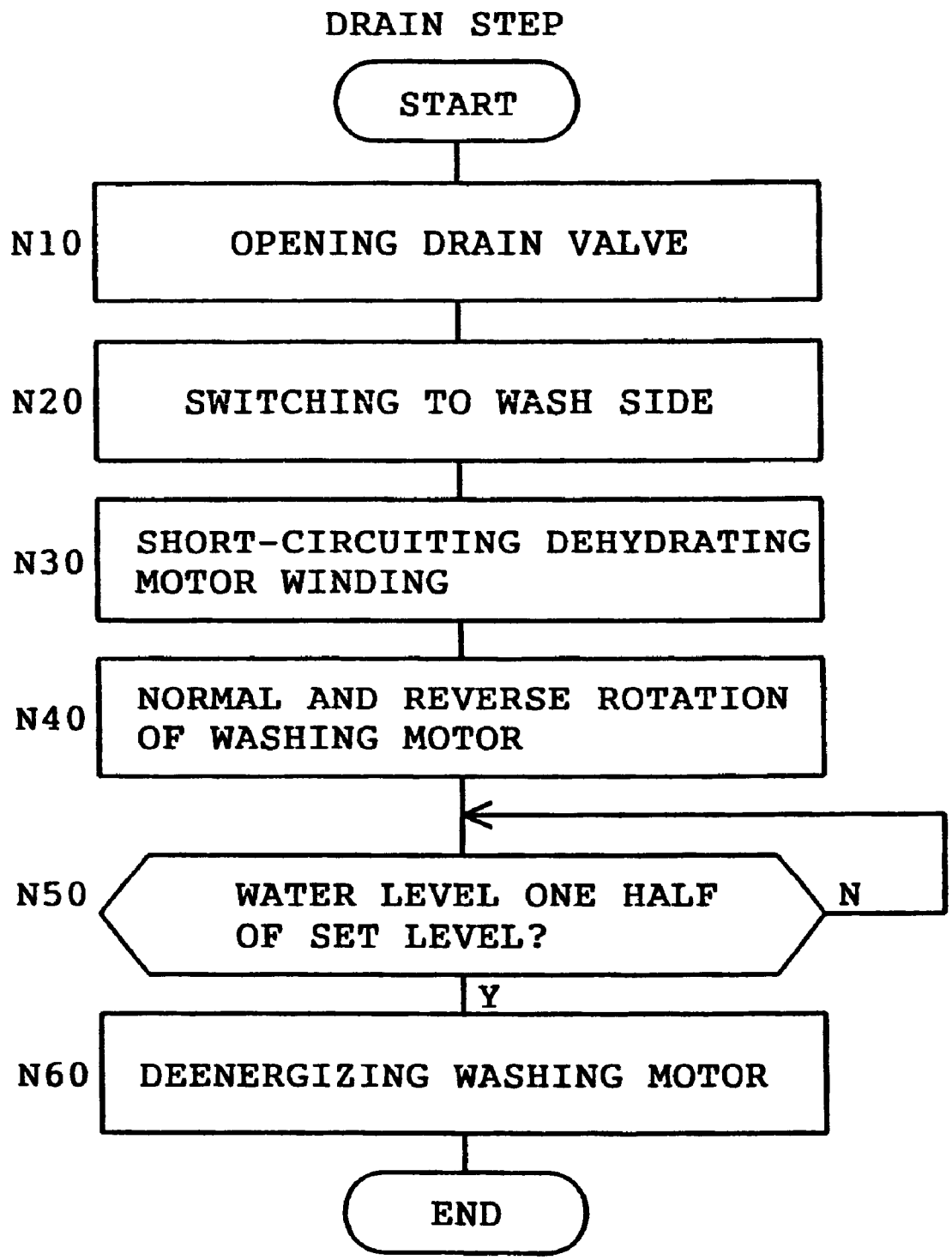
FIG. 27 is a flowchart showing a drain step.

FIG. 27 shows the drain step. The control manner shown in FIG. 27 differs from that of FIG. 10 in the following. The relay switches 105 to 107 are switched to the wash side so that the output of the inverter main circuit 101 is supplied to the washing motor 24, at step N20. The relay switches 108 and 109 are closed so that the windings of the dehydrating motor 25 is short-circuited, at step N30.

Figure 28:
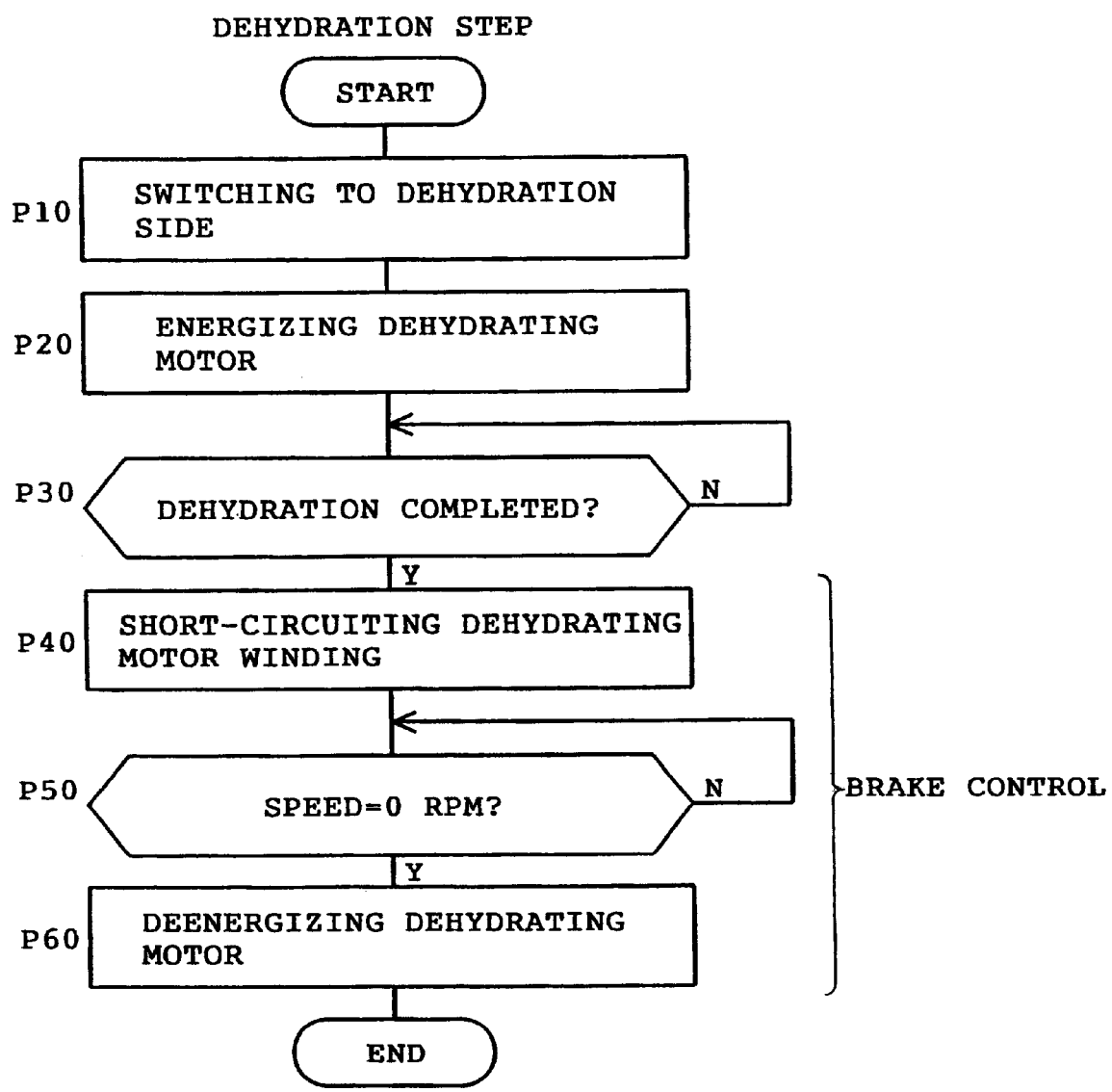
FIG. 28 is a flowchart showing a dehydration step.

FIG. 28 shows the dehydration step. The relay switches 105 to 107 are switched to the dehydration side at step P10, so that the washing motor 24 is electrically disconnected from the inverter main circuit 101 into a free rotation state. The dehydrating motor 25 is energized in a suitable energizing pattern so as to be started. As a result, the rotatable tub 4 is rotated at a high speed for a dehydrating operation. The control circuit 63 determines at step P30 whether a dehydration completion condition has been met, for example, a dehydrating time has elapsed. When determining that the dehydration completion condition has been met, the control circuit 63 executes the brake control at steps P40 to P60. The relay switches 108 and 109 are closed so that the windings of the dehydrating motor 25 are short-circuited, at step P40. When determining that the speed of the dehydrating motor 25, that is, the rotational speed of the rotatable tub 4 has become approximately zero (step P50), the control circuit 63 deenergizes the dehydrating motor 25, thereby finishing the dehydration step.

According to the eighth embodiment, the output of the inverter main circuit 101 is supplied selectively to either washing or dehydrating motor 24 or 25 by the relay switches 105 to 107. Consequently, since the single inverter main circuit 101 can be used for the washing and dehydrating motors 24 and 25 in common, the electrical arrangement of the washing machine can be simplified.

It is considered that an electric brake control is applied to the dehydrating motor 25 for prevention of rotation of the tub 4 with the laundry and water at the time of the washing operation. In the arrangement that the output of the inverter main circuit 101 is supplied selectively to the washing or dehydrating motor 24 or 25, the brake control by the dc-energization or the regenerative brake control cannot be applied to the dehydrating motor 25 when the washing motor 24 is controlled by the inverter main circuit 101. In the eighth embodiment, however, the windings of the dehydrating motor 25 can be short-circuited. As a result, the winding short-circuiting brake as one type of the electric brake can be applied to the dehydrating motor 25 while the rotation of the washing motor 24 is under control.

Further, the washing motor 24 is turned into a rotation control mode in which it is rotated in the wash step, and the dehydrating motor 25 is turned into the brake control mode in which the electric brake is applied to the motor. Consequently, the rotation of the rotatable tub 4 with the laundry and water can be prevented. Further, only the dehydrating motor 25 is driven and the washing motor 24 is turned into the free rotation state in the dehydration step. The dehydration step can be executed by a relatively simple control manner. The laundry is usually located over both rotatable tub 4 and agitator 5 before start of the dehydration step. However, since the washing motor 24 is in the free rotation state, rotation of the washing motor 24 results in no problem in the dehydration. This control manner is suitable for small load.

Further, only the dehydrating tub 25 is turned into the brake control mode when the brake is required in the dehydration step. As a result, the brake control can be simplified and an amount of consumed electric power can be reduced. More specifically, the laundry is usually adherent to an inner surface of the rotatable tub 4 when the rotatable tub 4 is in a high-speed rotation during the dehydration step. In this case, the laundry is scarcely adherent to the agitator 5. Since the rotatable tub 4 needs to be braked in this case, only the dehydrating motor 25 is turned to the brake control mode so that the rotatable tub 4 can effectively be braked. Consequently, the brake control is easier and an electric power consumption is decreased as compared with the case where both of the dehydrating and washing motors 24 and 25 are turned into the brake control mode. This control manner can be applied to a case where the washing and dehydrating motors 24 and 25 are driven by the respective dedicated inverter main circuits.

Further, each of the relay switches 108 and 109 serving as the winding short-circuiting means comprises a normally closed relay switch. The winding short-circuiting operation is performed when the power supply to the washing machine has been turned off. Consequently, the rotatable tub 4 can immediately be stopped. For example, when the power supply plug has inadvertently been pulled out or when the power supply to the washing machine has been turned off due to occurrence of power stoppage, the rotatable tub continues to rotate by inertia. A problem arises when a user opens the lid 1b during rotation of the rotatable tub 4 due to inertia. In the above-described embodiment, however, such a problem can be solved.

The brake control mode may be a phase lag energization mode or a reverse sequence energization mode other than the winding short-circuiting mode, or a combination of these modes. In the reverse sequence energization mode, energization is performed in the sequence of phases w, v and u. Further, the electric brake control at step P40 of FIG. 28 may be a control in which the phase lag and the braking current are determined according to the rotational speed of the rotatable tub in the same manner as the brake control shown in FIG. 19 or 21.

Figure 29:
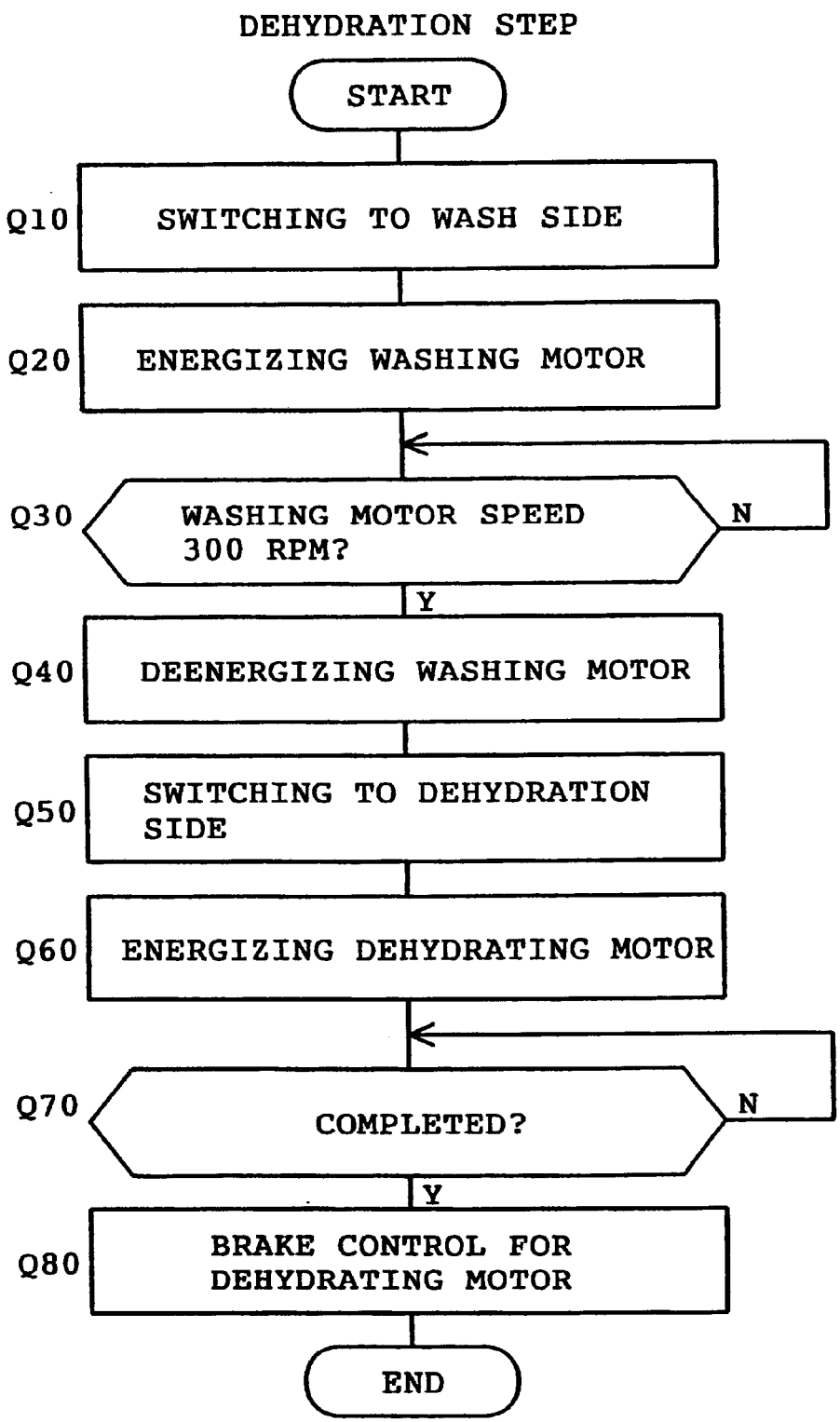
FIG. 29 is a flowchart showing a dehydration step in the washing machine of a ninth embodiment in accordance with the present invention.

FIG. 29 illustrates a ninth embodiment. The ninth embodiment differs from the eighth embodiment in that the dehydrating motor is first turned into the free rotation state and the washing motor is then driven and that the dehydrating motor is thereafter driven. More specifically, the relay switches 105 to 107 are switched to the wash side so that the output of the inverter main circuit 101 is supplied to the washing motor 24, and the dehydrating motor 25 is turned into the free rotation state at step Q10. The washing motor 24 is then energized in a suitable energizing pattern so as to be started at step Q20. In this case, the laundry often lies over both the rotatable tub 4 and the agitator 5 in the tub before start of the dehydrating operation. Accordingly, when the dehydrating motor 25 is first turned into the free rotation state and the washing motor 24 is then driven, the agitator 5 is rotated and rotation of the rotatable tub 4 follows. Since the washing motor 24 has a low-speed and high-torque characteristic, the rotatable tub 4 can be started by a large starting torque, so that a dehydrating speed (the rotational speed of the rotatable tub 4) rapidly passes a resonance point of the washing machine. Consequently, occurrence of the unbalanced condition of the laundry can be restrained.

The rotatable tub 4 is thus rotated at a high speed so that the dehydrating operation is performed. The control circuit 63 then advances to step Q30 to determine whether the speed of the washing motor 24 has decreased to a predetermined value, for example, 300 rpm. When determining that the motor speed has reached 300 rpm, the control circuit 63 advances to step Q40 to deenergize the washing motor 24 so that it is turned into the free rotation state. The control circuit 63 further advances to step Q50 to switch the relay switches 105 to 107 to the dehydration side so that the output of the inverter main circuit 101 is supplied to the dehydrating motor 25. At step Q60, the dehydrating motor 25 is energized in a suitable energizing pattern so as to be rotated. At this time, the motor 25 is already under rotation, and the energizing pattern is set according to the current speed. Thereafter, the control circuit 63 advances to step Q70 to determine whether a dehydration completion condition has been met, for example, whether the dehydrating time has elapsed. When determining that the dehydration completion condition has been met, the control circuit 63 executes the brake control for the dehydrating motor 25 at step Q80. The brake control at step Q80 is the same as executed at steps P40 to P60 in FIG. 28.

It is noted in the ninth embodiment that the laundry often lies over both the rotatable tub 4 and the agitator 5 in the tub before start of the dehydrating operation. In view of this, the dehydrating motor 25 is first turned into the free rotation state and the washing motor 24 is then driven. As a result, the rotatable tub 4 can be started by the large starting torque, so that occurrence of the unbalanced condition of the laundry can be restrained. This control manner may be applied to an arrangement that the washing and dehydrating motors 24 and 25 are driven by two dedicated inverter main circuits respectively, for example, the arrangement of the first embodiment.

According to the ninth embodiment, drive is switched to the dehydrating motor 25 when the speed of the washing motor 24 has reached the predetermined value. Consequently, the dehydrating motor 25 can desirably be switched to a high-speed rotation upon start of the dehydrating operation.

The drive switching to the dehydrating motor 25 may be performed when an increase rate of the rotational speed of the washing motor 24 has reached a predetermined value (step R30), as shown as a tenth embodiment in FIG. 30. In the tenth embodiment, when the speed increase rate of the washing motor 24 is at or below 1 rpm/s, the drive switching is performed. That is, the washing motor 24 is started up to such an extent that the speed thereof is not almost increased. Sufficient torque developed in this while is utilized as the starting torque.

Figure 31:
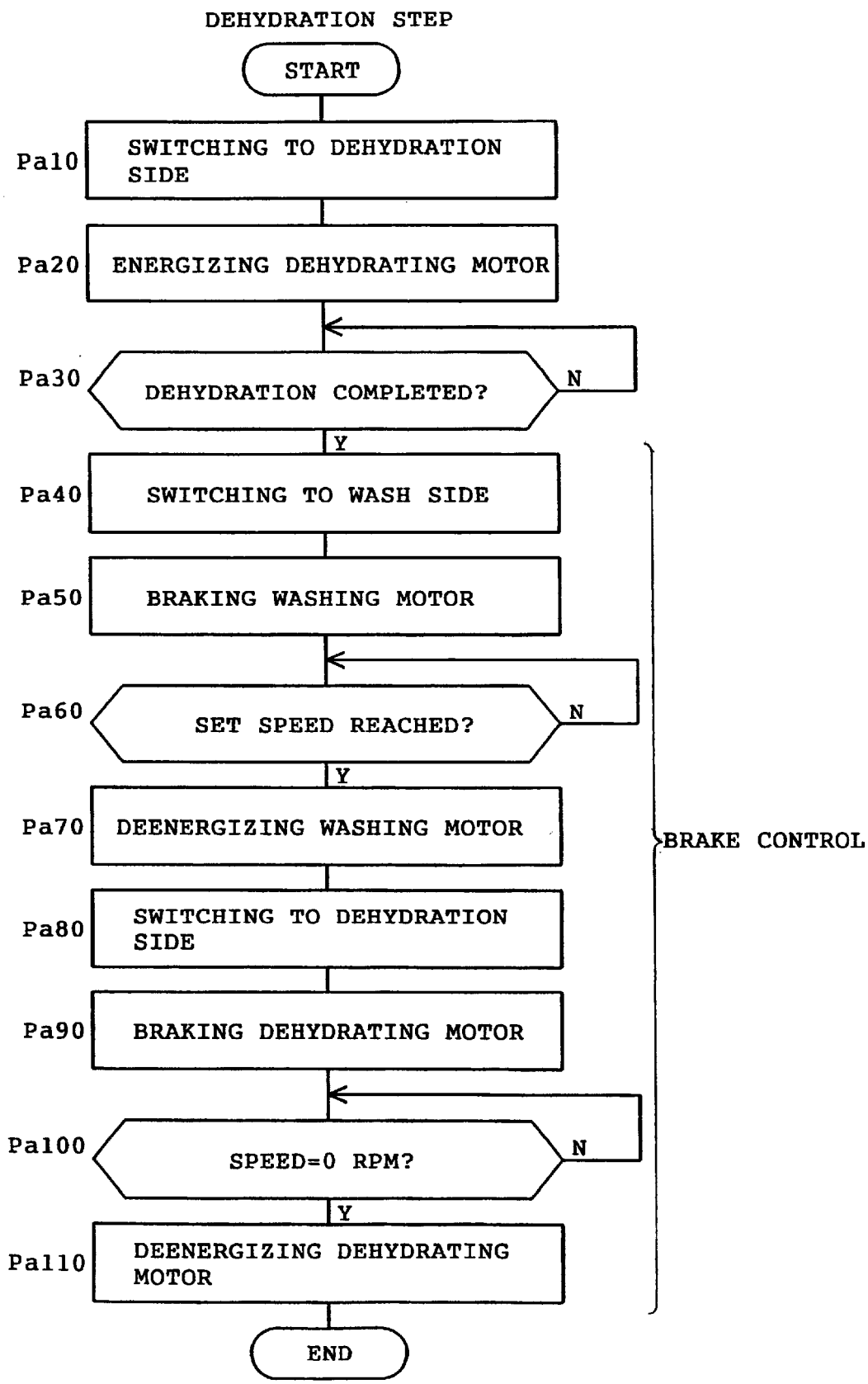
FIG. 31 is a flowchart showing a dehydration step in the washing machine of an eleventh embodiment in accordance with the present invention.

FIG. 31 illustrates an eleventh embodiment. In the eleventh embodiment, when the brake is applied to the motors during the dehydration step with the inverter main circuit 101 switched to the dehydration side, the washing motor 24 is first turned to the brake control mode and thereafter, the dehydrating motor 25 is turned to the brake control mode. More specifically, the brake control is shown by steps Pa4O to Pa110 in FIG. 31. The relay switches 105 to 107 are first switched to the wash side so that the dehydrating motor 25 is turned to the free rotation state. For example, the washing motor 24 is controlled, for example, in the phase lag energizing mode as the brake control mode. When the speed of the dehydrating motor 25 or the speed of the rotatable tub 4 has been decreased to a set value (step Pa60), the control circuit 63 advances to step Pa70 to open the input end of the washing motor 24 or deenergize the motor. At step Pa80, the control circuit 63 switches the relay switches 105 to 107 to the dehydration side, so that the washing motor 24 is turned to the free rotation condition. At step Pa90, the control circuit 63 controls the dehydrating motor 25 in the winding short-circuiting brake control mode. When the speed of the dehydrating motor 25 has been decreased approximately to zero (step Pa100), the dehydrating motor 25 is deenergized at step Pa110.

In the eleventh embodiment, a large braking force can be obtained at an initial stage of the braking. Accordingly, this manner is suitable for a case where rapid braking is required. This control manner may be applied to the arrangement that the washing and dehydrating motors 24 and 25 are driven by two dedicated inverter main circuits respectively. Additionally, the aforesaid brake control mode may be the reverse sequence energization mode.

Figure 32:
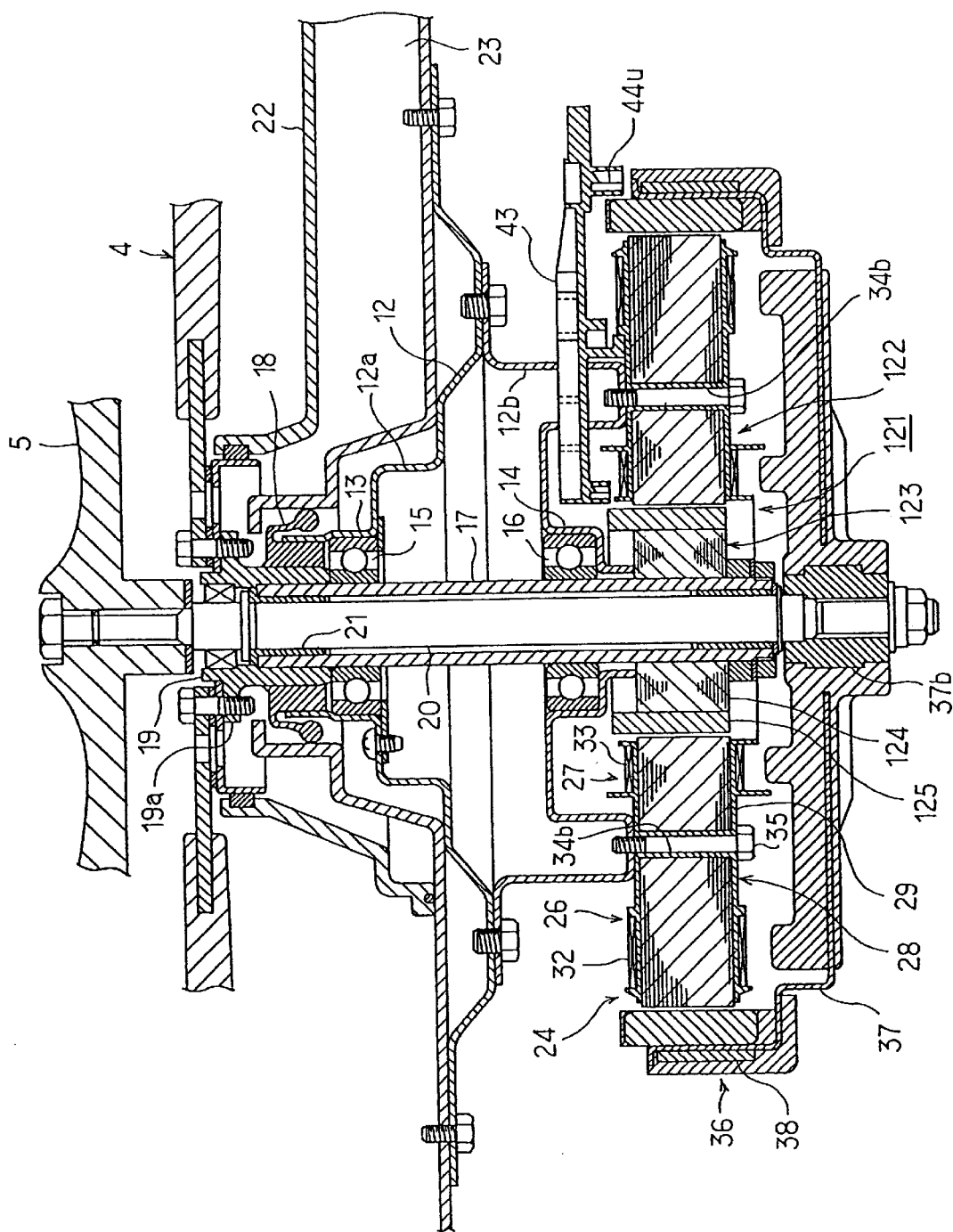
FIG. 32 is a longitudinally sectional side view of a driving mechanism including motors in the washing machine of a twelfth embodiment in accordance with the present invention.
Figure 33:
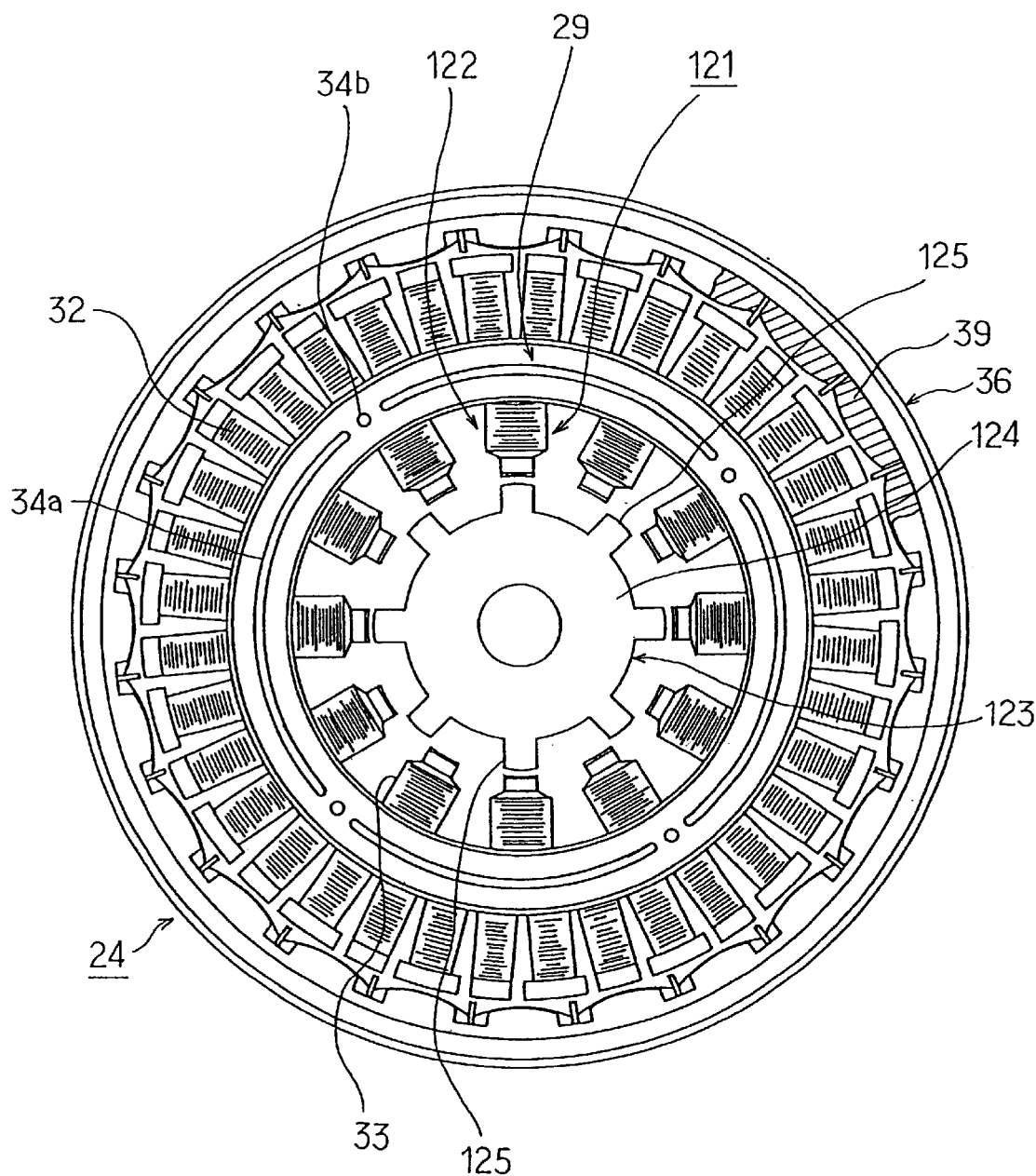
FIG. 33 is a plan view of the motors.

FIGS. 32 and 33 illustrate a twelfth embodiment. The dehydrating motor 121 comprises a switched reluctance motor. The dehydrating motor 121 includes a stator 122 having the same construction as the stator 27 of the dehydrating motor 25 in the first embodiment. The dehydrating motor 121 further includes a rotor 123 comprising a rotor core 124 formed by stacking a number of steel sheets and a predetermined number of salient poles formed on the outer circumference of the rotor core 124. In the twelfth embodiment, it is preferred that an energization timing for a stator winding 33 of the stator 122 is discontinuously switched so that an excitation position is switched. Since the dehydrating motor 121 comprises the switched reluctance motor, the dehydrating motor becomes suitable to the high-speed operation and the manufacturing cost can be reduced.

Figure 34:
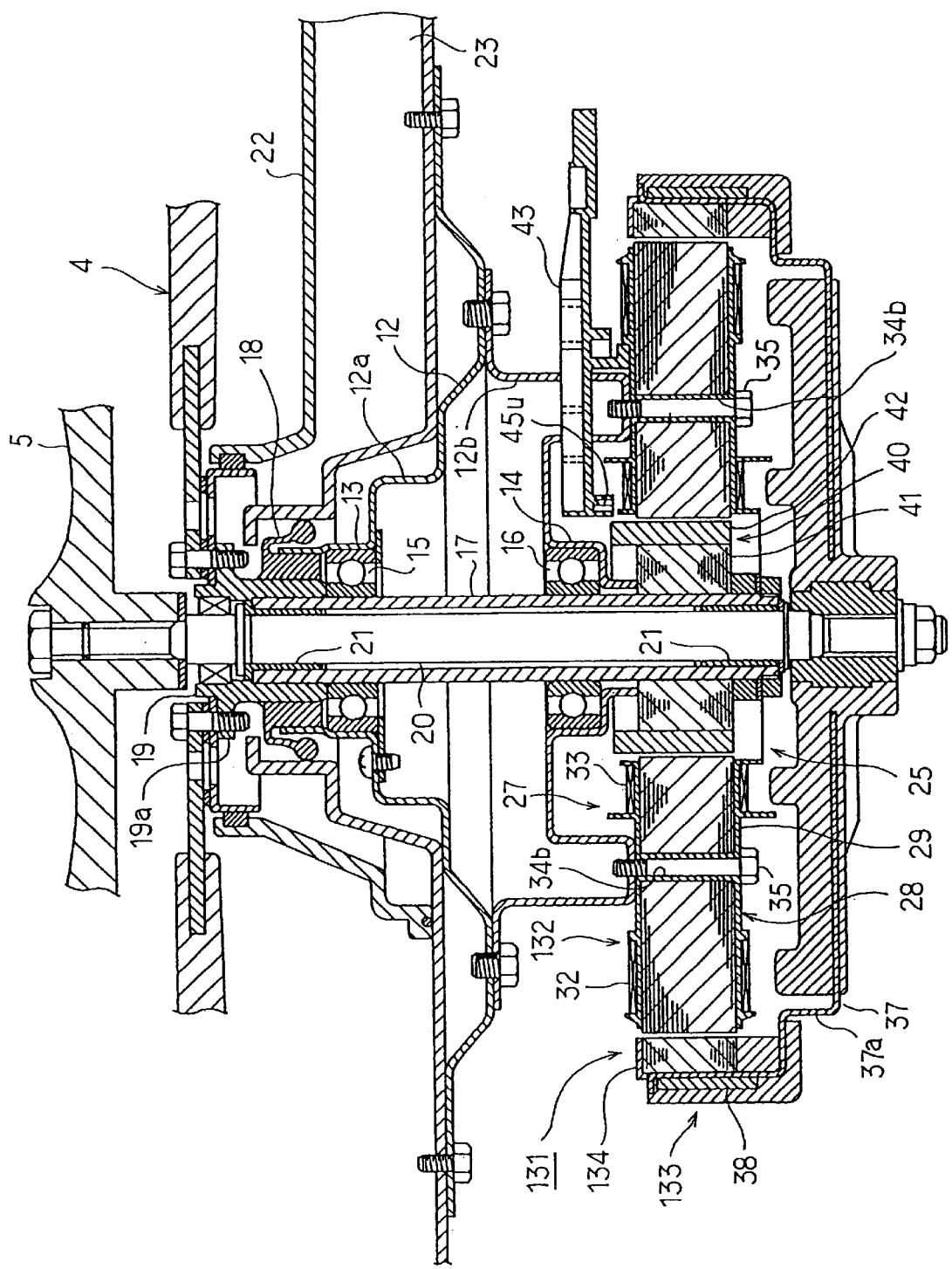
FIG. 34 is a longitudinally sectional side view of a driving mechanism including motors in the washing machine of a thirteenth embodiment in accordance with the present invention.
Figure 35:
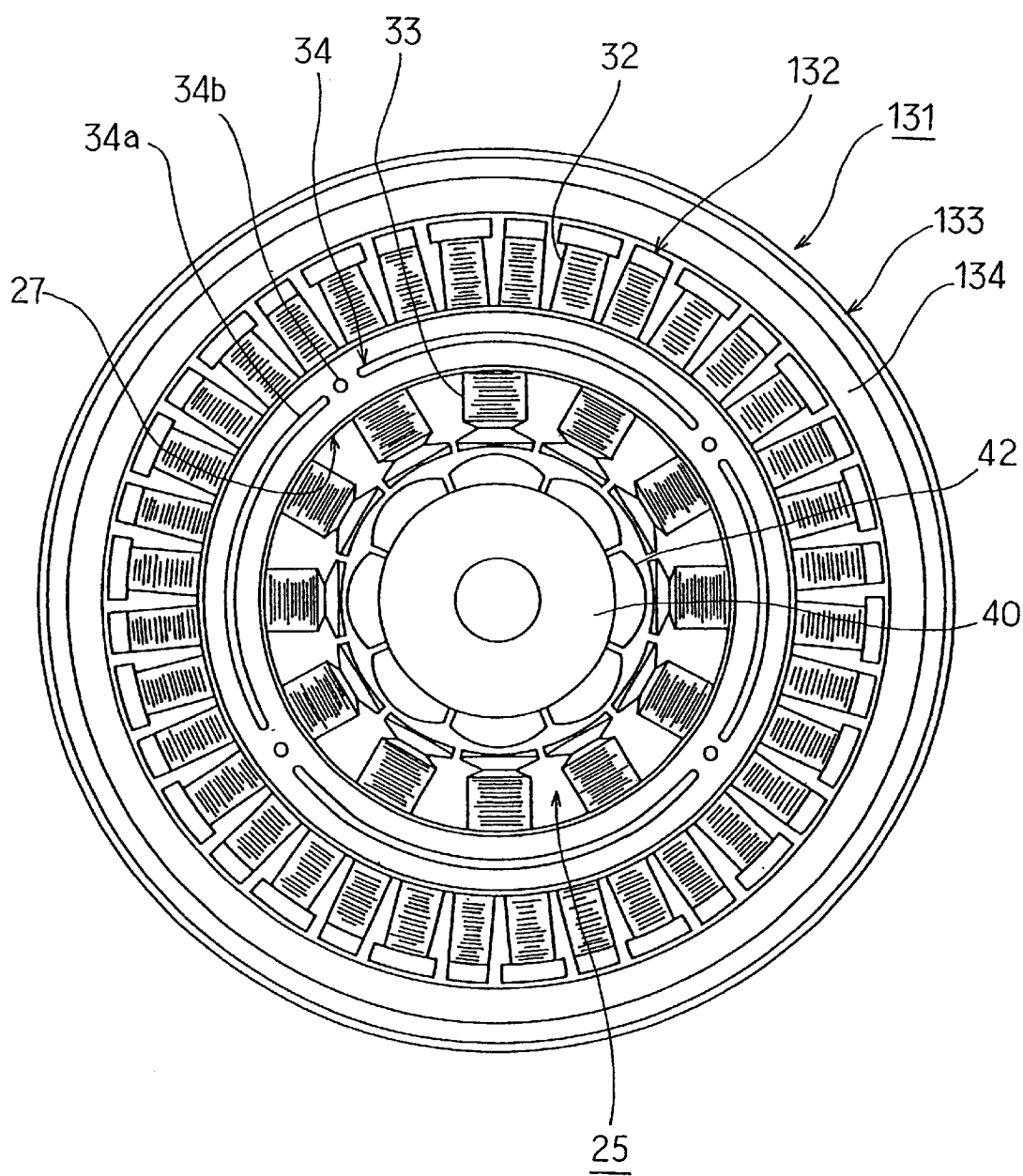
FIG. 35 is a plan view of the motors.

FIGS. 34 and 35 illustrate a thirteenth embodiment. The washing motor 131 comprises an induction motor in the thirteenth embodiment. The washing motor 131 includes a stator 132 having the same construction as the stator 26 of the washing motor 24 in the first embodiment. The washing motor 131 further includes a rotor 133 comprising a rotor core 134 formed by stacking a number of steel sheets, instead of the rotor magnets 39 of the rotor 36 of the washing motor 24.

The agitator 5 can be allowed to be rotated with the rotatable tub 4 at the dehydration step and accordingly, the washing motor 131 need not be braked. In view of these points, the washing motor can be allowed to comprise the induction motor although it may comprise a brushless motor or a switched reluctance motor.

Figure 36:
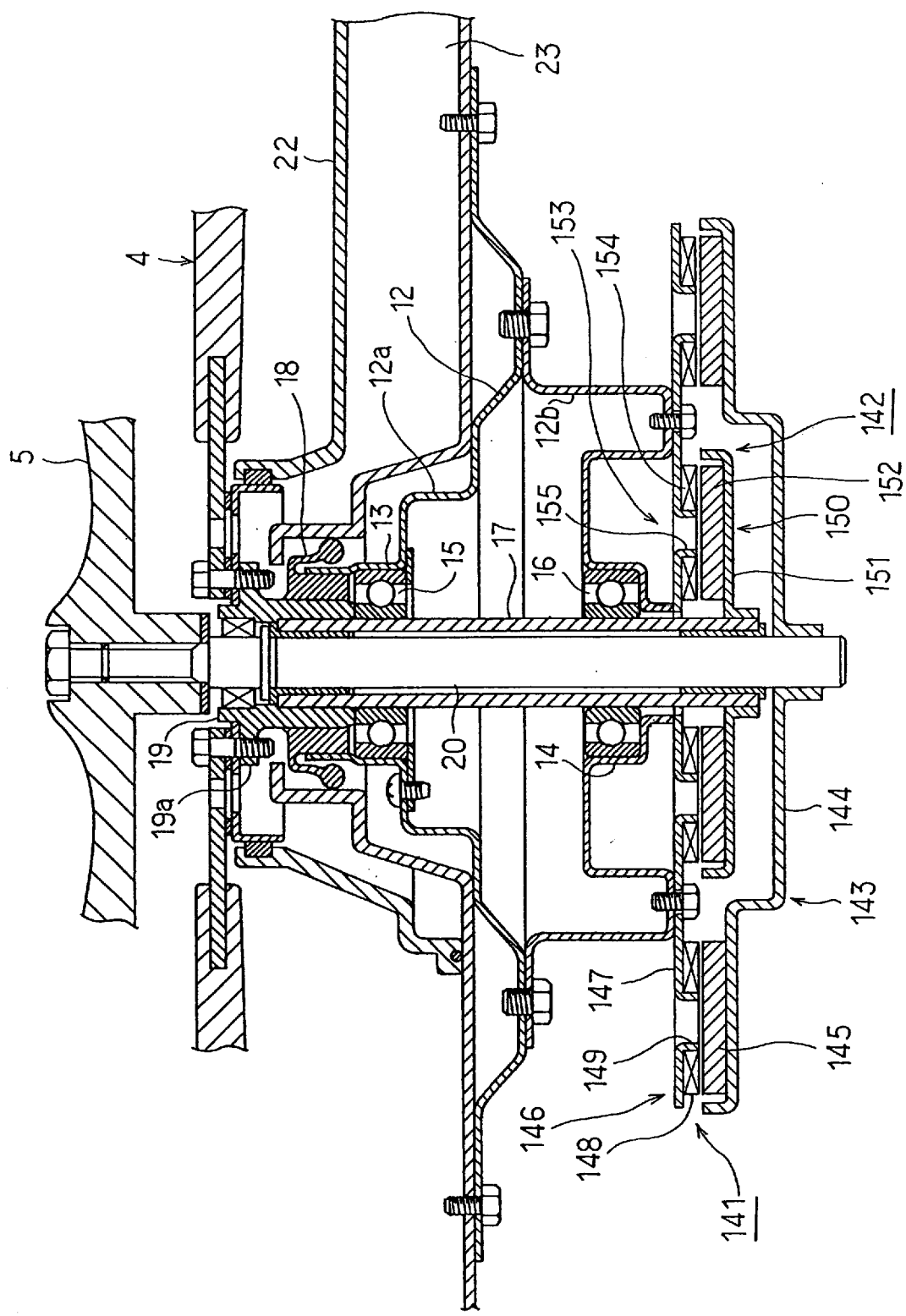
FIG. 36 is a longitudinally sectional side view of a driving mechanism including motors in the washing machine of a fourteenth embodiment in accordance with the present invention.

FIG. 36 illustrates a fourteenth embodiment. Both washing and dehydrating motors 141 and 142 are constructed into an axial gap type. More specifically, the washing motor 141 comprises a rotor 143 including a rotor base 144 having a relatively large diameter and attached to the lower end of the agitator shaft 20 for rotation with the latter and rotor magnets 145 mounted on the outer circumferential upper side of the rotor base 144. The washing motor 141 further includes a stator 146 comprising a stator base 147 mounted to the mounting frame 12 and a stator winding 148 mounted to the outer circumferential backside of the stator base 147. The stator base 147 includes a stator yoke 149 formed by downwardly protruding a portion of the stator base 147 located inside stator winding 148.

The dehydrating motor 142 comprises a rotor 150 including a rotor base 151 having a relatively small diameter and mounted to the lower end of the tub shaft 17 for rotation with the latter and rotor magnets 152 mounted to the upper side of the rotor base 151. The dehydrating motor 142 further comprises a stator 153 including the stator base 147 and a stator winding 154 mounted to the inner circumferential backside of the stator base 147. The stator base 147 further includes a stator yoke 155 formed by downwardly protruding a portion of the stator base 147 located inside stator winding 154.

According to the fourteenth embodiment, each of the washing and dehydrating motors 141 and 142 is constructed into the axial gap type. Consequently, the vertical dimension and the weight of the washing machine can be reduced. The motors 141 and 142 are suitable for full-automatic washing machines having a relatively small capacity and providing soft or moderate cleaning.

Particularly in the fourteenth embodiment, the stator base 147 made of an elastic material is used for the washing and dehydrating motors 141 and 142 in common. The stator windings 148 and 154 of the respective washing and dehydrating motors 141 and 142 are provided on one side of the stator base 147. Consequently, the number of parts can be reduced. Further, the assembling efficiency can be improved as compared with a case where the stator windings 148 and 154 are provided on both sides of the stator base 147 respectively.

Figure 37:
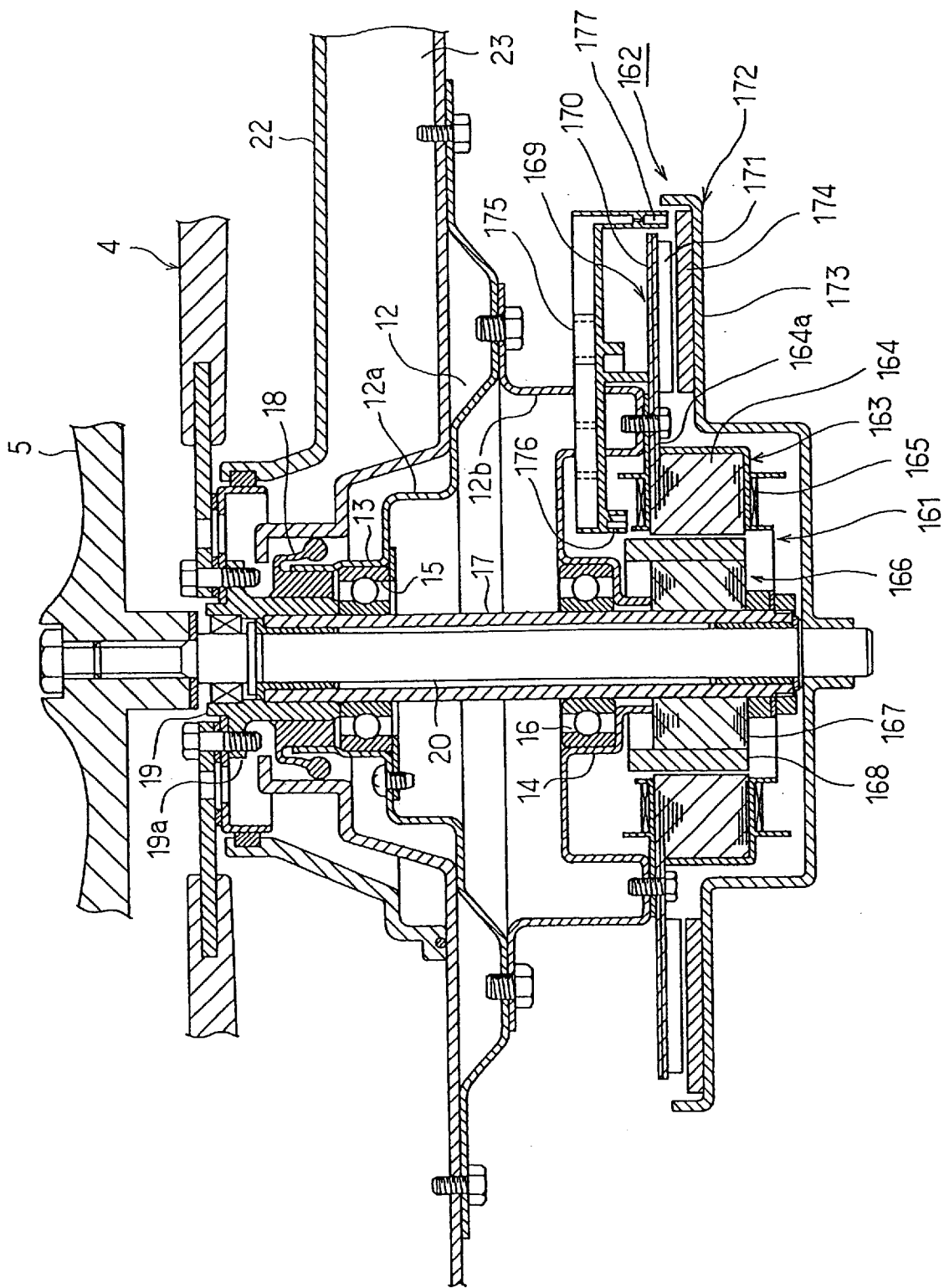
FIG. 37 is a longitudinally sectional side view of a driving mechanism including motors in the washing machine of a fifteenth embodiment in accordance with the present invention.

FIG. 37 illustrates a fifteenth embodiment. In the fifteenth embodiment, the dehydrating motor 161 is constructed into a radial gap type, whereas the washing motor 162 is constructed into an axial gap type. The dehydrating motor 161 comprises a stator 163 including a stator core 164 composed of a number of steel core sheets fixed to the mounting frame 12 and windings 165 wound on teeth of the stator core 164. The stator core 164 includes a plurality of upper core sheets 164a each having a larger diameter than the other sheets. The dehydrating motor 161 further comprises a rotor 166 including a rotor core 167 composed of a number of steel core sheets attached to the lower end of the tub shaft 17 and rotor magnets 168 attached to the outer circumference of the rotor core 167.

The washing motor 162 comprises a stator 169 including outer circumferential portions 170 of the aforesaid core sheets 164a and stator windings 171 attached to the backside of the portions 170. The washing motor 162 further comprises a rotor 172 including a rotor base 173 attached to the lower end of the agitator shaft 20 and having a larger diameter than the core sheets 164a and rotor magnets mounted on the circumferential upper side of the rotor base 173. A sensor casing 175 is mounted to the mounting frame 12. Hall ICs 176 and 177 for the respective dehydrating and washing motors 161 and 163 are held in the sensor casing 175.

According to the fifteenth embodiment, the inside disposed dehydrating motor 161 is constructed into the radial gap type, whereas the outside disposed washing motor 162 is constructed into the axial gap type. Accordingly, since heavy parts are disposed in the center of the machine, a desirable weight balance can be achieved. Further, the axial gap type motor or the washing motor 162 has the rotor 172 disposed on the upper side of the radial gap type motor or the dehydrating motor 161. In a case where the Hall ICs 177 and 176 are provided on the axial and radial gap type motors 162 and 161 respectively, the mounting work is troublesome when the levels at which the Hall ICs are mounted differ from each other. Further, when both Hall ICs are held in the single sensor casing 175, the shape of the casing becomes complicated. In the above-described embodiment, however, the rotor 172 of the axial gap type washing motor 162 is disposed on the upper side of the radial gap type dehydrating motor 161. Accordingly, the Hall ICs 177 and 176 can be disposed approximately at the same level and mounted easily. Further, the shape of the sensor casing 175 can be simplified even when both Hall ICs are held in a single casing.

Further, an upper portion of the stator 164 of the dehydrating motor 161 can be disposed approximately at the same level as the stator 169 of the washing motor 162 as the result of the construction that the axial gap type motor or the washing motor 162 has the rotor 172 disposed on the upper side of the radial gap type motor or the dehydrating motor 161. Consequently, the upper core sheets 164a of the stator core 164 of the radial gap type dehydrating motor 161 are formed so as to have larger diameters so that the upper core sheets 164a can be utilized to serve as the stator core of the axial gap type washing motor 162. The stator core can be used for both motors in common although one motor is of the radial gap type and the other is of the axial gap type.

The washing motor may be constructed into the radial gap type, whereas the dehydrating motor may be constructed into the axial gap type. As the result of this construction, a large load can be coped with in the washing operation, and high-speed rotation can be achieved in the dehydrating operation.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

I claim:

1. A full-automatic washing machine comprising:
    a rotatable for accommodating laundry together with water;
    an agitator provided in the rotatable tub for agitating the water or the laundry;
    a variable speed washing motor for directly driving the agitator; and
    a variable-speed dehydrating motor for directly driving the rotatable tub, the dehydrating motor rotating at a higher speed than the washing motor and developing a lower torque than the washing motor.

2. A full-automatic washing machine according to claim 1, wherein the washing motor comprises a brushless motor or a switched reluctance motor and the dehydrating motor comprises a brushless motor or a switched reluctance motor.

3. A full-automatic washing machine according to claim 2, wherein the washing and dehydrating motors comprise respective rotors and position sensors for sensing rotational positions of the rotors respectively, and the position sensors are held in a single sensor casing so as to be unitized.

4. A full-automatic washing machine according to claim 1, wherein the washing motor comprises an induction motor and the dehydrating motor comprises a brushless motor or a switched reluctance motor.

5. A full-automatic washing machine according to claim 1, wherein each of the washing and dehydrating motors comprises a radial gap type motor.

6. A full-automatic washing machine according to claim 5, wherein the washing motor is constructed into an outer rotor type and the dehydrating motor is constructed into an inner rotor type.

7. A full-automatic washing machine according to claim 5, wherein the washing motor is constructed into an outer rotor type and has a larger diameter than the dehydrating motor, and the dehydrating motor is constructed into an inner rotor type and disposed inside the washing motor.

8. A full-automatic washing machine according to claim 5, wherein each motor includes a stator core and a rotor core, either one of the cores having a larger diameter than the other core, both cores being laid out on one and the same material so that the core having a smaller diameter is placed inside the core having a larger diameter.

9. A full-automatic washing machine according to claim 1, wherein each of the washing and dehydrating motors is constructed into an axial gap type.

10. A full-automatic washing machine according to claim 9, which further comprises a metal stator base used in common for the washing and dehydrating motors and wherein the washing and dehydrating motors comprise respective stator windings provided on one side of the stator base.

11. A full-automatic washing machine according to claim 1, wherein either one of the washing and dehydrating motors is constructed into a radial gap type and the other is constructed into an axial gap type.

12. A full-automatic washing machine according to claim 11, wherein the washing motor is constructed into an axial gap type and the dehydrating motor is constructed into a radial gap type.

13. A full-automatic washing machine according to claim 11, wherein the axial gap type motor includes a rotor provided near one of axial ends of the radial gap type motor.

14. A full-automatic washing machine according to claim 1, wherein the washing motor has a larger diameter than the dehydrating motor and is disposed so as to surround the dehydrating motor.

15. A full-automatic washing machine according to claim 1, which further comprises a stator core and wherein the washing and dehydrating motors include respective stator windings provided on the stator core.

16. A full-automatic washing machine according to claim 15, wherein the stator core has between the stator windings of the washing and dehydrating motors a void for preventing magnetic interference.

17. A full-automatic washing machine according to claim 16, wherein the void includes a plurality of generally arc-shaped void sections and a plurality of generally circular void sections, the arc-shaped and circular void sections being annularly arranged, and the circular void sections serve to fix the stator core to a stationary member.

18. A full-automatic washing machine according to claim 17, wherein each circular void section is located at a portion of the stator core where a magnetic flux density is lower than the other portion thereof.

19. A full-automatic washing machine according to claim 1, further comprising:
a first inverter main circuit for controlling the washing motor so that a rotational speed of the washing motor is varied;
a second inverter main circuit for controlling the dehydrating motor so that a rotational speed of the dehydrating motor is varied; and
a direct-current power supply provided in common for both inverter main circuits.

20. A full-automatic washing machine according to claim 1, which further comprises a direct-current power supply, a single inverter main circuit to which an electric power is supplied from the direct-current power supply, and switching means for supplying an output of the inverter main circuit selectively to the washing or dehydrating motor, and wherein each of the washing and dehydrating motors comprises a brushless motor.

21. A full-automatic washing machine according to any one of claims 1 to 19, further comprising control means for controlling the washing machine, wherein the control means has a rotation control mode in which the washing motor is rotated and a reverse rotation mode in which the dehydrating motor is rotated in a direction reverse to a direction in which the washing motor is rotated.

22. A full-automatic washing machine according to any one of claims 1 to 20, which further comprises a water-supply valve and a drain valve for performing water supply to and drainage from the rotatable tub, and wherein the washing and dehydrating motors are controlled so that the dehydrating motor is rotated at a low speed while the water supply is being performed by the water-supply valve with the drain valve being closed and upon expiration of a predetermined time, the washing motor is rotated repeatedly alternately in opposite directions while the water supply is being performed.

23. A full-automatic washing machine according to any one of claims 1 to 20, which further comprises a drain valve for draining wash liquid from the rotatable tub, and wherein the washing motor is rotated repeatedly alternately in opposite directions so that draining by the drain valve is performed.

24. A full-automatic washing machine according to any one of claims 1 to 20, wherein while the dehydrating motor is driven, the washing motor is in a free rotation state.

25. A full-automatic washing machine according to any one of claims 1 to 19, wherein both of the washing and dehydrating motors are driven simultaneously.

26. A full-automatic washing machine according to claim 25, wherein when either the washing or dehydrating motor reaches a predetermined rotational speed, an energizing phase for the washing motor is controlled to lead relative to a previous one.

27. A fill-automatic washing machine according to claim 25, wherein when either the dehydrating or washing motor reaches a predetermined speed after both motors have been energized to be rotated, the washing motor is deenergized into a free rotation state.

28. A full-automatic washing machine according to claim 25, wherein speeds of the washing and dehydrating motors are increased and decreased on the basis of an increase and a decrease in outputs of the respective motors, and increase and decrease rates of the motor outputs for requirements of speed increase and decrease differ between the washing and dehydrating motors.

29. A full-automatic washing machine according to claim 28, wherein the motor output increase and decrease rates of the dehydrating motor is controlled to be smaller than those of the washing motor.

30. A full-automatic washing machine according to claim 25, wherein when the speeds of the washing and dehydrating motors differ from each other by or above a predetermined speed, the lower speed of either motor is controlled so as to approximate the speed of the other motor.

31. A full-automatic washing machine according to claim 30, wherein when the speed of the washing motor approximates the speed of the dehydrating motor by a predetermined value, the output of the washing motor remains unchanged.

32. A full-automatic washing machine according to any one of claims 1 to 20, wherein rotational speeds of the washing and dehydrating motors differs from each other.

33. A full-automatic washing machine according to any one of claims 1 to 20, wherein while the washing motor is driven, the dehydrating motor is in a free rotation state, and thereafter, the dehydrating motor is driven.

34. A full-automatic washing machine according to claim 33, wherein when the washing motor reaches a predetermined speed, the dehydrating motor is driven.

35. A full-automatic washing machine according to claim 33, wherein when the washing motor reaches a predetermined speed increase rate, the dehydrating motor is driven.

36. A full-automatic washing machine according to claim 1 or 20, which further comprises control means for controlling both motors, and wherein the control means has a rotation control mode in which the washing motor is rotated in the washing step and a brake control mode in which an electric brake is applied to the dehydrating motor in the washing step.

37. A full-automatic washing machine according to claim 36, wherein the control means includes winding short-circuiting means for short-circuiting a winding of the dehydrating motor so that the electric brake is effected.

38. A full-automatic washing machine according to claim 37, wherein the winding short-circuiting means performs a winding short-circuiting operation while the machine is powered off.

39. A full-automatic washing machine according to claim 36, wherein the electric brake is effected by direct-current energization of the dehydrating motor.

40. A full-automatic washing machine according to claim 1, which further comprises an inverter main circuit for controlling a speed of the dehydrating motor and brake applying means for applying an electric brake via the inverter main circuit to the dehydrating motor when braking is required.

41. A full-automatic washing machine according to claim 1, wherein the dehydrating motor comprises a brushless motor, and which further comprises an inverter main circuit for controlling a speed of the brushless motor, brake applying means for applying an electric brake via the inverter main circuit to the brushless motor, the brake applying means having as brake modes a phase lag energization mode, a reverse sequence energization mode and a winding short-circuiting mode and effecting any one of the modes or a combination of one or more modes.

42. A full-automatic washing machine according to claim 1, which further comprises an inverter for controlling speeds of the washing and dehydrating motors and brake applying means for applying an electric brake to the washing and dehydrating motors, the brake applying means applying the electric brake to both of the washing and dehydrating motors when braking is required.

43. A full-automatic washing machine according to claim 1, which further comprises an inverter for controlling speeds of the washing and dehydrating motors and brake applying means for applying an electric brake via the inverter to the washing and dehydrating motors, the brake applying means applying the electric brake first to the washing motor and subsequently to the dehydrating motor when braking is required.

44. A full-automatic washing machine according to any one of claims 40, 42 and 43, wherein the brake control mode is a reverse sequence energization mode.

45. A full-automatic washing machine according to claim 42 or 43, wherein at least one of the washing and dehydrating motors comprises a brushless motor and the brake control means has, as the brake control mode applied to the brushless motor, a phase lag energization mode or a winding short-circuiting mode.

46. A full-automatic washing machine according to claim 40 or 42, wherein at least one of the washing and dehydrating motors comprises a brushless motor and the brake control means has, as the brake control mode applied to the brushless motor, a phase lag energization mode, and a phase and a motor output are determined or changed according to a rotational speed of the dehydrating motor.

47. A full-automatic washing machine according to claim 40 or 42, wherein at least one of the washing and dehydrating motors comprises a brushless motor, the brake control means has, as the brake control mode applied to the brushless motor, a phase lag energization mode, and which further comprises direct-current power supply forming means, power supply voltage detecting means for detecting a power supply voltage of the direct-current power supply forming means while the brushless motor is being braked in the phase lag energization mode, a discharge resistor, and discharging means for causing the discharge resistor to consume power when a result of detection by the power supply voltage detecting means is at or above a predetermined voltage.

48. A full-automatic washing machine according to claim 40 or 42, which further comprises detecting means for detecting a reduction degree of a rotational speed of the rotatable tub when the dehydrating motor is braked during dehydration, thereby determining or changing output or an energization phase of the dehydrating motor according to a result of detection.

49. A full-automatic washing machine according to claim 42, wherein when a difference between the speeds of the dehydrating and washing motors is larger than a predetermined value, the brake control means controls either motor rotating at a higher speed so that the speed of said either motor approximates the speed of the other motor rotating at a lower speed.

50. A full-automatic washing machine according to claim 49, wherein when the speeds of the washing and dehydrating motors approximate respective predetermined values, a braking force is controlled to remain unchanged by the brake control means.

51. A full-automatic washing machine according to claim 1, further comprising control means for controlling the washing machine, wherein the control means having a washing control mode in which a dehydration brake control is executed in the dehydrating step and thereafter, a stored-water rinse step is executed, the control means starting a water supply operation during the dehydrating brake control.

* * * * *